(12) United States Patent
Kuribayashi

(10) Patent No.: US 10,983,680 B2
(45) Date of Patent: Apr. 20, 2021

(54) DISPLAY DEVICE, PROGRAM, DISPLAY METHOD AND CONTROL DEVICE

(71) Applicant: NIKON CORPORATION, Tokyo (JP)

(72) Inventor: Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 99 days.

(21) Appl. No.: 16/313,986

(22) PCT Filed: Jun. 28, 2017

(86) PCT No.: PCT/JP2017/023760
§ 371 (c)(1),
(2) Date: Apr. 8, 2019

(87) PCT Pub. No.: WO2018/003860
PCT Pub. Date: Jan. 4, 2018

(65) Prior Publication Data
US 2019/0235737 A1 Aug. 1, 2019

(30) Foreign Application Priority Data

Jun. 28, 2016 (JP) .............................. JP2016-128210

(51) Int. Cl.
*G06F 3/0484* (2013.01)
*G06F 3/0481* (2013.01)
(Continued)

(52) U.S. Cl.
CPC ......... *G06F 3/04845* (2013.01); *G02B 30/56* (2020.01); *G06F 3/017* (2013.01);
(Continued)

(58) Field of Classification Search
CPC ............... G06F 3/04845; G06F 3/0418; G06F 2203/04101; G06F 3/0425; G06F 3/0481;
(Continued)

(56) References Cited

U.S. PATENT DOCUMENTS

2005/0185276 A1* 8/2005 Tomisawa ............ H04N 13/356
359/472
2010/0007636 A1* 1/2010 Tomisawa ................. G06F 3/01
345/204
(Continued)

FOREIGN PATENT DOCUMENTS

JP 2006-293878 A 10/2006
JP 2009-086395 A 4/2009
(Continued)

OTHER PUBLICATIONS

Oct. 10, 2017 International Search Report issued in International Patent Application No. PCT/JP2017/023760.
(Continued)

*Primary Examiner* — Temesghen Ghebretinsae
*Assistant Examiner* — Ivelisse Martinez Quiles
(74) *Attorney, Agent, or Firm* — Oliff PLC

(57) ABSTRACT

A display device includes: a first display unit that displays a first image at a remote position; a second display unit that displays a second image at a position different from the position of the first image; a detection unit that detects an operation performed by a user with respect to the first image; and a display control unit that adjusts a display mode for at least either one of; the first image displayed by the first display unit and the second image displayed by the second display unit, based upon the operation detected by the detection unit.

17 Claims, 40 Drawing Sheets

(51) Int. Cl.
*G09G 3/00* (2006.01)
*G09G 5/391* (2006.01)
*G06F 3/0488* (2013.01)
*G02B 30/56* (2020.01)
*G06F 3/01* (2006.01)
*G06F 3/044* (2006.01)
*G06F 3/14* (2006.01)
*G02B 5/32* (2006.01)

(52) U.S. Cl.
CPC ............ *G06F 3/044* (2013.01); *G06F 3/0481* (2013.01); *G06F 3/0484* (2013.01); *G06F 3/0488* (2013.01); *G06F 3/1423* (2013.01); *G09G 3/003* (2013.01); *G09G 5/391* (2013.01); *G02B 5/32* (2013.01); *G06F 3/04817* (2013.01); *G06F 2203/04108* (2013.01); *G09G 2320/0693* (2013.01); *G09G 2354/00* (2013.01)

(58) Field of Classification Search
CPC ...... G06F 3/0484; G06F 3/0488; G06F 3/017; G06F 3/044; G06F 3/1423; G06F 3/04817; G06F 2203/04108; G02B 30/56; G02B 5/32; G02B 5/0205; G09G 3/003; G09G 5/391; G09G 2320/0693; G09G 2354/00; G03H 1/0406
See application file for complete search history.

(56) References Cited

U.S. PATENT DOCUMENTS

| | | | | |
|---|---|---|---|---|
| 2010/0066662 | A1* | 3/2010 | Tomisawa | G03B 37/04 345/156 |
| 2010/0245345 | A1* | 9/2010 | Tomisawa | H04N 13/388 345/419 |
| 2011/0187706 | A1* | 8/2011 | Vesely | G06F 3/013 345/419 |
| 2012/0200495 | A1* | 8/2012 | Johansson | H04N 13/279 345/156 |
| 2012/0280987 | A1 | 11/2012 | Iwane | |
| 2014/0015794 | A1 | 1/2014 | Ueno et al. | |
| 2014/0198030 | A1* | 7/2014 | Takazawa | G06K 9/2036 345/156 |
| 2016/0004114 | A1 | 1/2016 | Kuramoto | |
| 2017/0153712 | A1* | 6/2017 | Kawai | G06F 3/014 |
| 2019/0243469 | A1* | 8/2019 | Kuribayashi | G06F 3/0346 |

FOREIGN PATENT DOCUMENTS

| | | | |
|---|---|---|---|
| JP | 2009086395 A | * | 4/2009 |
| JP | 2010-015553 A | | 1/2010 |
| JP | 2012-203737 A | | 10/2012 |
| JP | 2015-097049 A | | 5/2015 |
| JP | 2015097049 A | * | 5/2015 |
| JP | 2016-014777 A | | 1/2016 |
| WO | 2011/158911 A1 | | 12/2011 |

OTHER PUBLICATIONS

Toyohiko Hatada. "Three-Dimensional Image and Visual Characteristics". Physiological Optics 13, pp. 110-119.

Toyohiko Hatada. "Depth Perception Characteristics". Physiological Optics 14, pp. 108-118.

Toyohiko Hatada. "3D Display". Physiological Optics 15, pp. 98-109.

Yuichi Iwadate. "Study of 3D Image". Commentary 01, pp. 4-9.

Oct. 6, 2020 Office Action issued in Japanese Patent Application No. 2018-525215.

Mar. 3, 2020 Office Action issued in Japanese Patent Application No. 2018-525215.

* cited by examiner (a)

(b)

(c)

(a)

(b)

(c)

(a)

(b)

(c)

(a)

(b)

(a)

(b)

(a)

(b)

(a)

(b)

(a)

(b)

(a)

(b)

(c)

(a)

(b)

(a)

(b)

(c)

(a)

(b)

(a)

(b)

(c)

(a)

(b)

(c)

(a)

(b)

(c)

(a)

(b)

DISPLAY DEVICE, PROGRAM, DISPLAY METHOD AND CONTROL DEVICE

TECHNICAL FIELD

The present invention relates to a display device, a program, a display method and a control device.

BACKGROUND ART

There is an electronic device disclosed in the related art, which is capable of detecting an operation, performed with respect to a three-dimensional object displayed in midair, via a capacitive touch sensor that calculates the distance between a finger and a touch panel (see PTL 1). While PTL 1 describes that the electronic device detects an operation performed with respect to a three-dimensional object (target), full operability of operations performed with respect to the object is not assured in the art disclosed in PTL 1.

CITATION LIST

Patent Literature

PTL 1: Japanese Laid Open Patent Publication No. 2012-203737

SUMMARY OF INVENTION

According to the 1st aspect, a display device comprises: a first display unit that displays a first image at a remote position; a second display unit that displays a second image at a position different from the position of the first image; a detection unit that detects an operation performed by a user with respect to the first image; and a display control unit that adjusts a display mode for at least either one of; the first image displayed by the first display unit and the second image displayed by the second display unit, based upon the operation detected by the detection unit.

According to the 2nd aspect, a program executed by a computer in a display device enables the computer to execute: processing for displaying a first image at a remote position; processing for displaying a second image at a position different from the position of the first image; processing for detecting an operation performed by a user with respect to the first image; and processing for adjusting a display mode for at least one of the first image brought up on display and the second image brought up on display based upon the detected operation.

According to the 3rd aspect, a display method through which an image is displayed by a display device comprises: displaying a first image at a remote position; displaying a second image at a position different from the position of the first image; detecting an operation performed by a user with respect to the first image on display; and adjusting a display mode for at least one of the first image brought up on display and the second image brought up on display based upon the detected operation.

According to the 4th aspect, a display device comprises: a first display unit that displays a display image, displayed by the display device, at a position set apart from the display device by a predetermined distance; a second display unit that displays a second display image, displayed by a second display device, at a position different from the position of the first image; an operation detection unit that detects an operation performed by a user for the first display image; an acquisition unit that sets a detection reference near the first display image and ascertains a positional relationship between the detection reference and the operation performed by the user; and a control unit that executes display control through which a display mode for the second display image displayed by the second display unit is altered in relation to the first display image displayed by the first display unit, based upon the positional relationship ascertained by the acquisition unit.

According to the 5th aspect, a control device comprises: a control unit that adjusts a positional relationship between a detection reference for detecting an operation performed by a user with respect to a first display in midair, and a second display taking a position different from a position of the first display by controlling the second display.

According to the 6th aspect, a control device comprises: a control unit that adjusts a positional relationship between a detection reference for detecting an operation performed by a user for a first display in midair and a physical object located at a position different from a position of the first display by controlling the physical object.

DESCRIPTION OF EMBODIMENTS

First Embodiment

In reference to drawings, the display device in the first embodiment will be described. The first embodiment will be described in reference to an example in which the display device in the embodiment is mounted in an operation panel. It is to be noted that the display device in the embodiment may be mounted in an electronic apparatus other than an operation panel. It may be mounted in, for instance, a portable telephone, a television set, a tablet terminal, a portable information terminal device such as a wristwatch-type terminal, a personal computer, a music player, a land-line telephone unit or a wearable device. In addition, the display device in the embodiment may be integrated into an electronic system such as a digital signage system. Examples of such digital signage systems include a compact display unit built into, for instance, an automatic vending machine or the like or a large display unit, assuming a size greater than a typical adult person, which may be installed at a wall surface in a building. Furthermore, the display device in the embodiment may be built into, for instance, a panel of an automatic cash machine (ATM) at which the user enters a PIN number, an amount of money and the like on, a panel of an automatic ticket vending machine that dispenses railway tickets, bus tickets, commuter passes and the like, or a panel on any of various types of information search terminal systems installed in libraries, art galleries and the like. Moreover, the display device in the embodiment may be installed in any of various types of robots (including, for instance, mobile robots and electronic devices such as self-propelled vacuum machines).

Figure 1:
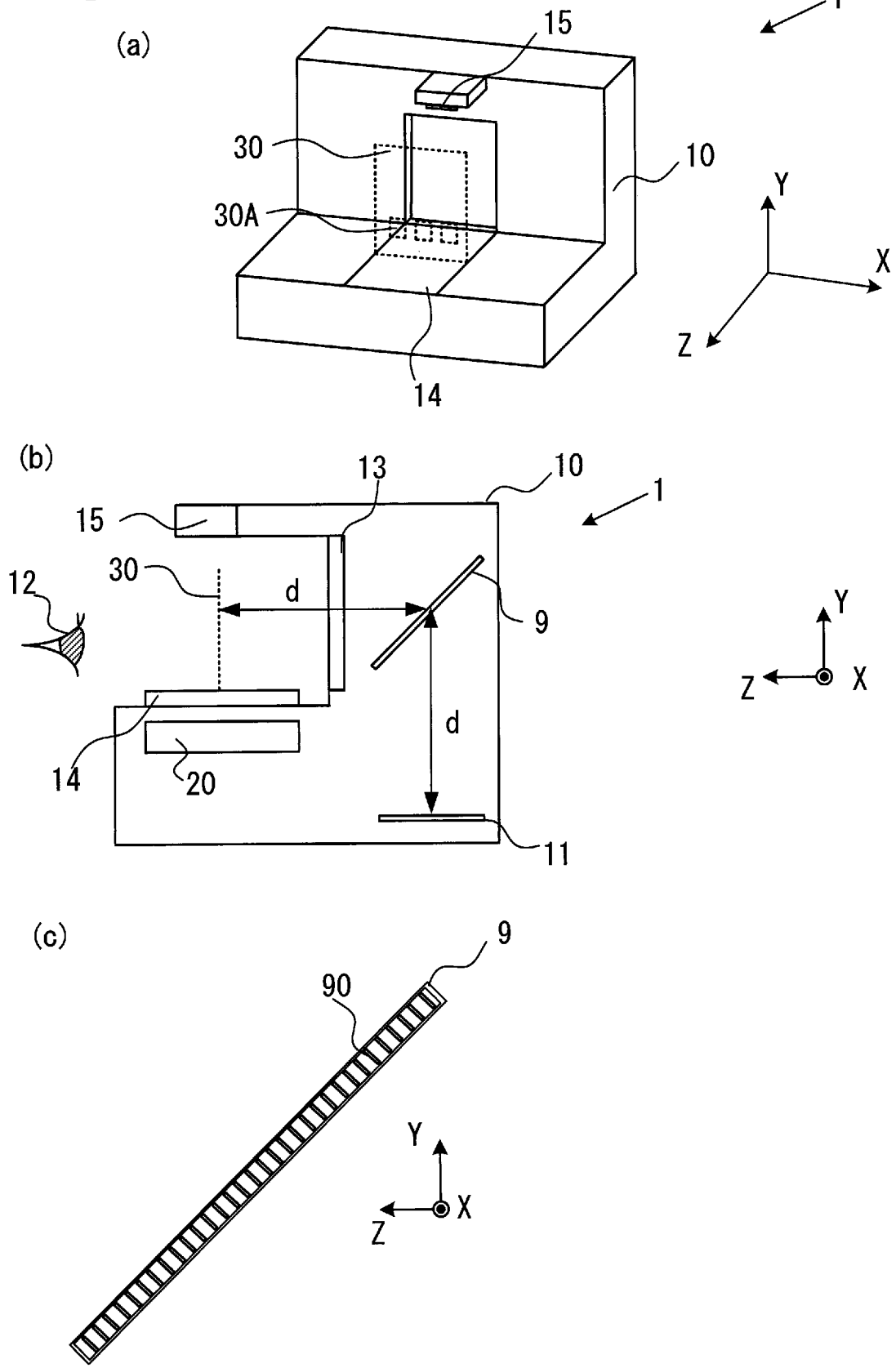
FIG. 1 Illustrations of the structure of the display device achieved in a first embodiment, in a perspective view in (a), in a sectional view in (b) and in a sectional view showing the structure of the image-forming optical system in (c)

FIG. 1(a) is a perspective view of a display device 1, FIG. 1(b) is a sectional view showing part of the display device 1 in an enlargement and FIG. 1(c) is a side elevation providing an enlarged view of part of the display device 1. It is to be noted that for purposes of better clarity, the explanation will be given in reference to a coordinate system assuming an X axis, a Y axis and a Z axis, set relative to the display device 1 as indicated in the figures. It is to be also noted that the coordinate system set for these purposes does not need to be an orthogonal coordinate system assuming the X axis, the Y axis and the Z axis, and it may instead be a polar coordinate system or a cylindrical coordinate system. In other words, any of these coordinate systems may be set relative to the display device 1, as long as the X axis is set to extend along the shorter sides of the rectangular display area of the display device 1, the Y axis is set to extend along the longer sides of the rectangular display area of the display device 1 and the Z axis is set to extend along a direction perpendicular to the display area.

The display device 1 includes a body 10, having installed therein a control unit 20, an image-forming optical system 9, a display unit 11, an operation detector 13, a stage 14 and a projector 15. The image-forming optical system 9, the display unit 11, the operation detector 13, the stage 14 and the projector 15 are disposed inside the body 10. The display unit 11, constituted with, for instance, a liquid crystal display or an organic EL display, includes a plurality of display pixel arrays arranged in a two-dimensional pattern. Under control executed by the control unit 20, the display unit 11 displays an image corresponding to display image data.

As FIG. 1(c) shows, the image-forming optical system 9, having a plurality of micromirror elements 90 disposed in a two-dimensional pattern therein, is set with a predetermined angle relative to the ZX plane, e.g., with a 45° tilt. The image-forming optical system 9 reflects light departing a display image brought up at the display unit 11 and advancing toward the + side along the Y direction, and thus forms a real image of the displayed image in the space above the stage 14 as a midair image or floating image 30. At this time, the midair image 30 is formed at a position that is symmetry with the display surface of the display unit 11 in relation to the image-forming optical system 9. This means that a distance d between the display surface at the display unit 11 and the image-forming optical system 9 and a distance d between the image-forming optical system 9 and the midair image 30 are equal to each other. As a result, a person operating the display device 1 (hereafter will be referred to as a user 12) is able to view the display image displayed at the display surface of the display unit 11 as the midair image 30 floating in the space above the stage 14. It is to be noted that a structure that may be adopted in such an image-forming optical system 9 is described, for instance, in Japanese Laid Open Patent Publication No. 2016-14777 in specific terms. In addition, the image-forming optical system 9 does not need to adopt the structure described above, and may instead include convex lenses. It is to be noted that convex lenses, depending upon their focal length, may assume a significant thickness along the optical axis and, for this reason, Fresnel lens structure may be adopted instead. An optimal image-forming optical system 9 to be included in the display device 1 may be selected in correspondence to a specific set of requirements such as those described above.

Furthermore, the display device 1 may display a midair image 30 by adopting the light-field method of the known art, as will be explained later in reference to a third embodiment.

In addition, the position at which the midair image 30 is displayed can be moved along the Z direction by allowing the distance d between the display unit 11 and the image-forming optical system 9 measured along the Y direction, to be variable. For instance, as the distance between the display unit 11 and the image-forming optical system 9 is reduced, i.e., as the display unit 11 is moved along a direction running toward the image-forming optical system 9, the midair image 30 is displayed at a position further away from the user 12 (toward the − side along the Z direction). If, on the other hand, the distance between the display unit 11 and the image-forming optical system 9 is increased, i.e., if the display unit 11 is moved along a direction running away from the image-forming optical system 9, the midair image 30 is displayed at a position closer to the user 12 (toward the + side along the Z direction). The display unit 11 can be moved along the Y direction via a drive device such as a motor, another type of actuator or the like (not shown).

It is to be noted that in conjunction with a certain type of image-forming optical system 9, the relationship may be reversed from that described above. Namely, as the display unit 11 is moved along a direction running toward the image-forming optical system 9, the midair image 30 may be displayed at a position closer to the user 12 (toward the + side along the Z direction). If, on the other hand, the distance between the display unit 11 and the image-forming optical system 9 is increased, i.e., if the display unit 11 is moved along a direction running away from the image-forming optical system 9, the midair image 30 may be displayed at a position further away from the user 12 (toward the − side along the Z direction). This means that the direction along which the display unit 11 is moved will be adjusted in correspondence to the type of image-forming optical system 9 being used.

The midair image 30 includes a plurality of icons 30A (operation buttons) corresponding to operation buttons via which various settings may be selected for the display device 1 and instructions for implementing various functions of the display device 1 may be issued. The icons 30A in the embodiment may be set over, for instance, one row by three columns.

The operation detector 13, disposed parallel to the XY plane at a position further toward the Z direction − side relative to the stage 14, which will be described later, may be configured with, for instance, a transparent capacitive panel (hereafter will be referred to as a capacitive panel) of the known art. The operation detector 13 configured with a capacitive panel forms an electric field with electrodes constituted of a substantially transparent material. When the user 12 moves his finger or a stylus toward the midair image 30 in order to perform an operation at the display position of the midair image 30, the operation detector 13 detects the position of the finger or the stylus as an electrostatic capacitance value. For instance, it may compare the electrostatic capacitance values detected at the four corners of the transparent capacitive panel so as to detect the position of the finger of the user 12 along the X axis and the Z axis based upon the electrostatic capacitance values detected at the four corners.

It is to be noted that the operation detector 13 may instead be disposed upon the stage 14 so as to range parallel to the ZX plane.

In addition, the operation detector 13 takes an electrostatic capacitance detection range, which is a predetermined range extending from its surface along the Z direction, as will be described in detail later. The operation detector 13 detects the distance between the operation detector 13 and the finger or the stylus present within the predetermined detection range (i.e., the position on the Y axis) based upon the electrostatic capacitance values detected at the four corners of the transparent capacitive panel by, for instance, comparing the electrostatic capacitance values detected at the four corners. It will be obvious that the midair image 30 must be formed via the image-forming optical system 9 so that it occupies a position within the predetermined detection range of the operation detector 13, and preferably a position around the midway point of the predetermined detection range along the Z direction. As described above, the operation detector 13 detects an operation performed at the display position of the midair image 30 by the user 12 with his finger or with a stylus, enabling the user 12 to perform operations with respect to the midair image 30 without having to directly touch the operation detector 13. It is to be noted that while the following description will be provided by assuming that the user 12 uses his finger to perform an operation at the display position of the midair image 30, the same principle will apply to an operation performed via a stylus or the like.

The stage 14 is disposed so that its surface ranges parallel to the ZX plane, and a midair image 30 is displayed above the stage 14. While the following description is provided by assuming that the stage 14 has a rectangular shape, the present embodiment may be adopted in conjunction with a stage taking any of various shapes such as a round shape and a polygonal shape, instead of a rectangular shape.

The projector 15, disposed upward relative to the stage 14 (toward the Y direction + side), projects a projection image onto the stage 14 by projecting image data formed on the display element toward the Y direction − side under control executed by the control unit 20. The projector 15 projects the projection image at a predetermined position relative to the position of the midair image 30.

Figure 2:
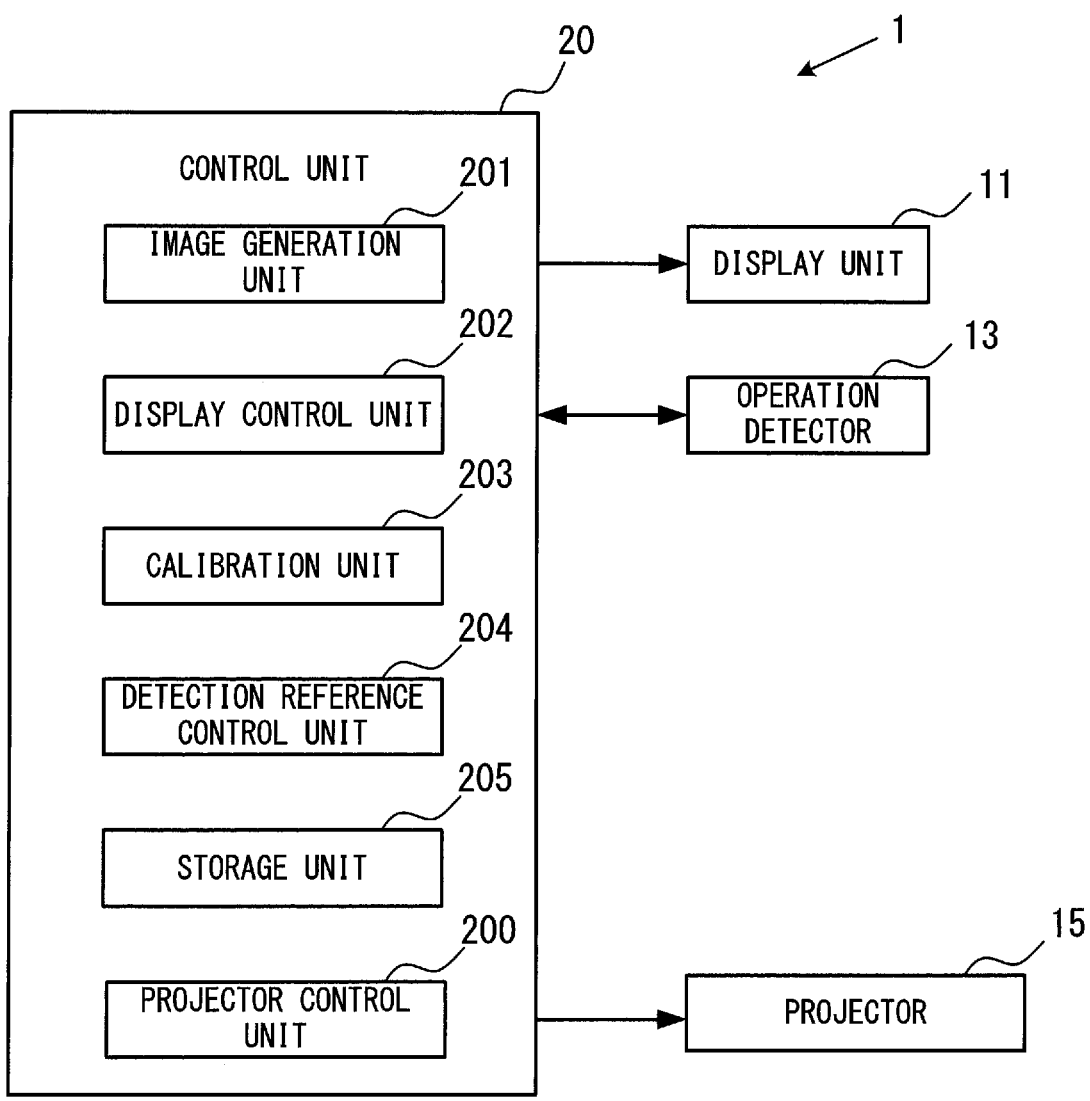
FIG. 2 A block diagram showing the essential configuration of the display device achieved in the first embodiment FIG. 3 A schematic illustration of a midair image displayed in the first embodiment in (a) and sectional views, each indicating the relationship among the operation detector, the midair image and the detection reference, in (b), (c) and (d)

FIG. 2 is a block diagram showing the control unit 20, and the display unit 11 and the operation detector 13 controlled by the control unit 20, among the components configuring the display device 1. The control unit 20, comprising a CPU, a ROM, a RAM and the like, includes an arithmetic operation circuit that controls various structural elements of the display device 1, including the display unit 11 and the operation detector 13, based upon a control program and executes various types of data processing. The control unit 20 includes an image generation unit 201, a display control unit 202, a calibration unit 203, a detection reference control unit 204, a storage unit 205 and a projector control unit 200. The storage unit 205 includes a nonvolatile memory where the control program is stored, a storage medium where image data to be displayed at the display unit 11 and the like are stored, and the like. It is to be noted that the correspondence between the distance from the surface of the operation detector 13 to the fingertip and the electrostatic capacitance when the operation detector 13 detects the fingertip is stored in advance in the storage unit 205. Accordingly, as the fingertip is positioned within the predetermined detection range of the operation detector 13, the operation detector 13 is able to detect the electrostatic capacitance at the fingertip, and thus detect the position of the fingertip along the Z direction based upon the detected electrostatic capacitance and the correspondence stored in the storage unit 205, as explained earlier.

Based upon image data stored in the storage medium, the image generation unit 201 generates display image data corresponding to a display image to be brought up on display at the display unit 11. The display control unit 202 brings up the image corresponding to the display image data generated by the image generation unit 201 at the display unit 11. In addition, as the user 12 performs an operation at the display position of an icon 30A in the midair image 30, the display control unit 202 executes display image switchover control for the display unit 11 in correspondence to the type of the icon 30A that has been operated. It is to be noted that in response to an operation of user 12 performed at the display position of the icon 30A in the midair image 30, the display control unit 202 may execute control other than the display image switchover control for the display unit 11. For instance, assuming that the user 12 performs an operation at the display position of an icon 30A in the midair image 30 while a movie image is on display as the display image at the display unit 11, the display control unit 202 may execute control for playing the movie image currently displayed at the display unit 11 or for stopping the movie playback.

The calibration unit 203 executes calibration processing in first and second calibration processing modes, as will be described in detail later. The detection reference control unit 204 sets a detection plane, i.e., a detection reference, in the space above the stage 14. More specifically, the detection reference control unit 204 sets the detection reference at the position taken by (or at a position within a predetermined range from) the midair image 30 within the predetermined detection range of the operation detector 13. The detection reference control unit 204 also decides that the finger of the user 12 has reached the detection reference based upon an electrostatic capacitance value detected by the operation detector 13. Namely, the detection reference control unit 204 decides that the user 12 has performed an operation at the display position of the icon 30A when the finger position (the position on the X axis, the Y axis and the Z axis) corresponding to the value of the electrostatic capacitance detected by the operation detection unit 13 matches the position of the detection reference having been set. The detection reference control unit 204 sets the detection reference at a predetermined specific initial position. The initial position set for the detection reference is stored in advance in the storage unit 205. It is to be noted that the initial position of the detection reference may be a universal position shared by all users, or a different initial position may be set for each user 12 based upon the history of use of the display device 1 by the particular user 12. It is to be noted that the detection reference control unit 204 may adjust or correct the detection reference position based upon the results of calibration processing to be described later.

Furthermore, the position of the detection reference (its initial position and an adjusted or corrected position) may be set to range over the entire plane (over the X axis and the Y axis) of the operation detector 13 or may be set to range over only part of the plane. Moreover, the position of the detection reference, having been set when the display device 1 was last used and stored in the storage unit 205, may be read out and selected as the initial position of the detection reference. It is to be noted that the detection reference control unit 204 may decide that the user 12 has performed an operation at the display position of the icon 30A when the finger position corresponding to the electrostatic capacitance value detected by the operation detector 13 substantially matches the position of the detection reference, as well as when the finger position exactly matches the position of the detection reference. A specific range over which the finger position is considered to substantially match the position of the detection reference may be set in advance.

The projector control unit 200 projects an auxiliary image, which will help the user 12 perceive the position taken along the X direction and the Z direction by the midair image 30 brought up on display, onto the stage 14 by controlling the projector 15. This auxiliary image will be described in detail later.

Figure 3:
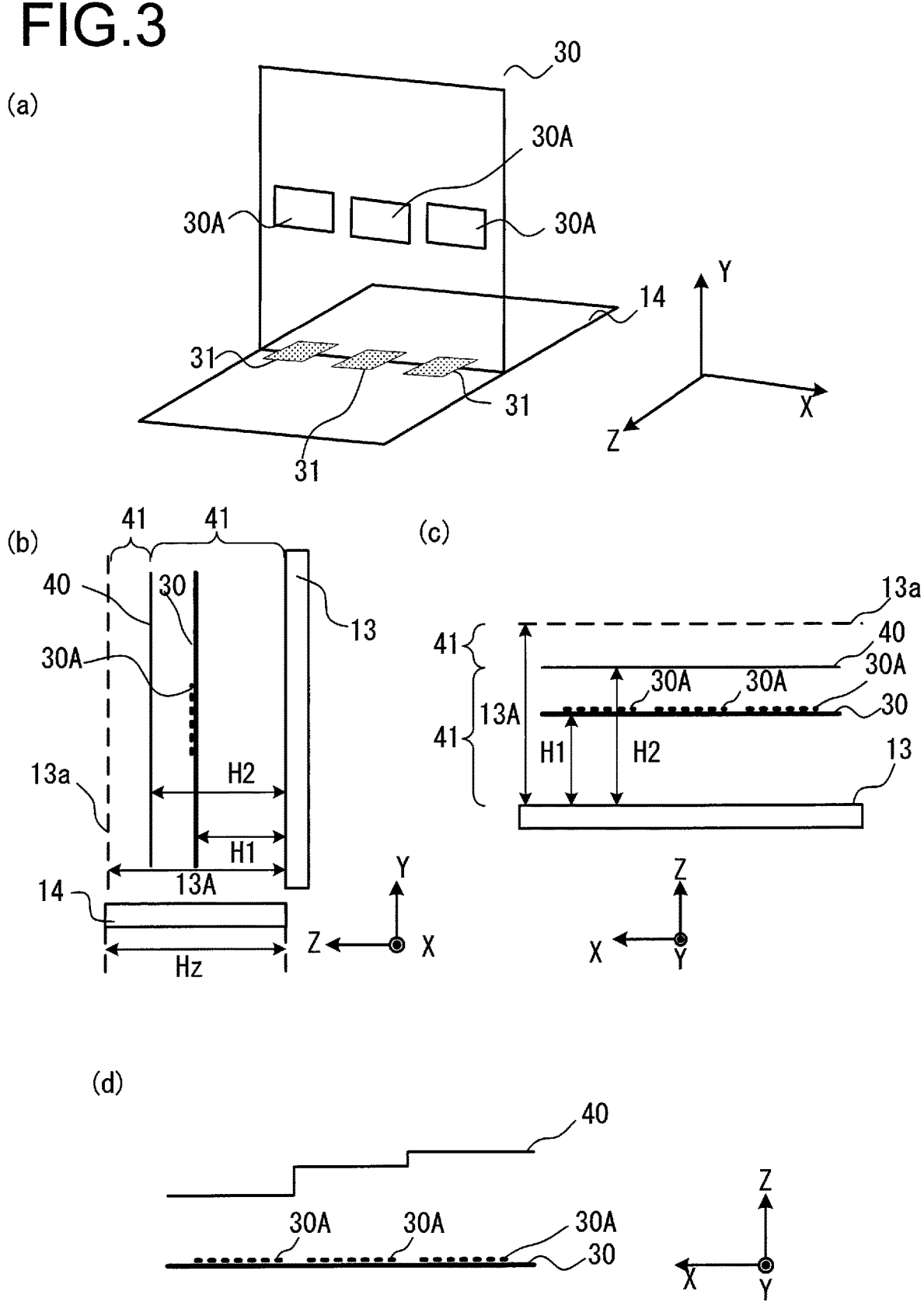

FIG. 3(a) presents an example of a midair image 30 that may be displayed by the display device 1, and FIG. 3(b) and FIG. 3(c) schematically illustrate the positional relationship among the body 10 or the operation detector 13, the midair image 30 and a detection reference 40. FIG. 3(b) indicates the positional relationship between the midair image 30 and the detection reference 40 in a sectional view taken over a plane parallel to the YZ plane, whereas FIG. 3(c) indicates the positional relationship between the midair image 30 and the detection reference 40 in a sectional view taken over a plane parallel to the ZX plane.

The midair image 30 in FIG. 3(a), which is a first image (first display image), includes three icons 30A set over one row by three columns as explained earlier. The icons 30A constitute a first portion of the midair image 30, to be operated by the user 12. On the stage 14 located further downward (toward the Y direction − side) relative to the icons 30A, auxiliary images 31, which are second images (second display images), are projected by the projector 15. The auxiliary images 31, constituting a second portion different from the icons 30A constituting the first portion of the midair image 30, are images used as a cue that helps the user 12 to perceive positional relationships with respect to the icons 30A along the Z direction. It is to be noted that the auxiliary images 31 will be described in detail later. The detection reference 40 in FIGS. 3(b) and 3(c) is set by the detection reference control unit 204 in the vicinity of the position taken by the midair image 30, and more specifically, at a position slightly more toward the user 12 (Z direction + side) in the example presented in the figures. An icon within the midair image 30 is indicated by a bold dotted line 30A in FIG. 3(b). It is to be noted that while the icons 30A, which are part of the midair image 30, take up positions matching that of the midair image 30, the bold dotted lines indicating the icons 30A are offset from the solid line indicating the midair image 30 in FIGS. 3(b) and 3(c) so as to distinguish the icons 30A.

As shown in FIGS. 3(b) and 3(c), the operation detector 13 assumes an electrostatic capacitance detection range 13A set above the stage 14 (Y direction + side). In FIGS. 3(b) and 3(c), the electrostatic capacitance detection limit, present at a point taken along the Z direction further frontward (toward the + side along the Z direction) relative to the operation detector 13, is indicated with a dotted line 13a, and the interval between the electrostatic capacitance detection limit 13a and the operation detector 13 is indicated as an electrostatic capacitance detection range 13A.

In the example presented in FIG. 3(b), the detection limit 13a is set above the end of the stage 14 located on the Z direction + side. This means that the capacitance detection range 13A matches the length Hz of the stage 14 measured along the Z direction. Under these circumstances, since the stage 14 and the capacitance detection range are in alignment over the ZX plane, an operation performed by the user 12 in the space above the stage 14 can be detected by the operation detector 13. It is to be noted that the size of the stage 14 over the ZX plane does not need to match the capacitance detection range and a capacitance detection range smaller than the stage 14 may be set or a capacitance detection range greater than the stage 14 may be set instead.

The midair image 30 is formed above the stage 14, at a position set apart from the operation detector 13 by a distance H1 toward the + side along the Z direction. The detection reference 40 is set at a position upward relative to the stage 14, set apart from the operation detector 13 by a distance H2 (H1<H2) toward the + side along the Z direction. The midair image 30 and the detection reference 40 are set so as to take positions within the electrostatic capacitance detection range 13A. It is to be noted that while the detection reference 40 in FIGS. 3(b) and 3(c) is set further toward the + side along the Z direction relative to the midair image 30, it may instead be set further toward the − side along the Z direction relative to the midair image 30 or may be set in exact alignment with the position of the midair image 30, as long as it takes a position within the electrostatic capacitance detection range 13A of the operation detector 13. A range outside the area set for the detection reference 40 within the detection range 13A will hereafter be referred to as a detection reference outside range 41.

It is to be noted that the detection reference control unit 204 may adjust the position of the detection reference 40 described above by allowing it to move along the Z direction within the detection range 13A. For instance, the detection reference control unit 204 may move the detection reference 40, set as shown in FIGS. 3(b) and 3(c), toward the + side or the − side along the Z direction based upon the results of calibration processing executed as will be described later. While the midair image 30 and the detection reference 40 are shown in FIGS. 3(b) and 3(c) as flat planes ranging parallel to the XY plane, they do not need to be flat planes but instead may be curved planes. In addition, the detection reference 40 may include stages, each corresponding to one of the icons 30A, as indicated in FIG. 3(d), instead of being formed as a flat plane. In other words, the distance between a given icon 30A and the part of the detection reference 40 corresponding to the particular icon may be different from the distance between another icon 30A and the part of the detection reference 40 corresponding to the other icon. A detection reference 40 that includes the stages described above, is particularly effective when the midair image 30 is a stereoscopic image and the positions of the plurality of icons 30A are offset relative to one another along the Z direction. For instance, the positions of detection references 40, each corresponding to one of the icons 30A, may be offset in correspondence to the offset with which the plurality of icons 30A in the stereoscopic midair image 30 are shifted along the Z direction so as to ensure that the distances between the icons 30A and the corresponding detection references 40 remain constant. In addition, the position of a detection reference 40 among the detection references 40, each set in correspondence to one of the plurality of icons 30A shown in FIG. 3(d), may be adjusted by moving it independently. Namely, when calibration processing has been executed based upon an operation performed for the icon 30A located at the left end in the drawing sheet on which FIG. 3(d) is presented, the detection reference control unit 204 may move the position of the detection reference 40 set in correspondence to the icon 30A at the left end of the drawing along the Z direction. At this time, the detection reference control unit 204 does not change the Z-direction positions of the detection references 40 set in correspondence to the other icons 30A (the icons 30A at the center and at the right end in the drawing in FIG. 3(d)).

When the fingertip of the user 12 has reached a point set apart from the operation detector 13 by the distance H2, the operation detector 13 outputs a detection output corresponding to the distance H2. Based upon the detection output provided by the operation detector 13, the detection reference control unit 204 decides that the position of the fingertip of the user 12 has matched the detection reference 40 and accordingly decides that an operation has performed with his fingertip at the display position of an icon 30A. Through this process, the display device 1 detects an operation performed by the user 12 at the display position of the particular icon 30A in the midair image 30 and executes a function corresponding to the icon 30A having been operated. For instance, it executes display image switchover at the display unit 11.

The icons 30A take positions set apart from the operation detector 13 by the distance H1. The icons 30A are displayed as part of the midair image 30 and for this reason, the visual perception of the display positions of the icons 30A in the midair image 30, i.e., the distance H1, of one user 12 may be different from that of another user 12. In addition, the visual perception of the display positions of the icons 30A of a given user 12 may change depending upon the environment in which he operates the display device 1. For instance, when the detection reference 40 is set so as to align with the position of the midair image 30, a user 12 may move his finger toward an icon 30A in the midair image 30 in order to perform an operation at the display position of the particular icon 30A. In this situation, the user 12 may feel that there is still some distance between his finger and the icon 30A (the finger is still located toward the + side along the Z direction) although the finger has, in fact, reached the icon 30A, i.e., the detection reference 40. Under such circumstances, an unintended icon operation will be executed. Another user 12 may move his finger toward an icon 30A in the midair image in order to perform an icon operation. This user 12 may feel that his finger has reached the icon 30A and that he is therefore, performing an operation at the display position of the icon 30A, even though his finger is actually still located further toward the + side along the Z direction relative to the icon 30A, i.e., the detection reference 40. In this case, no icon operation will be executed, contrary to the intention of the user 12. In either scenario, the user 12 is bound to feel that the response to his efforts at icon operation is poor.

In addition to a midair image operation mode that may be set when performing operations for the midair image 30, as described above, a calibration processing mode can be set in the display device 1 in the embodiment, so as to reduce the above feeling something wrong with the response to icon operations. The display device 1 set in the calibration processing mode adjusts the display position of an auxiliary image 31 on the stage 14 without altering the positional relationship between the midair image 30 and the detection reference 40, so as to create a perception in the user 12 as if the display position of the midair image 30 has moved along the Z direction (depthwise direction). Through these measures, the display device 1 allows the user 12 to alter the depthwise position at which he performs an icon operation so as to ensure that an icon operation performed by the user 12 will be detected at the position of the detection reference 40. The following is a detailed description of the calibration processing mode.

It is to be noted that the display device 1 in the calibration processing mode may adjust the display position for the auxiliary image 31 while also adjusting the positional relationship between the midair image 30 and the detection reference 40, instead of adjusting the display position of the auxiliary image 31 without adjusting the positional relationship between the midair image 30 and the detection reference 40.

As explained earlier, first and second calibration processing modes are available in the display device 1 in the embodiment. In the first calibration processing mode, calibration processing is executed while the midair image operation mode is not in effect, i.e., while midair image operation mode execution is not underway. In the second calibration processing mode, calibration processing is executed while the midair image operation mode execution, following startup of the display device 1, is underway. The processing in the first and second calibration processing modes is executed by the calibration unit 203 shown in FIG. 2.

The first or second calibration processing mode may be selected by the user 12 via a calibration processing mode selector operation button (not shown) located at the display device 1. The control unit 20 may select and execute the midair image operation mode if neither the first calibration processing mode nor the second calibration processing mode has been selected via the calibration processing mode selector operation button. In addition, if the display device 1 does not have a calibration processing mode selector operation button, the second calibration processing mode may be a default mode. The first calibration processing mode and the second calibration processing mode will now be described in that order. It is to be noted that the first or second calibration processing mode may be selected via an icon in the midair image instead of via an operation button.

The first calibration processing mode will be explained first. As the display device 1 is started up, the user 12 may operate the calibration processing mode selector operation button to select the first calibration processing mode. The calibration unit 203 in FIG. 2 starts the first calibration processing mode once the first calibration processing mode has been selected in response to the operation performed by the user 12. The image generation unit 201 generates display image data, and the display unit 11 brings up a display image to be used in calibration processing based upon the display image data. The image generation unit 201 generates auxiliary image data and the projector 15 projects an auxiliary image 31 onto the stage 14 based upon the auxiliary image data.

FIG. 4(a) is a schematic illustration presenting an example of a midair image 300 and an auxiliary image 31 in an initial display provided prior to the calibration processing. The midair image 300 includes a calibration icon 300A. The image generation unit 201 displays a message "Touch this icon for calibration", superimposed on the calibration icon 300A. It is to be noted that the image generation unit 201 does not necessarily have to display the message "Touch this icon for calibration" to start calibration processing. For instance, the user 12, having selected the calibration processing mode, may already be cognizant of a specific operation to be performed in the calibration processing mode and in such a case, the image generation unit 201 does not display the message.

In the embodiment, a shadow of the icon 300A is displayed as the auxiliary image 31. Namely, in the example described below, an image (hereafter will be referred to as a shadow image) equivalent to a shadow that would be formed as the icon 300A, assuming that it is a physical object actually present in midair, was illuminated from above (from a point located on the Y direction + side), is displayed. The shadow image may be regarded as an image that can be used as a cue with respect to the depthwise position of the icon 300A. In other words, the shadow image can be regarded as a depth cue for the icon 300A. The image generation unit 201 generates auxiliary image data expressing a condition in which an area of a shadow (hereafter will be referred to as a shadow area) corresponding to the shape of the icon 300A is formed, centered on the position of the icon 300A along the Z direction, i.e., a position set apart from the operation detector 13 by the distance H1. For instance, for an icon 300A assuming a prismatic shape, the image generation unit 201 will set the shadow area in a rectangular shape. For an icon 300A assuming a cylindrical column shape, on the other hand, the image generation unit 201 will set a circular shadow area. Furthermore, for a planar icon 300A, the image generation unit 201 will set a linear shadow area.

The projector 15, which is controlled by the projector control unit 200, projects projection light toward the stage 14 so as to render the area other than the shadow area brighter, in correspondence to the auxiliary image data having been generated by the image generation unit 201. As a result, a shadow image corresponding to the shadow area is displayed as an auxiliary image 31 on the stage 14 located further downward relative to the icon 300A (toward the Y direction − side) as shown in FIGS. 4(a) and 4(b). As explained above, the center of the shadow area in the auxiliary image data is formed at the position set apart from the operation detector 13 by the distance H1 and thus, the auxiliary image 31 is projected at the position set apart from the operation detector 13 by the distance H1 toward the + side along the Z direction. The user 12, looking at the midair image 300, ascertains the position of the icon 300A in the midair image 30, taken along the Z direction based upon the positional relationship between the midair image 300 and the auxiliary image 31, both displayed at positions set apart from the operation detector 13 by the distance H1. As a result, the user 12 perceives that the icon 300A is displayed at a position set apart from the operation detector 13 by the distance H1. In other words, the display device 1 allows the user 12 to perceive the depthwise position of the midair image 300 constituting a first display, i.e., the position of the detection reference 40, based upon the display position at which the auxiliary image 31 constituting a second display is displayed.

It is to be noted that a control unit that controls operations of the projector 15 and a generation unit that generates auxiliary image data may be built into the projector 15. In such a case, the generation unit may generate auxiliary image data expressing a condition in which a shadow area corresponding to the shape of the icon 300A is formed, centered on a position set apart from the operation detector 13 by the distance H1, as does the image generation unit 201 described earlier. In addition, the control unit that controls operations of the projector 15 may project an auxiliary image 31 by controlling an operation of the projector 15 based upon a control signal input thereto from the projector control unit 200 in the control unit 20.

FIG. 4(c) and FIG. 4(d) present an example in which the position at which the auxiliary image 31 is projected is adjusted toward the − side along the Z direction while the display positions at which the midair image 300 and the icon 300A are displayed remain unchanged from those in the initial display shown in FIG. 4(a) and FIG. 4(b). Namely, in this example, the image generation unit 201 has generated auxiliary image data with the shadow area shifted toward the − side along the Z direction and the projector 15 has adjusted the area over which the projection light is projected based upon the auxiliary image data. The midair image 300 brought up on display retains transmissivity, and for this reason, the user 12 is not able to recognize the position of the midair image 300 in a stable manner. In other words, the display position of the midair image 300 is visually recognized by the user 12 as unstable along the Z direction. Accordingly, the display device 1 brings up on display the auxiliary image 31, equivalent to a shadow, near the midair image 300 as a cue with respect to the display position of the midair image 300 so as to create a perception in the user 12 as if the midair image 300 is displayed along the Z direction at the position of the auxiliary image 31. The user 12 thus observes, based upon the positional relationship of the auxiliary image 31 to the midair image 300 and the icon 300A, that the icon 300A is located along the Z direction at the position taken by the auxiliary image 31 along the Z direction or a nearby position. This means that when the auxiliary image 31 is projected further away, as shown in FIG. 4(c) and FIG. 4(d), relative to the display position at which the midair image 300 and the icon 300A are displayed, viewed from the side where the user 12 is located, the user 12 perceives that the icon 300A in FIG. 4(c) is located at a position further toward the − side along the Z direction relative to that in the initial display.

FIG. 4(e) and FIG. 4(f) present an example in which the position at which the auxiliary image 31 is projected is adjusted toward the + side along the Z direction while the display positions at which the midair image 300 and the icon 300A are displayed remain unchanged from those in the initial display. Namely, the image generation unit 201 has generated auxiliary image data with the shadow area shifted toward the + side along the Z direction and the projector 15 has adjusted the area over which the projection light is projected based upon the auxiliary image data. In this situation, too, the user 12 observes, based upon the positional relationship of the auxiliary image 31 to the midair image 300 and the icon 300A, that the icon 300A is located along the Z direction at the position taken by the auxiliary image 31 along the Z direction or a nearby position. This means that when the auxiliary image 31 is projected further frontward, as shown in FIG. 4(e) and FIG. 4(f), relative to the display positions at which the midair image 300 and the icon 300A are displayed, viewed from the side where the user 12 is located, the user 12 perceives that the icon 300A in FIG. 4(e) is located at a position further toward the + side along the Z direction relative to that in the initial display.

It is to be noted that while the position of the auxiliary image 31 taken along the Z direction on the stage 14 is shifted by projecting, via the projector 15, auxiliary image data with the shadow area taking an adjusted position in the example described above, the present embodiment is not limited to this example. For instance, the projector 15 may be disposed so as to be allowed to move along the Z direction, with a low luminance projection area and a high luminance projection area set in advance on the display pixels in the projector 15. As such a projector 15 moves along the Z direction in correspondence to a displacement quantity representing an extent to which the auxiliary image 31 is to move, calculated as will be explained later, the position of the auxiliary image 31, too, will move. It is to be noted that the low luminance projection area may be an area over which the luminance is at zero, i.e., a totally dark area.

In reference to FIG. 5, the position of the finger of the user 12 relative to a midair image 300 and the display of an auxiliary image 31, brought up during the calibration processing, will be explained. FIG. 5(a) presents a sectional view, schematically illustrating a relationship among the operation detector 13, the midair image 300, the detection reference 40 and the position of a finger F.

The detection reference control unit 204 sets the detection reference 40 at a position near the midair image 300, e.g., a position slightly more toward the Z direction + side relative to the midair image 300, as indicated in FIG. 5(a). It will be obvious that the detection reference control unit 204 may instead set the detection reference 40 so as to align it with the midair image 300 or may set it at a position slightly more toward the Z direction − side relative to the midair image 300. In this situation, the display control unit 202 may bring up on display, for instance, the midair image 300 shown in FIG. 4(a).

The user 12, following the instructions in the message superimposed on the icon 300A in the midair image 300, moves his fingertip F toward the icon 300A in order to perform an operation at the display position of the icon 300A, as shown in FIG. 5(a). As the fingertip F, moving toward the Z direction − side, reaches the electrostatic capacitance detection range 13A of the operation detector 13 shown in FIG. 2, the operation detector 13 detects the movement of the fingertip F of the user 12 approaching the icon 300A, i.e., the movement toward the − side along the Z direction, as a change in the electrostatic capacitance. At this time, the control unit 20 ascertains the position at which the user operation is being performed, detected by the operation detector 13 in the detection reference outside range 41.

FIG. 5(b) shows the fingertip F having moved further toward the − side along the Z direction and having reached a position indicated by a dotted line 50 located slightly more toward the + side along the Z direction than the detection reference 40. It is assumed that the user 12, feeling that his fingertip F has reached the display position of the icon 300A and has performed an operation of "touching" (as if to press down) the icon 300A, has then moved the fingertip F toward the + side along the Z direction by a predetermined distance. The operation detector 13 detects the movement of the fingertip F toward the −side along the Z direction described above, i.e., the fingertip F pressing on the icon 300A, and the subsequent reverse movement by the predetermined distance as changes in the electrostatic capacitance. Once the operation detector 13 detects the fingertip F pressing on the icon 300A and the subsequent reverse movement of the fingertip F by the predetermined distance as described above, the detection reference control unit 204 decides that an operation has been performed at the display position of the icon 300A. It is to be noted that the furthest reach position to which the fingertip F of the user 12 moves inward (toward the − side along the Z direction) in order to press on the icon 300A for an operation at the display position of the icon 300A before the fingertip F moves in the reverse direction by the predetermined distance will be referred to as a reach position. Namely, the position indicated by the dotted line 50 will be referred to as the reach position.

If the reach position 50 is located closer to the user 12 (toward the + side along the Z direction) relative to the detection reference 40 as shown in FIG. 5(b), the operation detector 13 cannot detect the fingertip F of the user 12 at the detection reference 40. In this situation, the reach position 50 must move closer to the midair image 300, i.e., toward the − side along the Z direction, compared to the position shown in FIG. 5(b), in order for the fingertip F of the user 12 to be detected at the detection reference 40. In this embodiment, the display of the auxiliary image 31 is adjusted so as to lead the user 12 to move his fingertip F, that is the reach position 50, toward the − side along the Z direction in comparison to the position indicated in FIG. 5(b). Namely, in order to create a perception in the user 12 that a midair image 300' and an icon 300A' are located at the position indicated by the two-point chain line in FIG. 5(b), an auxiliary image 31' indicated by a dotted line in the figure is displayed on the stage 14 so as to guide the fingertip F of the user 12 toward the − side along the Z direction relative to the position indicated in the figure. The image generation unit 201 adjusts the projection position at which the auxiliary image 31 is projected further downward relative to the icon 300A displayed as shown in FIG. 4(a), to the projection position indicated in FIG. 4(c). The image generation unit 201 generates auxiliary image data with the shadow area shifted toward the Z direction − side, and the projector 15 changes the area over which it projects the projection light based upon the auxiliary image data. Namely, the image generation unit 201 controls the direction along which the auxiliary image 31 is to move based upon the positional relationship between the position at which the operation performed by the user 12 is detected and the detection reference 40. This means that the image generation unit 201 executes display control for altering the display mode for the auxiliary image 31 constituting the second display image relative to the icon 300 constituting the first display image, based upon the positional relationship ascertained via the operation detector 13.

Through the process described above, the image generation unit 201 adjusts the projection position of the auxiliary image 31 so that the user 12 experiences a perception that the display position of the icon 300A has moved along a direction determined based upon an operation performed by the user 12 to press on the icon 300A. It is to be noted that the user 12 performing a pressing operation does not need to move his finger strictly along the Z direction. Even when the user 12 performs a pressing operation at an angle relative to the Z axis, if a Z-direction component is included in the direction of the pressing operation by the user, the control unit 20 may decide that the user 12 has performed a pressing operation. In response, the image generation unit 201 may adjust the display position of the auxiliary image 31 so as to create a perception in the user 12 as if the display position of the icon 300A has moved along the Z direction, i.e., the direction determined based upon the pressing operation.

It is to be noted that the image generation unit 201 may adjust the projection position of the auxiliary image 31 based upon a pressing operation performed by the user 12 so as to create a perception in the user 12 as if the display position of the icon 300A has moved along a direction matching that of the pressing operation performed by the user 12, determined based upon the pressing operation.

The image generation unit 201 determines a displacement quantity representing the extent to which the shadow area is to move based upon the amount of offset between the detection reference 40 and the reach position 50, i.e., based upon the distance between them along the Z direction. The correlation of the distance between the detection reference 40 and the reach position 50 to the displacement quantity for the shadow area is determined in advance based upon the results of testing and the like and is stored as correlation data in the storage unit 205. The image generation unit 201 determines the displacement quantity for the shadow area by referencing the correlation data. The displacement quantity for the shadow area thus determined is stored into the storage unit 205.

It is to be noted that the displacement quantity for the shadow area described above is determined so that it increases/decreases based upon an increase/decrease in the distance between the reach position 50 and the detection reference 40. The displacement quantity of the shadow area may be determined so as to increase/decrease linearly based upon an increase/decrease in the distance between the reach position 50 and the detection reference 40 or may instead be determined so that they increase/decrease in steps each corresponding to an increase/decrease by a predetermined extent in the distance between the reach position 50 and the detection reference 40. Furthermore, the displacement quantity of the shadow area may be determined so that it is changed by a predetermined fixed value regardless of the distance between the reach position 50 and the detection reference 40. In such a case, the predetermined value may be selected by the user 12.

Figure 4:
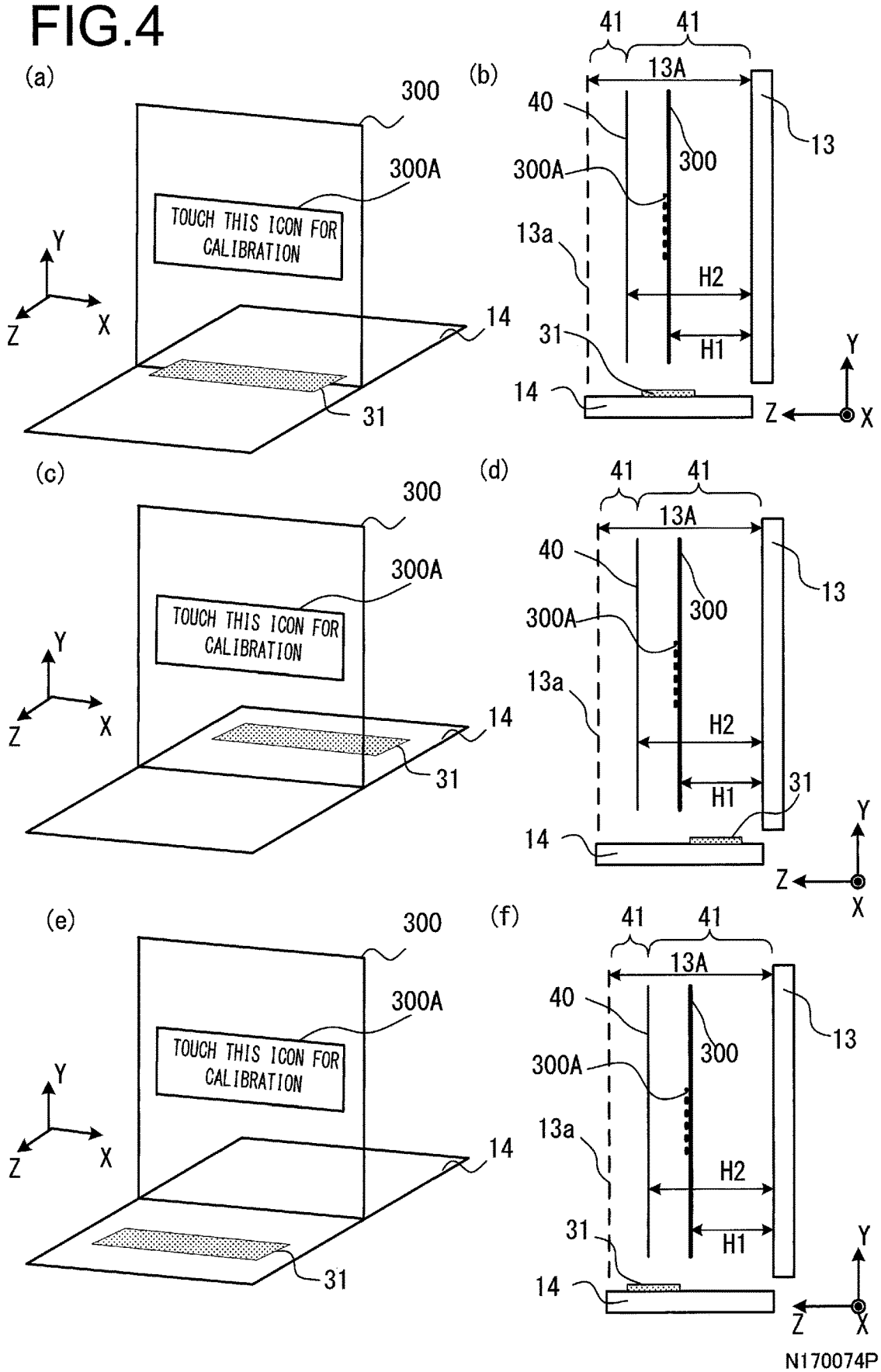
FIG. 4 A schematic presentation of a midair image displayed for purposes of calibration processing in the first embodiment in illustrations indicating the relationship between auxiliary image display position adjustment and depth perception FIG. 5 Illustrations of the calibration processing executed in the first embodiment in sectional views, each indicating the relationship among the operation detector, the midair image, the detection reference and the finger position in (a), (b), (c) and (d)

As the projection position at which the auxiliary image 31 is projected on the stage 14 is adjusted as shown in FIG. 4(*c*) through the process described above, the user 12 experiences a perception as if the icon 300A has moved toward the − side along the Z direction, i.e., along a direction running further away from the user 12. In other words, the user 12 experiences a perception that the midair image 300 and the icon 300A, which actually remain unmoved along the Z direction, have moved to the position indicated by the two-point chain line in FIG. 5(*b*). The user 12, perceiving as if the icon 300A is now displayed at a position further away from himself, is expected to perform an operation with respect to the icon 300A by positioning his fingertip F further toward the − side along the Z direction. As a result, the reach position 50 of the fingertip F of the user 12 will move further toward the − side along the Z direction relative to the reach position 50 shown in FIG. 5(*b*), and the reach position 50 will arrive at the detection reference 40 as indicated in FIG. 5(*c*). Consequently, the operation detector 13 will be able to detect the fingertip F of the user 12 at the detection reference 40 and the control unit 30 will be able to ascertain the position of the user operation detected at the detection reference 40.

In the example described above, the reach position 50 of the finger is closer to the user (toward the + side along the Z direction) relative to the detection reference 40 and, as a result, the user operation cannot be detected at the detection reference 40. When the reach position 50 is located further from the user (toward the − side along the Z direction) relative to the detection reference 40 and the user operation thus cannot be detected at the detection reference 40, too, the detection reference control unit 204 determines the reach position 50 and the image generation unit 201 adjusts the position of the shadow area based upon the reach position 50 thus determined, in much the same way as that described above. The positional relationship between the reach position 50 and the detection reference 40 under such circumstances is illustrated in FIG. 5(*d*). In this situation, the reach position 50 must move closer to the user 12, i.e., closer to the Z direction + side, compared to the position shown in FIG. 5(*d*), in order for the fingertip F of the user 12 to be detected at the detection reference 40. This means that in order for the user to perceive that a midair image 300' and an icon 300A' are located at the position indicated with the two-point chain line in FIG. 5(*d*), the fingertip F of the user 12 is guided further toward the + side along the Z direction relative to the position indicated in the figure by displaying an auxiliary image 31' indicated with the dotted line in the figure on the stage 14. The image generation unit 201 adjusts the projection position at which the auxiliary image 31 is projected as shown in FIG. 4(*a*) to the projection position indicated in FIG. 4(*e*). The image generation unit 201 generates auxiliary image data with the shadow area shifted toward the + side along the Z direction, and the projector 15 changes the area over which it projects the projection light based upon the auxiliary image data. Namely, the image generation unit 201 controls the direction along which the auxiliary image 31 is to move based upon the positional relationship between the position at which the operation performed by the user 12 is detected and the detection reference 40.

In this case, too, the image generation unit 201 determines a displacement quantity for the shadow area based upon the amount of offset between the detection reference 40 and the reach position 50, i.e., based upon the distance between them along the Z direction. The displacement quantity for the shadow area thus determined is stored into the storage unit 205. With the projection position of the auxiliary image 31 adjusted as indicated in FIG. 4(*e*), the display device 1 is able to create a perception in the user 12 as if the icon 300A has moved toward the + side along the Z direction, i.e., closer to the user 12. The user 12, perceiving as if the icon 300A is now displayed at a position closer to himself, is expected to perform an operation with respect to the icon 300A by positioning his fingertip F further toward the + side along the Z direction. Consequently, the reach position 50 of the fingertip F of the user 12 will move further toward the + side along the Z direction relative to the reach position 50 shown in FIG. 5(*d*), and the reach position 50 will arrive at the detection reference 40 as indicated in FIG. 5(*c*). As a result, the operation detector 13 will be able to detect the fingertip F of the user 12 at the detection reference 40.

The image generation unit 201 adjusts the projection position of the auxiliary image 31 so as to create a perception in the user 12 that the display position of the icon 300A has moved along a direction opposite from the direction determined based upon the pressing operation performed by the user 12 to press down on the icon 300A. It is to be noted that the user performing a pressing operation does not need to move his finger strictly along the Z direction. Even when the user 12 performs a pressing operation at an angle relative to the Z axis, as long as a Z-direction component is included in the direction of the pressing operation by the user 12, the control unit 20 decides that the user has performed a pressing operation. In response, the image generation unit 201 may adjust the projection position of the auxiliary image 31 so as to create a perception in the user 12 as if the display position of the icon 300A has been altered along the Z direction, i.e., the direction determined based upon the pressing operation.

It is to be noted that the image generation unit 201 may adjust the projection position of the auxiliary image 31 based upon a pressing operation performed by the user 12 so that a user perception is created as if the display position of the icon 300A has been altered along a direction opposite that of the pressing operation performed by the user 12, determined based upon the pressing operation.

It is also to be noted that when the reach position 50 is at the detection reference 40, too, the detection reference control unit 204 determines the reach position 50 in the same way as that described above. However, since the reach position 50 is at the detection reference 40, the image generation unit 201 does not adjust the projection position for the shadow area to create a perception in the user 12 as if the depthwise position of the icon 300A has changed.

In addition, when the reach position 50 is further away from the user (toward the − side along the Z direction) relative to the detection reference 40, the fingertip F will have passed through the detection reference 40 before the fingertip F reaches the reach position 50. In this situation, the detection reference control unit 204 decides that the finger has reached the detection reference 40 based upon the detection output provided by the operation detector 13.

However, the image generation unit 201 does not switch the display at the display unit 11 in the first calibration processing mode. Likewise, when the reach position 50 is aligned with the detection reference 40, the image generation unit 201 does not switch the display at the display unit 11 either. It will be obvious that when the fingertip F has moved to reach the detection reference 40, the image generation unit 201 may notify the user 12 that the fingertip F has reached the detection reference 40 with, for instance, a highlighted display of the icon 300A by flashing the icon 300A.

While the user 12 presses on the icon 300A as an operation performed at the display position of the icon 300A in the example described above, the present embodiment is not limited to this example. Namely, when the operation detector 13 has detected a predetermined non-contact operation performed by the user 12 in relation to the icon 300A, the image generation unit 201 may adjust the position of the shadow area based upon the location where the predetermined non-contact operation was performed, i.e., based upon the position at which the predetermined non-contact operation has been detected by the operation detector 13. The predetermined non-contact operation may be performed by the user 12 by making a gesture as if to touch the icon 300A. In response, the image generation unit 201 may adjust the position of the shadow area based upon the position at which the user 12 has made the gesture of touching the icon 300A. The operation performed by the user 12 making a gesture of touching the icon 300A may be, for instance, a gesture of swiping the icon 300A with his hand. In addition, the position at which the user 12 has performed the operation by making a gesture of touching the icon 300A may be determined based upon the position at which the hand of the user 12, having made the swiping gesture, is determined to have become still or based upon the position at which the user 12 has started making the swiping gesture.

Furthermore, the user 12 may perform the predetermined non-contact operation by moving his finger F further away (toward the Z direction − side) by a distance L1, then making a U-turn and moving it back (toward the Z direction + side) by the distance L1. Namely, the predetermined non-contact operation in this instance follows a U-turn trajectory with the traveling distance over which the finger moves away from the user and the traveling distance over which the finger moves back toward the user match each other. Moreover, the predetermined non-contact operation may follow a trajectory in the shape of the letter V instead of a U. Additionally, the predetermined non-contact operation may be performed by first advancing the finger F away from the user by the distance L1 and then bringing it back by the distance L1 along the advancing locus. Alternatively, the traveling distance L1 away and the traveling distance L1 back in the predetermined non-contact operation may be different from each other. Namely, the predetermined non-contact operation simply needs to be performed by moving the finger back toward the user continuously after it has been moved away from the user.

Furthermore, the user 12 may perform the predetermined non-contact operation by first moving the finger F away from himself by the distance L1 and then holding the finger F still over a predetermined length of time, or by first moving the finger F away from himself by the distance L1 and then moving the finger F laterally over at least a predetermined distance L2.

The predetermined non-contact operations that may be performed are not limited to those represented by the various trajectories of the finger F described above and the user may perform a non-contact operation that follows another trajectory as long as the trajectory of movement (the trajectory of the movement of the finger F or a hand) can be detected by the operation detector 13. It is to be noted that an optimal detection position, corresponding to a given predetermined non-contact operation, may be set as the predetermined non-contact operation detection position for the operation detector 13. For instance, when the user 12 performs the predetermined non-contact operation by moving his finger F away from himself by the distance L1 and making a U-turn and moving his finger F back toward himself by the distance L1, the most advanced position (furthest toward in the Z direction − side) at which the U-turn is made may be designated as the non-contact operation detection position. In another example, the predetermined non-contact operation detection position may be set at a point halfway through the distance L1.

It is to be noted that the method through which the reach position 50 is determined by the detection reference control unit 204 is not limited to that described above, in which the reach position 50 is determined based upon the shift from the advancing movement to the retreating movement by the predetermined distance and it may be determined through any of the various other methods to be described below. For instance, the user 12, perceiving that his fingertip F, having reached the display position of the icon 300A, has pressed on the icon 300A, may stop moving his finger toward the Z direction − side, i.e., may stop pressing on the icon 300A. In this case, the detection reference control unit 204 may decide that the finger has stopped pressing on the icon when there is no longer any significant change in the value of the electrostatic capacitance detected by the operation detector 13, and may determine, i.e., decide, the position at which the finger has stopped pressing on the icon as the reach position 50. It is to be noted that it may decide that the movement toward the Z direction − side has stopped when the value of the electrostatic capacitance detected by the operation detector 13 has remained unchanged for a short span of time of, for instance, 0.1 sec through 1 sec. In another method, the detection reference control unit 204 may detect the velocity vector of the movement of the finger of the user 12, i.e., the finger movement velocity and the finger movement direction, based upon a change in the electrostatic capacitance. Based upon the change in the electrostatic capacitance, the detection reference control unit 204 may detect that the direction of the finger velocity vector has changed from the direction running toward the Z direction − side to the direction running toward the Z direction + side, and as the velocity vector along the direction running toward the Z direction + side reaches a predetermined level, the detection reference control unit 204 may designate the position of the finger at the point at which the velocity vector toward the Z direction + side achieves the predetermined level, as the reach position 50. If the predetermined level for the velocity vector is set substantially equal to 0, the position taken by the finger when the direction of the velocity vector shifts from the direction running toward the Z direction − side to the direction running toward the Z direction + side, i.e., the most advanced position taken by the finger, will be determined to be the reach position. If, on the other hand, the predetermined level is set to a value other than 0 in this method, a position taken by the finger, set apart from the most advanced position by a predetermined distance along the reverse direction is designated as the reach position 50. As explained above, the reach position 50 is set at the most advanced position or at a position near the most advanced position taken by the fingertip F as the finger is judged by the detection reference control unit 204 to have performed an operation.

In addition, the detection reference control unit 204 determines the reach position in reference to the part of the finger or the stylus appearing to come in contact with the icon 300A in the midair image 300, i.e., the position of the fingertip or the position of the tip of the stylus in the example presented above. As an alternative, the detection reference control unit 204 may determine the reach position in reference to the position of the fingernail tip of the finger of the user 12 or in reference to the position of the first joint of the finger. Furthermore, the icon may be operated with the user's foot or elbow instead of the finger of the user 12, and in such a case, the detection reference control unit 204 may determine the reach position in reference to the foot or the elbow. When the icon operation is performed via a stylus, a specific position on the stylus may be marked and the detection reference control unit 204 may determine the reach position in reference to the marked position. It is desirable that when the reach position is determined in reference to the position of the first joint of the finger, the position of a mark on the stylus or the like, the operation detector 13 be configured with an image-capturing device or the like, such as that to be described later in reference to variation 8 of the first embodiment, instead of the capacitive panel.

Moreover, while the detection reference 40 is a single plane or multiple planes defined in stages in the description provided above, the detection reference 40 may be formed as a zone with a predetermined depth present between a front plane (located toward the + side along the Z direction) and a rear plane (located toward the − side along the Z direction). In such a case, the rear plane of the detection reference 40 may be set closer to the user (toward the + side along the Z direction) relative to the midair image 30, the front plane may be set further away from the user (toward the − side along the Z direction) relative to the midair image 30, or the detection reference 40 may be set so that the midair image 30 is positioned between the front plane and the rear plane. In conjunction with this detection reference, the detection reference control unit 204 is able to make an even more reliable decision regarding the operation performed at the display position. For instance, the finger may move from a position diagonally offset from the icon 30A instead of from a point directly in front of the icon 30A, along the Z axis. In such a case, if the detection reference 40 is a planar reference such as that shown in FIG. 3, the finger may not pass through the detection reference 40 in an area thereof corresponding to the position of the icon 30A and instead may pass through an area beside the detection reference 40. Under such circumstances, the detection reference control unit 204 may not be able to make a decision regarding the operation performed by the finger at the display position of the icon 30A. However, a detection reference 40 having a predetermined thickness enables the detection reference control unit 204 to detect the finger entering the detection reference 40 with high reliability even when the finger moves from a diagonally offset point. In addition, even when the finger moves parallel to the midair image 30 to perform an operation at the display position of the icon 30A, too, the detection reference control unit 204 is able to detect with high reliability that the finger has entered the detection reference 40 since it has a predetermined thickness.

It is to be noted that if the predetermined non-contact operation is not performed within the detection reference 40 having a predetermined thickness, as described above, the detection reference control unit 204 makes a decision that the predetermined non-contact operation has not been performed. For instance, the user 12 may perform the predetermined non-contact operation by first moving his finger F away from himself by a predetermined distance L1, then making a U-turn and moving the finger F back toward himself by the distance L1. However, the user 12 having moved his finger F away from himself by the distance L1 within the detection reference 40 may only move the finger F toward himself over a distance short of the distance L1. In such a case, the detection reference control unit 204 makes a decision that the predetermined non-contact operation has not been performed by the user 12.

Based upon the results of the calibration processing executed in the first calibration processing mode as described above, the display position of the auxiliary image 31 on display in the midair image operation mode as shown in FIG. 3(a) is adjusted.

Figure 6:
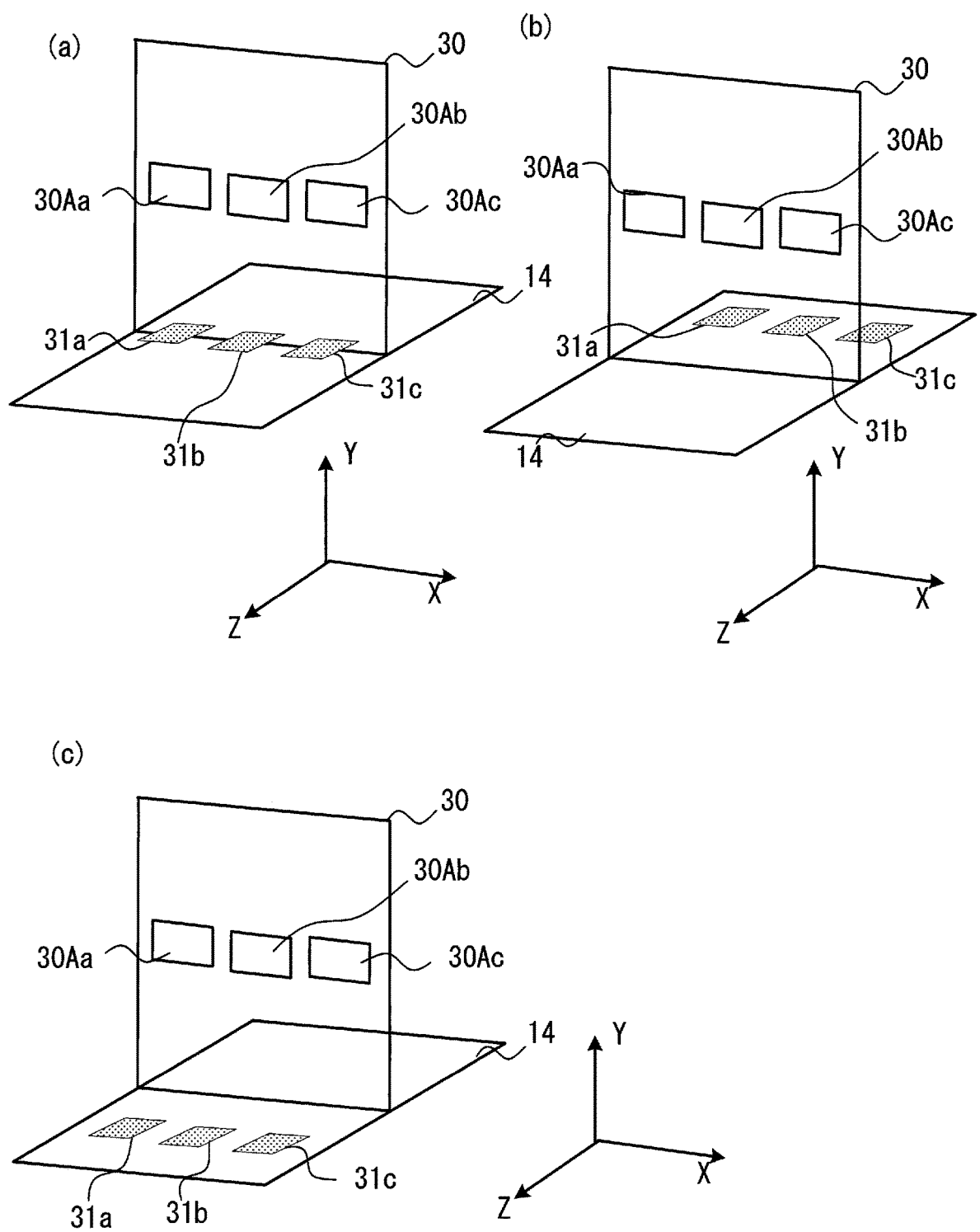
FIG. 6 A schematic presentation of a midair image brought up on display in a midair image operation mode following the calibration processing FIG. 7 A flowchart of the calibration processing executed in a first calibration processing mode in the first embodiment FIG. 8 An illustration indicating a positional relationship among the midair image, the detection reference and the reach position to which the finger reaches, that may be observed in a second calibration processing mode in the first embodiment FIG. 9 A flowchart of the calibration processing executed in the second calibration processing mode in the first embodiment FIG. 10 A schematic presentation of a relationship between an icon and the display mode for an auxiliary image in variation 1 of the first embodiment FIG. 11 A schematic presentation of a relationship between an icon and the display mode for an auxiliary image in another example of variation 1 of the first embodiment FIG. 12 A block diagram showing the essential configuration of the display device in another example of variation 1 of the first embodiment FIG. 13 A schematic presentation of a relationship between an icon and the display mode for an auxiliary image in another example of variation 1 of the first embodiment FIG. 14 A schematic presentation of a relationship between an icon and the display mode for an auxiliary image in another example of variation 1 of the first embodiment FIG. 15 A schematic presentation of a relationship between an icon and the display mode for an auxiliary image in another example of variation 1 of the first embodiment FIG. 16 A schematic presentation of a relationship between an icon and the display mode for an auxiliary image in another example of variation 1 of the first embodiment FIG. 17 A block diagram showing the essential configuration of the display device in variation 2 of the first embodiment FIG. 18 Illustrations of the calibration processing executed in variation 2 of the first embodiment, each indicating the relationship among the operation detector, the midair image, the detection reference and the finger position in sectional views, in (a) and (b)

FIG. 6 shows a midair image 30 and auxiliary images 31 on display in the midair image operation mode, which reflect the results of the calibration processing executed in the first calibration processing mode, as described above. FIG. 6(a), similar to FIG. 3(a), shows a midair image 30 and auxiliary images 31 in the initial display. In FIG. 6(a), the icons 30A disposed over one row by three columns are assigned, starting from the left side in the drawing, with reference signs 30Aa, 30Ab and 30Ac. In addition, the auxiliary images 31, each corresponding to one of the icons 30Aa, 30Ab and 30Ac, are respectively assigned with reference signs 31a, 31b and 31c.

FIG. 6(b) shows a midair image 30 and auxiliary images 31 reflecting the results of calibration processing executed when the reach position 50 is closer to the user relative to the detection reference 40 (see FIG. 5(b)). Namely, the display positions for the auxiliary images 31a through 31c have been shifted toward the − side along the Z direction so as to create a perception as if the icons 30A have moved along a direction running away from the user 12. As a result, the user 12 is expected to perform an operation so that the reach position 50 will be located further toward the − side along the Z direction than that in the first calibration processing mode.

FIG. 6(c) shows a midair image 30 and auxiliary images 31 reflecting the results of calibration processing executed when the reach position 50 is further away from the user than the detection reference 40 (see FIG. 5(d)). Namely, FIG. 6(c) shows a midair image 30 and auxiliary images 31 with the display positions of the auxiliary images 31a through 31c adjusted so as to create a perception as if the icons 30A have moved closer to the user 12. The user 12, experiencing such a perception, is expected to perform an operation with the reach position 50 shifted further toward the + side along the Z direction in comparison to that taken in the first calibration processing mode.

Through the process described above, the auxiliary images 31 are projected by adjusting the positions at which they are projected under the icons 30A in the midair image operation mode based upon the distance between the operation position at which the user 12 has performed the operation and the detection reference 40 having been detected in the first calibration processing mode. In other words, the display device 1 alters the display position of the midair image 30, i.e., the positional relationship between the detection reference 40 and the auxiliary images 31, by controlling the positions of the auxiliary images 31.

It is to be noted that while the image generation unit 201 adjusts the display positions of the auxiliary images 31a, 31b and 31c in correspondence to all of the plurality of icons 30Aa, 30Ab and 30Ac based upon the results of the calibration processing in the example presented in FIG. 6, the present embodiment is not limited to this example. The image generation unit 201 may adjust the display position for at least one of the auxiliary images 31 among the auxiliary images 31a through 31c corresponding to the plurality of icons 30Aa through 30Ac, or it may individually adjust the display positions of the auxiliary images 31a, 31b and 31c by reflecting the results of the calibration processing in correspondence to the individual icons 30Aa, 30Ab and 30Ac.

The relationship between the first calibration processing mode described above and the midair image operation mode will be described in reference to the flowchart presented in FIG. 7. After the display device 1 is started up, the processing is executed in the steps in the flowchart presented in FIG. 7 based upon a program by the control unit 20. The program is stored in the storage unit 205.

In step S1, the first calibration processing mode, selected by the user 12 via the calibration processing mode selector operation button, is recognized as the selected mode, and then the operation proceeds to step S2. In step S2, the calibration unit 203 shown in FIG. 2 starts the first calibration processing mode before the operation proceeds to step S3. In step S3, the image generation unit 201 generates display image data for a calibration display image, the display control unit 202 brings up on display at the display unit 11 the calibration image based upon the display image data and the detection reference control unit 204 sets the detection reference 40 at a predetermined initial position. Concurrently, the image generation unit 201 generates image data for an auxiliary image 31 and the projector 15 projects the auxiliary image 31 onto a projection area 140 so that a first range 311 of the auxiliary image 31 is positioned under an icon 300A, as shown in FIG. 4(a). The display image at the display unit 11 is the calibration midair image 300 in FIG. 4(a) generated via the image-forming optical system 9. The midair image 300 includes the icon 300A, and the message "Touch this icon for calibration". In step S4, the operation detector 13 detects a movement of the fingertip F of the user 12 toward the Z direction − side, and the operation proceeds to step S5.

In step S5, the detection reference control unit 204 shown in FIG. 2 makes a decision, based upon the detection output provided by the operation detector 13, as to whether or not the finger has reached the reach position 50. If an affirmative decision is made in step S5, i.e., if it is decided that the finger has reached the reach position 50, the operation proceeds to step S6. If a negative decision is made in step S5, i.e., if it is decided that the finger has not become still, the operation waits in standby until an affirmative decision is made. In step S6, the image generation unit 201 generates auxiliary image data by adjusting the position of the shadow area based upon the distance between the reach position 50 and the detection reference 40. In addition, the image generation unit 201 stores data indicating the displacement quantity with respect to the extent to which the shadow area has been moved into the storage unit 205 shown in FIG. 2, before the operation proceeds to step S7.

In step S7, the operation exits the first calibration processing mode and proceeds to step S8. In step S8, the midair image operation mode is started, and the operation then proceeds to step S9. In step S9, the midair image 30 for the midair image operation mode shown in FIG. 8, which includes an icon 30A, is displayed. At this time, the image generation unit 201 reads out the data indicating the shadow area displacement quantity for the shadow area having been stored into the storage unit 205 in step S6, from the storage unit 205. Based upon the data thus read out, the image generation unit 201 generates auxiliary image data for the midair image operation mode and the projector 15 projects an auxiliary image 31 onto the stage 14 based upon the auxiliary image data. Through this process, a midair image 30 is brought up on display in the midair image operation mode with the positional relationship between the icon 30A and the auxiliary image 31 optimized for the operation characteristics of the user 12 through the first calibration processing mode.

As the user 12 moves his finger toward the midair image 30 along the Z direction in order to perform an operation at the display position of the icon 30A, the operation detector 13 shown in FIG. 2 detects the movement of the finger away from the user 12 in step S10, and then the operation proceeds to step S11. In step S11, the detection reference control unit 204 makes a decision based upon the detection output divided by the operation detector 13 as to whether or not the finger has reached the detection reference 40. If an affirmative decision is made in step S11, i.e., if it is decided that the finger has reached the detection reference 40, the operation proceeds to step S12. If a negative decision is made in step S11, i.e., if it is decided that the finger has not reached the detection reference 40, the operation waits in standby until an affirmative decision is made. In step S12, the display control unit 202 switches the display image at the display unit 11 to a display image corresponding to the icon 30A having been operated, and then the operation proceeds to step S13. In step S13, a decision is made as to whether or not an operation has been performed to stop the display device 1. If an affirmative decision is made in step S13, i.e., if an operation has been performed to stop the display device 1, the display device 1 stops. If a negative decision is made in step S13, however, the operation returns to step S10.

While the first calibration processing mode is executed immediately after the display device 1 is started up so as to precede the midair image operation mode in the example described above, the first calibration processing mode may instead be executed following the midair image operation mode. For instance, the user 12, having experienced frustration while performing an operation at the display position of an icon 30A in the midair image operation mode, may operate the calibration processing mode selector operation button at the display device 1 in order to select the first calibration processing mode. In this case, the first calibration processing mode is executed by interrupting the midair image operation mode that is underway and the midair image operation mode is then resumed after the first calibration processing mode ends. It is to be noted that while the display device 1 selects the first calibration processing mode in response to an operation of the operation button by the user 12 in the example described above, the calibration unit 203 may instead implement the first calibration processing mode upon detecting signs of annoyance experienced by the user 12, which is likely attributable to difficulty in performing an operation at the display position of the icon 30A. The display device 1 may, for instance, detect the pulse rate of the user 12 (biometric information) and a pulse rate exceeding a predetermined value may be determined to be a sign of user frustration.

Next, the second calibration processing mode will be described in reference to FIG. 8 and FIG. 9. It is to be noted that the processing described earlier in reference to the first calibration processing mode may also be executed, as appropriate, in the second calibration processing mode described below.

Figure 8:
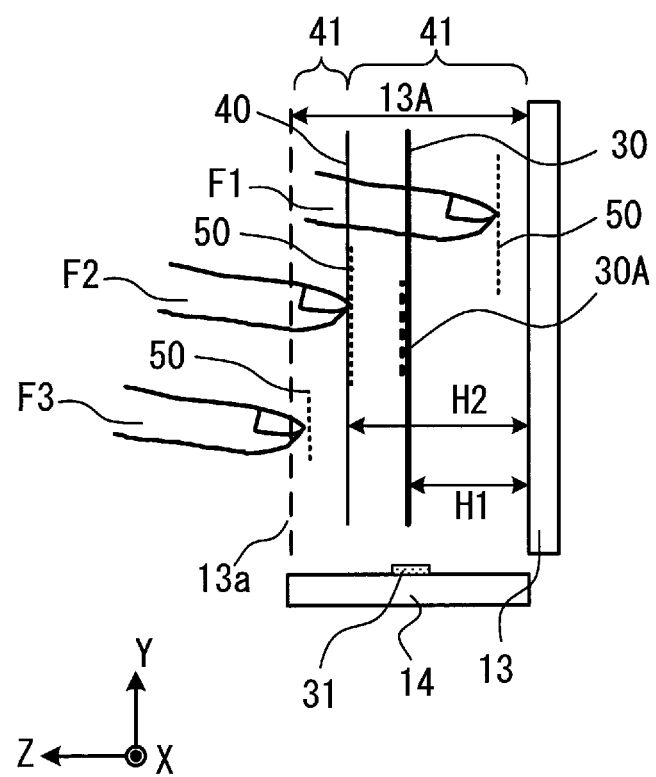
Figure 9:
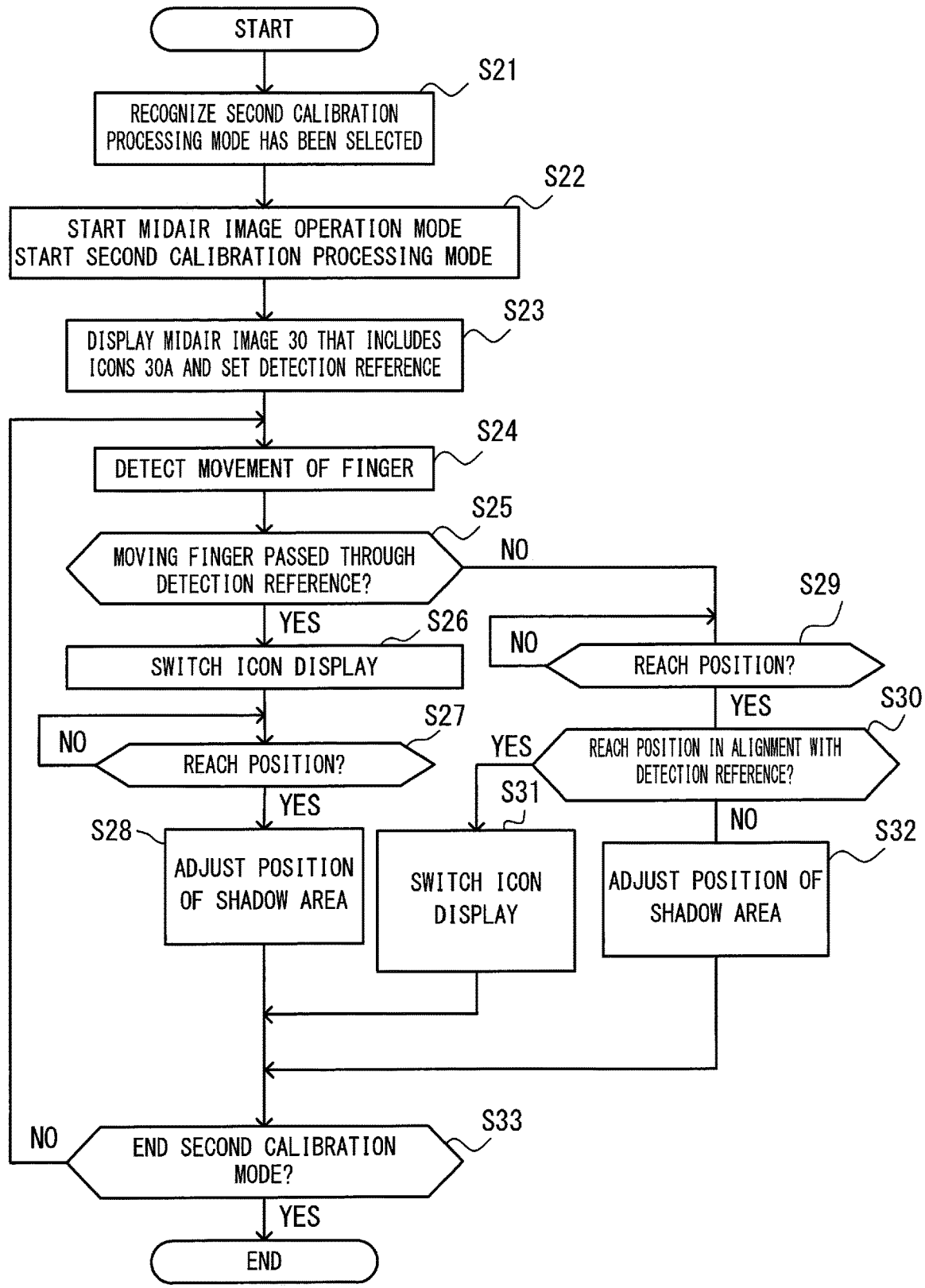

FIG. 8 illustrates a midair image 30 for the midair image operation mode, the detection reference 40 and the reach position 50 to which the fingertip F reaches, whereas FIG. 9 presents a flowchart of the operation executed in the second calibration processing mode. The processing is executed in the steps in the flowchart presented in FIG. 9, by the control unit 20 based upon a program, following startup the display device 1.

In step S21, the second calibration processing mode is recognized as the selected mode, and then the operation proceeds to step S22. In step S22, the midair image operation mode and the second calibration processing mode start concurrently, before the operation proceeds to step S23. In step S23, the midair image 30 shown in FIG. 3, which includes the icons 30A, is displayed and the detection reference control unit 204 in FIG. 2 sets the detection reference 40 at a predetermined initial position, e.g., at the position taken by the midair image 30 or at a position slightly more toward the Z direction + side relative to the position taken by the midair image 30, before the operation proceeds to step S24. At this time, the projector 15 projects auxiliary images 31 at positions corresponding to the initial positions of the icons 30A, i.e., at positions set apart from the operation detector 13 by a distance H1 toward the + side along the Z direction. In addition, a message "Calibration executed during icon operation" is briefly displayed in the midair image 30. However, it is not essential that this message be displayed.

In step S24, as the user 12 moves his finger toward the − side along the Z direction in order to perform an operation at the display position of an icon 30A, the operation detector 13 starts detection of finger movement, and then the operation proceeds to step S25. In step S25, the detection reference control unit 204 makes a decision based upon the detection output provided by the operation detector 13 as to whether or not the finger moving toward the − side along the Z direction has passed through the detection reference 40. If an affirmative decision is made in step S25, i.e., if the finger moving toward the − side along the Z direction has passed through the detection reference 40 and has moved further toward the − side along the Z direction, the operation proceeds to step S26. F1 in FIG. 8 indicates the finger having passed through the detection reference 40 during its movement toward the − side along the Z direction. In step S26, the detection reference control unit 204, having decided that the finger F1 has reached the detection reference 40, i.e., it has passed through the detection reference 40, executes icon display switchover so as to switch the midair image 30 in correspondence to the icon 30A having been operated, and then the operation proceeds to step S27. In step S27, the detection reference control unit 204 makes a decision as to whether or not the finger F1 has reached the reach position 50, and if an affirmative decision is made, the operation proceeds to step S28, whereas if a negative decision is made, the operation is held until an affirmative decision is made. In step S28, the image generation unit 201 adjusts the display position of the shadow area based upon the distance between the reach position 50 and the detection reference 40, and then the operation proceeds to step S33. In more specific terms, the image generation unit 201 generates auxiliary image data with the shadow area taking an adjusted position so that an auxiliary image 31 corresponding to the shadow area is positioned further toward the + side along the Z direction (toward the user 12) as illustrated in FIG. 4(d). The projector 15 projects the auxiliary image 31, expressed based upon the auxiliary image data having been generated, onto the stage 14.

It is to be noted that if the detection reference control unit 204 detects in step S28 that the reach position 50 is not located further toward the − side along the Z direction beyond a predetermined range relative to the detection reference 40 by comparing the reach position 50 and the position of the detection reference 40, the image generation unit 201 does not need to adjust the projection position of the auxiliary image 31. As an alternative, the image generation unit 201 may set the extent to which the projection position of the auxiliary image 31 is adjusted (the displacement quantity for the auxiliary image 31) to 0 (in other words, the projection position of the auxiliary image 31 may remain substantially unchanged).

If a negative decision is made in step S25, i.e., if the finger moving toward the − side along the Z direction has not passed through the detection reference 40, the operation proceeds to step S29. In step S29, the detection reference control unit 204 makes a decision based upon the detection output provided by the operation detector 13 as to whether or not the fingertip F has reached the reach position 50, and if an affirmative decision is made, the operation proceeds to step S30. If, on the other hand, a negative decision is made, the operation is held until an affirmative decision is made. A finger F2 in FIG. 8 indicates that the reach position 50 is in alignment with the detection reference 40. In step S30, the detection reference control unit 204 makes a decision based upon the detection output provided by the operation detector 13 as to whether or not the reach position 50 is in alignment with the detection reference 40, and if an affirmative decision is made, the operation proceeds to step S31, whereas if a negative decision is made, the operation proceeds to step S32. In step S31, icon display switchover is executed since the reach position 50 is in alignment with the detection reference 40 without adjusting the shadow area, before the operation proceeds to step S33.

It is to be noted that the detection reference control unit 204 may decide that the reach position 50 is at the detection reference 40 even when the reach position 50 is not exactly in alignment with the detection reference 40, e.g., when the reach position 50 is detected within the predetermined range from the detection reference 40. In such a case, the detection reference control unit 204 may make a decision in step S25 in FIG. 9 as to whether or not the reach position 50 is located further downward relative to the predetermined range from the detection reference 40. Then, if the reach position 50 is located further downward beyond the predetermined range from the detection reference 40, an affirmative decision will be made in step S25 and the operation will proceed to step S26. In addition, the detection reference control unit 204 may make a decision in step S30 as to whether or not the reach position 50 is located within the predetermined range relative to the detection reference 40. In this case, if the reach position 50 is located within the predetermined range from the detection reference 40, an affirmative decision will be made in step S30 and the operation will proceed to step S31.

In step S32, with the reach position 50 located toward the + side along the Z direction relative to the detection reference 40 as indicated by a finger F3 in FIG. 8, the image generation unit 201 adjusts the position of the shadow area based upon the distance between the reach position 50 and the detection reference 40. More specifically, the image generation unit 201 generates auxiliary image data with the shadow area taking an adjusted position so that an auxiliary image 31 corresponding to the shadow area is positioned toward the − side along the Z direction (toward the side opposite from the user 12) as illustrated in FIG. 4(c). The projector 15 projects the auxiliary image 31 corresponding to the auxiliary image data having been generated onto the stage 14. In step S33, a decision is made as to whether or not an end operation has been performed in order to exit the second calibration processing mode, and if an affirmative decision is made, the second calibration processing mode is terminated, whereas if a negative decision is made, the operation returns to step S24.

In the second calibration processing mode described above, which is executed concurrently while the midair image operation mode is underway, the user 12 is able to perform an operation at the display position of the midair image 30 by using the detection reference 40 optimized for the user 12 without having to be aware that calibration processing is also in progress. It is to be noted that the first/second calibration processing mode selection does not necessarily need to be made by the user 12 and instead, the display device 1 may automatically select either the first calibration processing mode or the second calibration processing mode. In addition, it is not essential that both the first calibration processing mode and the second calibration processing mode be made available and only one of these calibration processing modes may be available.

In addition, while the image generation unit 201 in the first embodiment adjusts the position of the auxiliary image 31 so as to create a perception in the user 12 as if the display position of the icon 30A has changed along the Z axis, the present embodiment is not limited to this example. For instance, the image generation unit 201 may adjust the position of the auxiliary image 31 so as to create a perception in the user 12 as if the display position of an icon 30A has moved along the optical axis of the image-forming optical system 9 instead. Namely, the image generation unit 201 in the embodiment may adjust the position of the auxiliary image 31 so as to create a perception in the user 12 as if the auxiliary image 31 has moved along a direction other than the direction running perpendicular to the optical axis of the image-forming optical system 9. Accordingly, the image generation unit 201 may move the auxiliary image 31 along a direction that contains a component extending along the optical axis of the image-forming optical system 9.

It is to be noted that the projector control unit 200 in the display device 1 in the first embodiment as described above may control the luminance of an auxiliary image 31 projected via the projector 15 based upon the light in the environment surrounding the display device 1. In such a case, an illuminance sensor or the like, capable of detecting the brightness in the surrounding environment, will be installed in the body 10 of the display device 1. It is to be noted that the role of the illuminance sensor may be filled by the photo metering function of a camera. If the environment surrounding the display device 1 is brightly lit with sunlight, artificial lighting or the like, a first range 311 of the auxiliary image 31 projected by the projector 15 will not be readily visible to the user 12. Accordingly, if the environment surrounding the display device 1 is bright, the luminance of a second range 312 of the image projected by the projector 15 will be raised so as to render the darker first range 311 readily visible to the user 12.

In this situation, the projector control unit 200 increases/decreases the luminance of the projection light for the range corresponding to the second range 312 based upon an increase/decrease in the ambient light detected via the illuminance sensor. The projector control unit 200 may control the projection light so that its luminance increases/decreases linearly based upon an increase/decrease in the ambient light or may control the projection light so that its luminance increases/decreases in steps, each corresponding to an increase/decrease in the ambient light by a predetermined extent. In addition, the projector control unit 200 may control the luminance of the projection light over the range corresponding to the second range 312 when the level of the ambient light exceeds a predetermined value.

It is to be noted that the present embodiment is not limited to an example in which the luminance of the light projected by the projector 15 is controlled based upon the ambient light. For instance, the luminance for the light projected by the projector 15 may be set based upon an operation performed by the user 12 and the projector control unit 200 may control the luminance of the projection light based upon the setting selected through the operation performed by the user 12. In such a case, the user 12 is able to set a luminance level for light projected by the projector 15 by operating an operation button disposed at the body 10 of the display device 1. It is to be noted that the display device 1 may display this operation button as a midair image.

Furthermore, when the projector 15 projects projection light with high luminance, the bright projection light may make it more difficult for the user 12 to view a midair image 30 or 300. Under such circumstances, the display control unit 202 will increase/decrease the luminance of the display image brought up on display at the display unit 11 based upon an increase/decrease in the luminance of the light projected by the projector 15. The display control unit 202 may control the luminance of the display image so that it increases/decreases linearly based upon an increase/decrease in the projection light or it may control the luminance of the display image so that it increases/decreases in steps, each corresponding to an increase/decrease in the luminance of the projection light by a predetermined extent. In addition, the display control unit 202 may control the luminance of the display image displayed at the display unit 11 when the luminance of the projection light exceeds a predetermined value.

It is to be noted that when a luminance level for light projected by the projector 15 is set based upon an operation performed by the user 12 as explained above, the display control unit 202 will be able to control the luminance of the display image at the display unit 11 based upon the selected luminance setting.

It is to be noted that the display control unit 202 may control the luminance of the display image based upon the light in the environment surrounding the display device 1 instead of based upon the luminance of the projection light. Namely, the display control unit 202 may control the luminance of the display image at the display unit 11 based upon an increase/decrease in the light in the surrounding environment.

It is also to be noted that while a shadow image is used as an auxiliary image 31 in the example explained in reference to the first embodiment, an image other than a shadow image may be used as an auxiliary image 31. For instance, an image of a stage, a table, a desk or the like, upon which an object may be placed, can be displayed as an auxiliary image 31 to be used as a cue indicating the position of the midair image 30. When such an auxiliary image 31 is displayed under the midair image 30, the user 12 may experience a perception as if the midair image 30 is placed upon the auxiliary image 31. Thus, even if the position of the auxiliary image 31 is moved, the user 12 will perceive as if the midair image 30 is set at the position of the auxiliary image 31.

It is to be noted that, as will be explained later in reference a fourth embodiment, the user 12 is more likely to perceive that a midair image 30 is displayed at the position of an auxiliary image 31 if the auxiliary image 31 expresses an object closely related to the midair image 30. As will be explained in detail later, an auxiliary image 31 and a midair image 30 closely related to each other are an object represented by an auxiliary image 31 and an object represented by a midair image 30 typically located close to each other, installed adjacent to each other, configured as one with each other or the like in the real world. It is to be noted that when an image of a shadow cast by a midair image 30 is displayed as the auxiliary image 31 as has been explained in reference to the first embodiment, the auxiliary image 31 and the midair image 30 are deeply related with each other.

The image generation unit 201 in the first embodiment adjusts the display mode for an auxiliary image 31 constituting a second image based upon an operation detected by the operation detector 13. In more specific terms, the image generation unit 201 adjusts the positional relationship between the detection reference 40, used in detection of an operation performed by the user 12 for a midair image 30 or 300, and an auxiliary image 31 displayed at a position different from the display position of the midair image 30 or 300, by controlling the auxiliary image 31. As a result, the position of the user operation will be adjusted based upon the auxiliary image 31 displayed at the adjusted position, which will make it possible to detect an operation performed by the user 12 at the detection reference 40.

In addition, the image generation unit 201 in the first embodiment controls the auxiliary image 31 based upon an operation performed by the user 12. Thus, since the operation performed by the user 12 is reflected in the auxiliary image 31, the accuracy of the calibration processing can be improved.

The image generation unit 201 in the first embodiment determines the direction along which the auxiliary image 31 is to move based upon the positional relationship between the reach position 50 of the operation performed by the user 12 and the detection reference 40. Through these measures, it is ensured through the calibration processing that the reach position 50 of the operation performed by the user 12 arrives at the detection reference 40.

Furthermore, the image generation unit 201 in the first embodiment moves the auxiliary image 31 along a direction determined based upon an operation performed by the user 12 or along a direction opposite from the direction determined based upon the operation performed by the user 12. Thus, it becomes possible to detect the user operation at the detection reference 40 by leading the user 12 to adjust the position at which he performs an operation along the Z direction.

It is to be noted that when the user 12 performs a pressing operation, the image generation unit 201 moves the auxiliary image 31 along a direction determined based upon the pressing operation performed by the user 12 or along the direction opposite from the direction determined based upon the pressing operation. Through these measures, it is ensured that the user operation can be detected at the detection reference 40 by leading the user 12 to adjust the position at which he performs the pressing operation.

Moreover, the image generation unit 201 in the first embodiment moves the display position of the auxiliary image 31 along a direction determined based upon an operation performed by the user 12 when the operation performed by the user 12 does not reach the detection reference 40 (see FIG. 5(b)). Namely, a perception is created in the user 12 as if the position of the icon 30A or 300A has been adjusted to move further away from the user 12. Since this leads the user 12 to perform an operation at a position further toward the − side along the Z direction, it is ensured that the operation performed by the user 12 reaches the detection reference 40.

In addition, the image generation unit 201 in the first embodiment moves the display position of the auxiliary image 31 along the direction opposite from the direction determined based upon an operation performed by the user 12 when the user operation has reached the detection reference (see FIG. 5(d)). Namely, a perception is created in the user 12 as if the position of the icon 30A or 300A has been adjusted to move closer to the user 12. Since this leads the user 12 to perform an operation at a position closer to the user 12, it is ensured that the user 12 performs the operation at the detection reference 40.

Moreover, the image generation unit 201 in the first embodiment controls the auxiliary image 31 based upon the icon 30A or 300A. As a result, the user 12, recognizing that the icon 30A or 300A is related to the auxiliary image 31, is able to perceive the position of the icon 30A or 300A by using the auxiliary image 31 as a cue.

The image generation unit 201 in the first embodiment generates an auxiliary image 31 which is darker (i.e., an image equivalent to a shadow or a shade) than the icon 30A or 300A. As a result, the user 12 is able to perceive the position of the icon 30A or 300A with ease by using the auxiliary image 31 as a cue.

In addition, the image generation unit 201 in the first embodiment displays the auxiliary image 31 further down relative to the icon 30A or 300A (further toward the Y direction − side). As a result, the user 12 is able to perceive the position of the icon 30A or 300A with ease by using the auxiliary image 31 as a cue.

(Variation 1 of the First Embodiment)

An example in which a shadow image is generated as an auxiliary image 31 and the position at which the auxiliary image 31 is projected on the stage 14 is adjusted based upon the results of calibration processing has been explained in reference to the first embodiment. In variation 1, examples of display modes that can be adjusted for a shadow image displayed as an auxiliary image 31 will be described.

<1. Adjustment of the Size of the Auxiliary Image 31>

Figure 10:
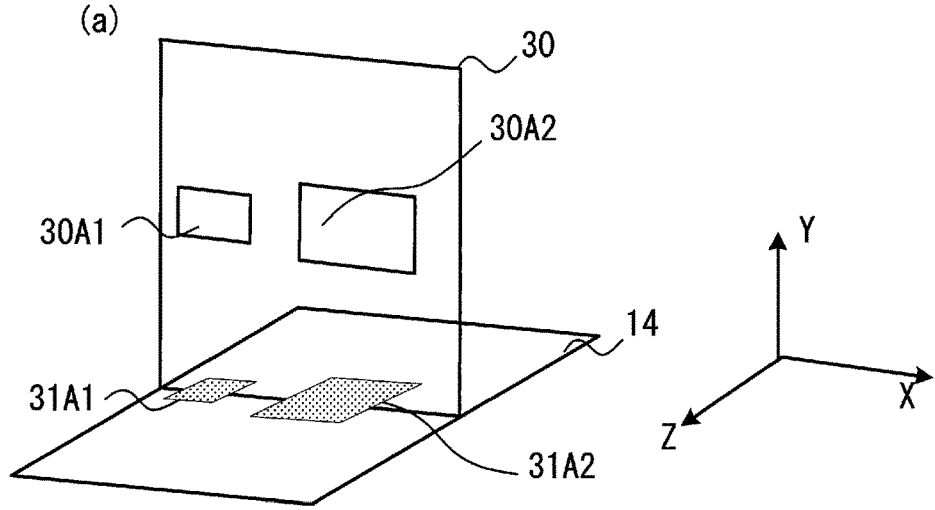
Figure 10:
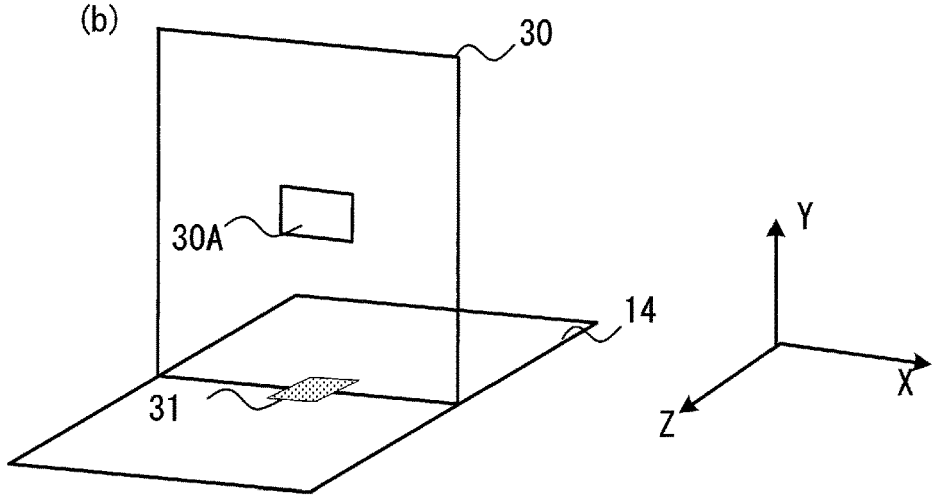
Figure 10:
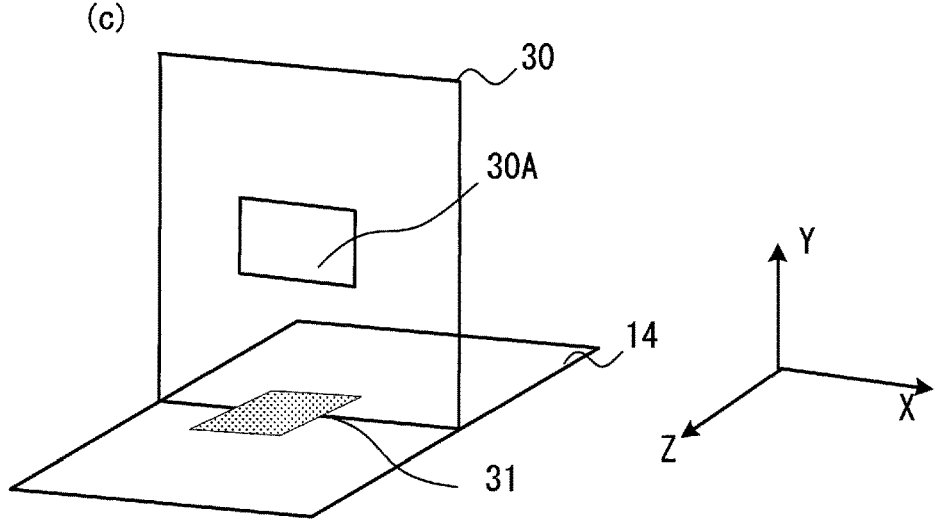

The image generation unit 201 may adjust the size of an auxiliary image 31, i.e., the size of a shadow image, based upon the size of an icon 30A. For instance, a midair image 30 corresponding to the midair image operation mode may include two icons 30A1 and 30A2, as illustrated in FIG. 10(a). The icon 30A2 is larger than the icon 30A1 in FIG. 10(a). In this situation, the image generation unit 201 generates auxiliary image data by setting shadow areas so that an auxiliary image 31A2 corresponding to the icon 30A2 is greater, i.e., has a greater area than an auxiliary image 31A1 corresponding to the icon 30A1.

In addition, when an initial display of an icon 30A and an auxiliary image 31 in FIG. 10(b) is switched to a display with the icon 30A taking a different size, the image generation unit 201 may adjust the size of the auxiliary image 31 based upon the change in the size of the icon 30A. For instance, if the size of the icon 30A is increased, the image generation unit 201 generates auxiliary image data with a greater shadow area based upon the rate of increase in the size of the icon 30A, as illustrated in FIG. 10(c). As the projector 15 projects an auxiliary image 31 corresponding to the auxiliary image data, the auxiliary image 31 with a greater area in comparison to that of the auxiliary image 31 in the initial display is projected at a position under the icon 30A, as shown in FIG. 10(c).

It is to be noted that the image generation unit 201 may generate display image data for an auxiliary image 31 by adjusting its size as described above and also by moving its display position as has been described in reference to the first embodiment in combination.

The image generation unit 201 in variation 1 of the first embodiment adjusts the size of the auxiliary image 31 based upon the size of the icon 30A. As a result, the user 12, recognizing that the icon 30A is related to the auxiliary image 31, is able to perceive the position of the icon 30A by using the auxiliary image 31 as a cue.

<2. Adjustment of the Luminance of the Auxiliary Image 31>

The image generation unit 201 may generate auxiliary image data expressing an auxiliary image 31 with altered luminance based upon the display position at which the icon 30A is displayed along the Y direction. Generally speaking, the shadow of a physical object is lighter when the distance between the physical object and the surface on which the shadow is formed, measured along the vertical direction, is greater, and the shadow is darker when the distance is smaller. The image generation unit 201 simulates this phenomenon in the relationship between the midair image 30 and the auxiliary image 31 by controlling the density, i.e., the lightness, of the shadow area.

Figure 11:
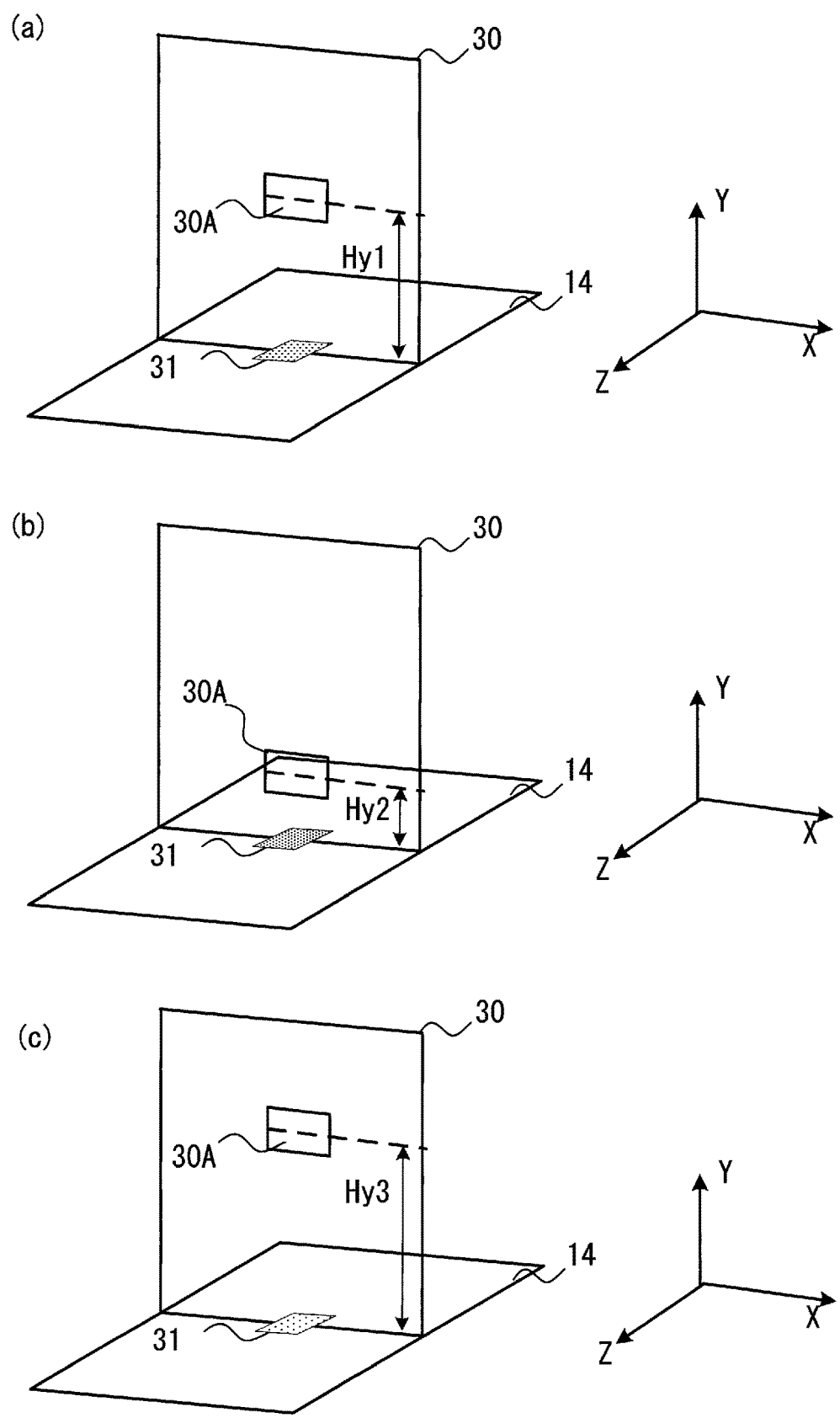

FIG. 11(a) shows an icon 30A and an auxiliary image 31 in an initial display. The distance between the icon 30A and the stage 14 measured along the Y direction, is Hy1. In this situation, the image generation unit 201 generates auxiliary image data by setting the luminance of the shadow area at, for instance, 50% of the luminance of the area other than the shadow area and thus adjusting the degree of sharpness. FIG. 11(b) shows the icon 30A displayed at a position shifted further toward the Y direction – side compared to the display position taken in the initial display. The distance between the icon 30A and the stage 14 measured along the Y direction in this condition, is Hy2 (<Hy1). The image generation unit 201 generates auxiliary image data based upon the difference (Hy1–Hy2) from the distance Hy1 between the icon 30A and the stage 14 corresponding to the initial display data by setting the luminance of the shadow area to a value lower than that representing its luminance in the initial display and thus adjusting the degree of sharpness. As a result, an auxiliary image 31 that is darker than that in the initial display is projected by the projector 15 at a position below the icon 30A. It is to be noted that the dots in the auxiliary image 31 in FIG. 11(b) are distributed at a higher density than the density of dots in the auxiliary image in FIG. 11(a) to indicate that the luminance of the auxiliary image 31 has been lowered.

FIG. 11(c) shows the icon 30A displayed at a position shifted further toward the Y direction + side compared to the display position taken in the initial display. The distance between the icon 30A and the stage 14 measured along the Y direction in this condition, is Hy3 (>Hy1). The image generation unit 201 generates auxiliary image data based upon the difference (Hy3–Hy1) from the distance Hy1 between the icon 30A and the stage 14 corresponding to the initial display by setting the luminance of shadow area to a value higher than that representing its luminance in the initial display. As a result, an auxiliary image 31 that is brighter than that in the initial display is projected by the projector 15 at a position below the icon 30A. It is to be noted that the dots in the auxiliary image 31 in FIG. 11(b) are distributed with a lower density than the density of dots in the auxiliary image in FIG. 11(a) to indicate that the luminance of the auxiliary image 31 has been lowered.

It is to be noted that the image generation unit 201 adjusts the luminance of the auxiliary image 31 in the example described above. The image generation unit 201 may instead generate display image data by adjusting the luminance of the auxiliary image 31, by adjusting the size of the auxiliary image 31 as explained earlier and by moving the display position of the auxiliary image 31 as has been explained in reference to the first embodiment in an optimal combination.

The image generation unit 201 in variation 1 of the first embodiment controls the display mode for the auxiliary image 31 based upon the display position at which the icon 30A is displayed. For instance, the image generation unit 201 controls the display mode for the auxiliary image 31 based upon the position of the icon 31A along the Y direction. Through these measures, it is ensured that the user 12 is able to recognize that the icon 30A and the auxiliary image 31 are related to each other.

The image generation unit 201 in variation 1 of the first embodiment controls the luminance of the auxiliary image 31 when the position of icon 30A is altered. In other words, it simulates the relationship between a physical object that exists in the real world and a shadow formed by the physical object by using the auxiliary image 31, thereby making it possible for the user 12 to recognize the relationship between the icon 30A and the auxiliary image 31.

In addition, the image generation unit 201 in variation 1 of the first embodiment displays the auxiliary image 31 with higher luminance if the distance between the icon 30A and the auxiliary image 31 is increased. This means that it simulates the phenomenon whereby a shadow becomes lighter as the distance between a physical object that actually exists and the surface where its shadow is formed increases by using the auxiliary image 31, thereby making it possible for the user 12 to recognize the relationship between the icon 30A and the auxiliary image 31.

<3. The Auxiliary Image 31 Tracks the Movement of the Midair Image 30>

Figure 12:
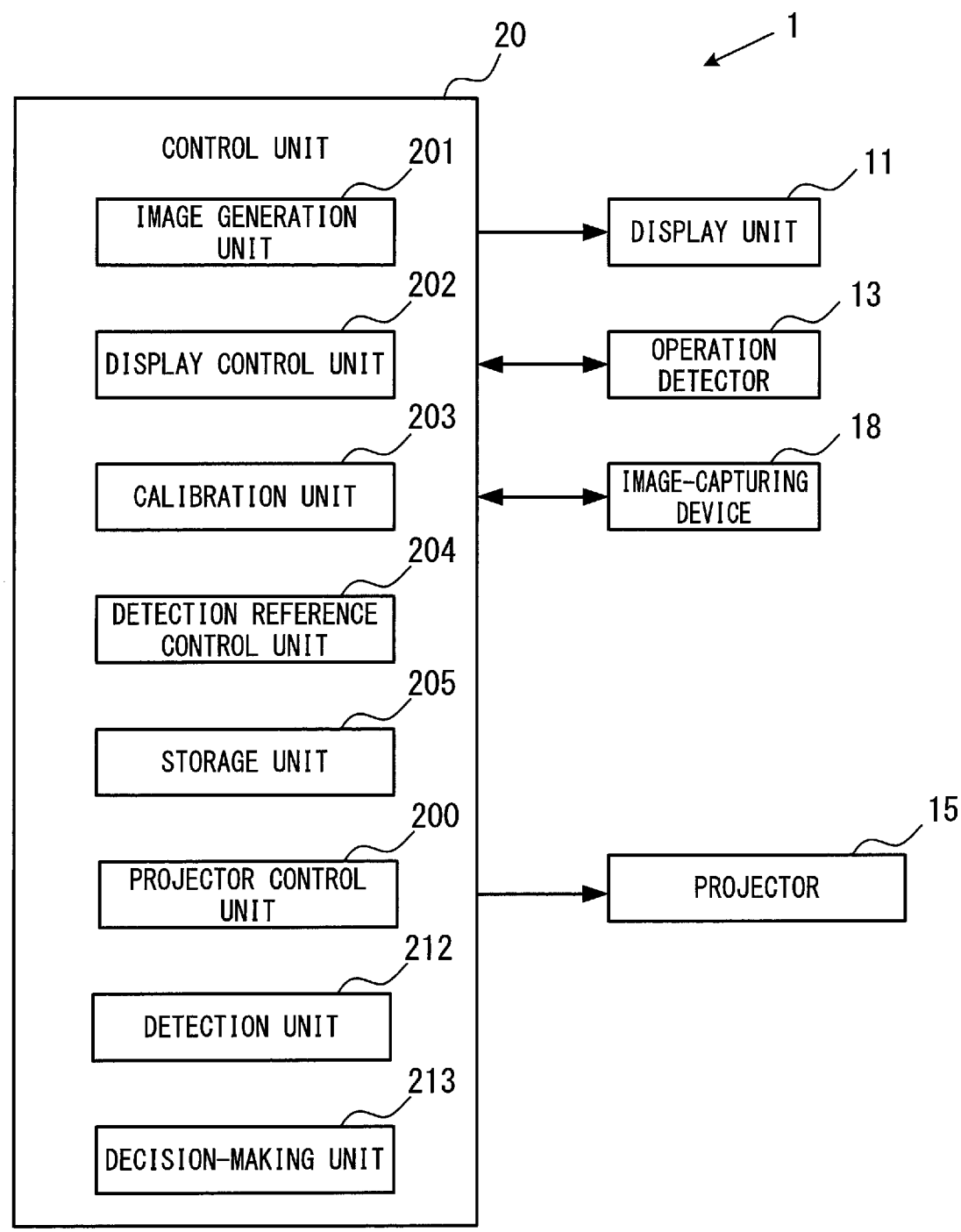

When the display position of the icon 30A changes, the image generation unit 201 may generate auxiliary image data expressing an auxiliary image 31 moving over the stage 14 by tracking the movement of the icon 30A. In this case, in response to a specific gesture made by the user 12, the display device 1 moves the midair image 30 (icon 30A) in line with the gesture. Such a display device 1 adopts an essential configuration shown in the block diagram in FIG. 12. Namely, the display device 1 comprises a control unit 20, and an image-capturing device 18, a display unit 11, an image-forming optical system 9, an operation detector 13 and a projector 15, which are controlled by the control unit 20. The image-capturing device 18 may adopt a structure similar to that of the image-capturing device included in the display device 1 in variation 8 of the first embodiment, which will be described in detail later. The control unit 20 includes a detection unit 212 and a decision-making unit 213 in addition to the structural components of the control unit 20 in the display device 1 in the first embodiment shown in FIG. 2. The detection unit 212 detects a gesture made by the user 12 by using a plurality of sets of image capturing data generated by the image-capturing device 18. The decision-making unit 213 determines a direction along which and an extent by which the midair image 30 is to move based upon the detected gesture.

A user 12, looking at a midair image 30 formed by the display device 1 and wishing to move the position of the midair image 30, makes a predetermined specific gesture. The user 12, making the predetermined specific gesture may, for instance, wave his hand or arm to the right (e.g., toward the X direction + side), may flick his finger or his hand by first moving it toward the display device 1 and then flicking it along a specific direction (toward the X direction + side) or may perform a swipe gesture by moving his finger or hand so as to run it along a specific direction (toward the X direction + side) if he wishes to move the position of the midair image 30 to the right (e.g., toward the X direction + side). Furthermore, the user 12, looking at the midair image 30 and wishing to move it closer to himself (e.g., toward the + side along the Z direction) may pull his arm, having been extended forward, back toward himself or may make a hand gesture toward himself as if to beckon the midair image 30.

The detection unit 212 determines through detection as to whether or not the user 12 recorded in image capturing data has made the gesture described above based upon the image capturing data generated through an image capturing operation at the image-capturing device 18. Once it is determined through detection at the detection unit 212 that the gesture has been made, the decision-making unit 213 determines the direction along which and the extent by which the midair image 30 is to move. In this situation, if the user 12 has made the gesture by waving his hand or arm to the right (toward the X direction + side), the decision-making unit 213 decides that the midair image 30 is to move toward the X direction + side, toward which the hand or arm of the user 12 has moved. The decision-making unit 213 determines a displacement quantity, i.e., the extent by which the midair image 30 is to move, in correspondence to the extent by which the hand or arm has moved during the gesture. Namely, if the user 12 has waived his hand or arm by a small extent, the decision-making unit 213 sets a small displacement quantity for the midair image 30, whereas if the user 12 has waived his hand or arm by a great extent, it sets a great displacement quantity for the midair image 30. Alternatively, the decision-making unit 213 may move the midair image 30 from the current position to a position set apart by a predetermined displacement quantity. This means that the midair image 30 will move by a fixed displacement quantity regardless of the magnitude of the gesture made by the user 12. In this situation, if the midair image 30 does not move to the position desired by the user 12, the user 12 will repeatedly make similar gestures until the midair image 30 moves to the desired position.

The image generation unit 201 generates display image data based upon the direction along which and the extent by which the midair image 30 is to move, having been determined by the decision-making unit 213 and also generates auxiliary image data by adjusting the position of the shadow area based upon the direction of movement and the displacement quantity described above. As a result, the midair image 30 moves over the XY plane based upon the gesture made by the user 12 and the auxiliary image 31 is projected by the projector 15 so as to move over the stage 14 located under the midair image 30 by tracking the movement of the midair image 30. Namely, the shadow image constituting the auxiliary image 30 moves over the stage 14 under the midair image 30 while tracking the movement of the midair image 30.

It is to be noted that the image generation unit 201 moves the auxiliary image 31 by tracking the movement of the midair image 30 in the example described above. As an alternative, the image generation unit 201 may generate display image data by adjusting the luminance of the auxiliary image 31 as described earlier, by adjusting the size of the auxiliary image 31 as described earlier and by moving the display position of the auxiliary image 31 as has been explained in reference to the first embodiment, as well as by moving the auxiliary image 31 in an optimal combination.

When the position of the icon 30A is changed, the image generation unit 201 in variation 1 of the first embodiment adjusts the position of the auxiliary image 31 so as to track the position of the icon 30A. As a result, the user 12 is able to perceive the position of the icon 30A along the Z direction even when the icon 30A has moved.

<4. The Shape of the Auxiliary Image 31 Altered Based Upon Movement of the Midair Image 30 Along the Y Direction>

The image generation unit 201 may generate auxiliary image data based upon the display position of the icon 30A along the Y direction so that the size or the shape of the auxiliary image 31 is altered. Generally speaking, a shadow of a physical object becomes larger and its edges become more blurred (its shape changes) as the distance between the object and the surface on which the shadow is cast, measured along the vertical direction, increases, whereas the shadow becomes smaller and its edges become sharper (its shape changes) as the distance measured along the vertical direction decreases. The image generation unit 201 simulates this phenomenon in the relationship between the midair image 30 and the auxiliary image 31 by controlling the size and the extent of blur at the edges of the shadow area.

Figure 13:
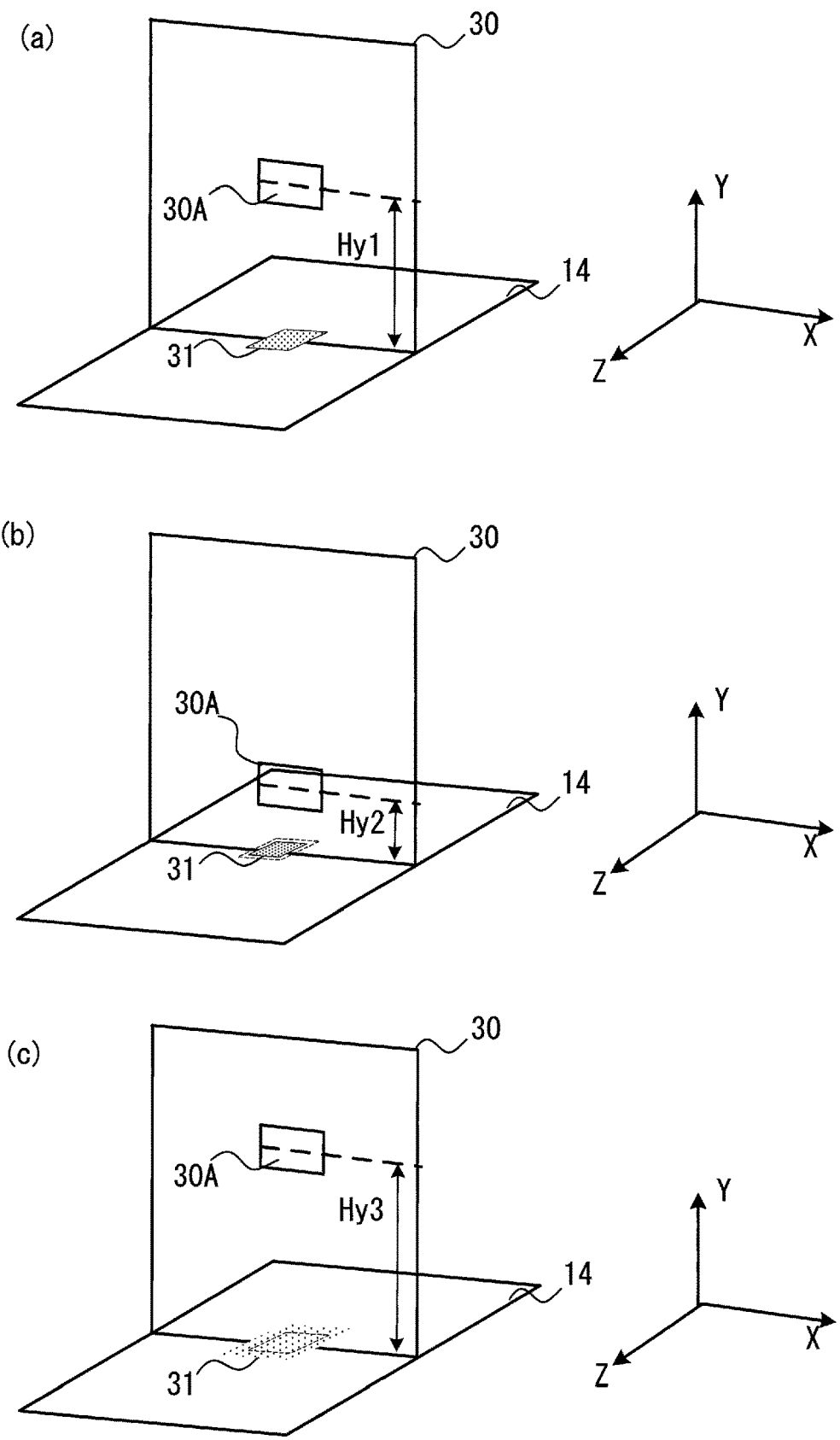

FIG. 13(a), similar to FIG. 11(a) in reference to which an explanation has been provided earlier, shows an icon 30A and an auxiliary image 31 brought up in an initial display, with the icon 30A and the stage 14 set apart from each other along the Y direction by a distance Hy1. In this situation, the image generation unit 201 generates auxiliary image data by increasing the size of the shadow area based upon the distance Hy1 and setting the extent of blurring at the edges of the shadow area to a predetermined initial value.

FIG. 13(b) shows the icon 30A displayed at a position shifted further toward the Y direction − side compared to the display position taken in the initial display. The distance between the icon 30A and the stage 14 measured along the Y direction in this condition is Hy2 (<Hy1). The image generation unit 201 generates auxiliary image data based upon the difference (Hy1−Hy2) from the distance Hy1 between the icon 30A and the stage 14 corresponding to the initial display by reducing the size of the shadow area in comparison to that of the shadow area in the initial display and setting the extent of blurring to a value lower than the initial value. As a result, an auxiliary image 31 smaller than that in the initial display with sharper edges is projected at a position below the icon 30A by the projector 15. It is to be noted that while the auxiliary image 31 in the initial display is indicated with dotted line in FIG. 13(b), the auxiliary image 31 in the initial display does not need to be projected or it may be projected with low luminance.

FIG. 13(c) shows the icon 30A displayed at a position shifted further toward the Y direction + side compared to the display position taken in the initial display. The distance between the icon 30A and the stage 14 measured along the Y direction in this condition is Hy3 (>Hy1). The image generation unit 201 generates auxiliary image data based upon the difference (Hy3−Hy1) from the distance Hy1 between the icon 30A and the stage 14 corresponding to the initial display by increasing the size of the shadow area in comparison to that of the shadow area in the initial display and setting the extent of blurring to a value higher than the initial value. As a result, an auxiliary image 31 larger than that in the initial display with blurred edges is projected at a position below the icon 30A by the projector 15. It is to be noted that while the auxiliary image 31 in the initial display is indicated with dotted line in FIG. 13(c), the auxiliary image 31 in the initial display does not need to be projected or it may be projected with low luminance.

It is to be noted that while the image generation unit 201 adjusts the size of the shadow area and the extent of blurring along the edges based upon the position of the icon 30A along the Y direction in the example explained above, it may instead adjust only either the size of the shadow area or the extent of blurring along the edges.

Furthermore, the image generation unit 201 may generate display image data by moving the auxiliary image 31 as explained earlier, by adjusting the luminance of the auxiliary image 31 as described earlier, by adjusting the size of the auxiliary image 31 and by moving the display position of the auxiliary image 31 as has been explained in reference to the first embodiment in an optimal combination, in addition to adjusting the size of the shadow area and the extent of blurring along the edges of the shadow area.

The image generation unit 201 in variation 1 of the first embodiment controls the size or the shape of the auxiliary image 31 when the position of the icon 30A is altered along the Y direction. As a result, the relationship between an actual physical object and its shadow is simulated through the use of the auxiliary image 31, which allows the user 12 to clearly perceive the relationship between the icon 30A and the auxiliary image 31.

In addition, the image generation unit 201 in variation 1 of the first embodiment increases the size of the auxiliary image 31 as the distance between the icon 30A and the auxiliary image 31 increases. Namely, it simulates the phenomenon whereby a shadow becomes larger as the distance between a physical object that actually exists and the surface where its shadow is formed increases by using the auxiliary image 31, thereby making it possible for the user 12 to recognize the relationship between the icon 30A and the auxiliary image 31.

It is to be noted that the image generation unit 201 may create a perception in the user 12 as if the position of the icon 30A has been altered by controlling the size or the shape of the auxiliary image 31 based upon the display position of the icon 30A along the Y direction as described above.

Figure 33:
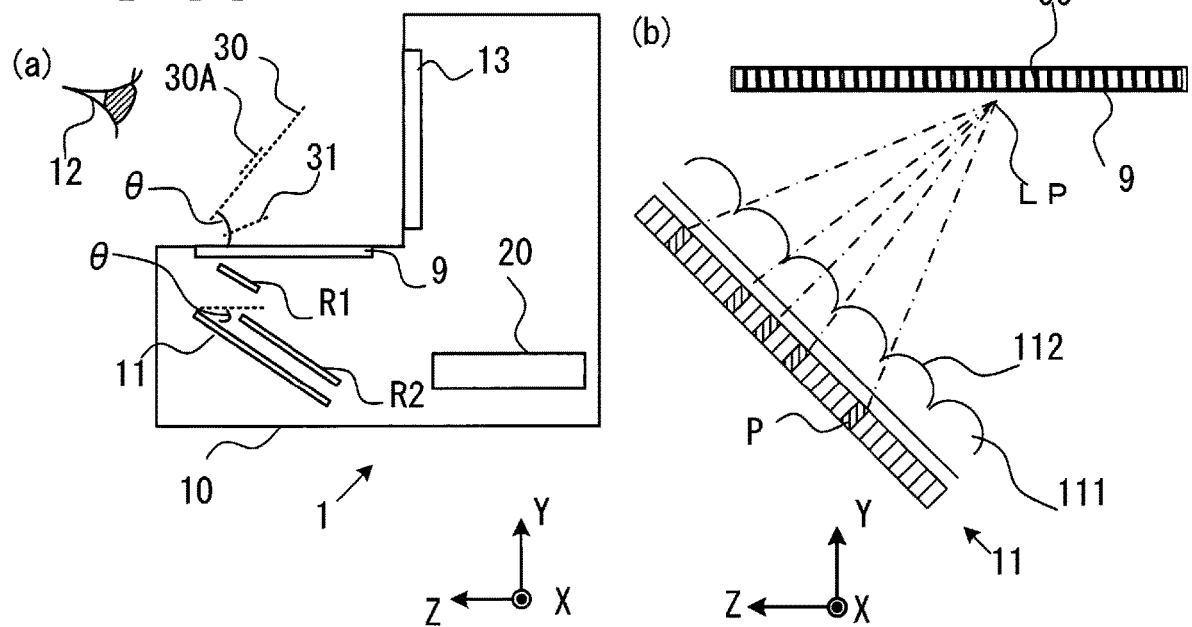
Figure 33:
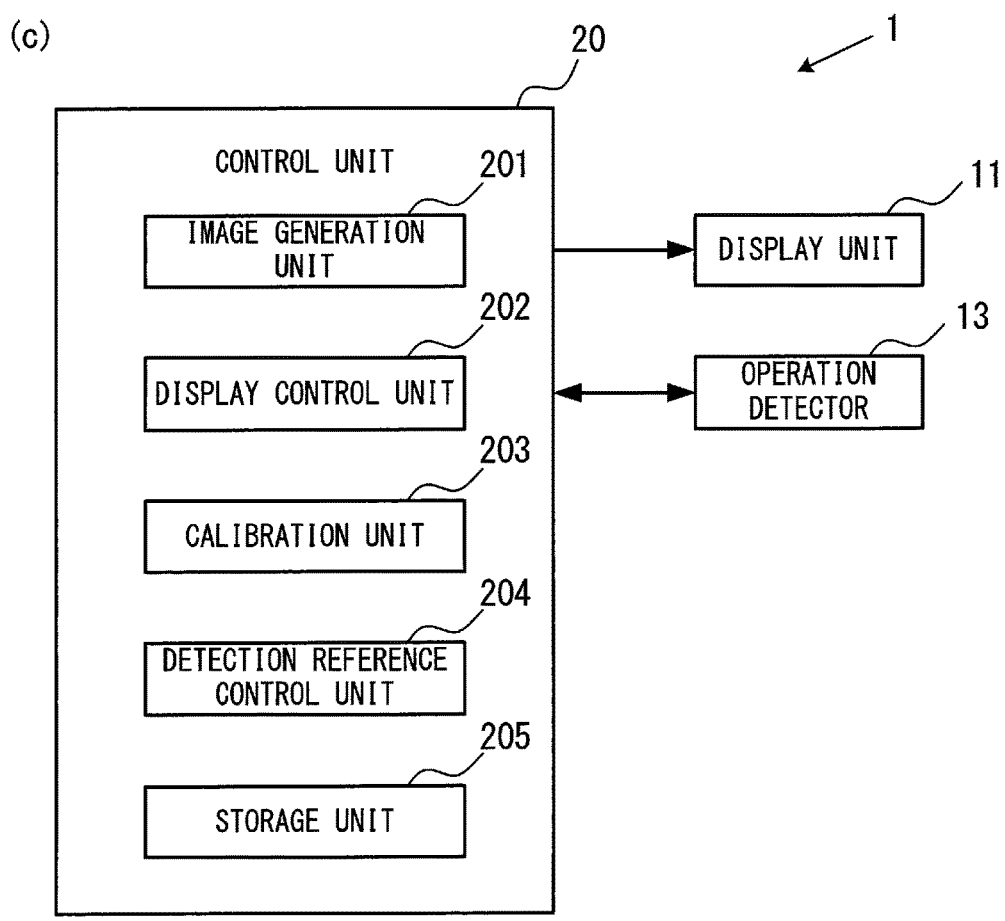
Figure 34:
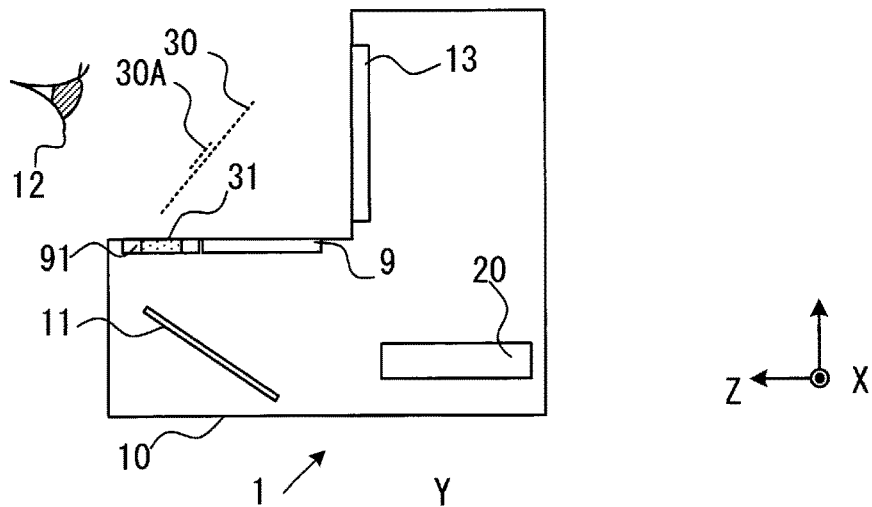
FIG. 34 A sectional view of the display device in variation 1 of the third embodiment in (a), a block diagram showing the essential configuration adopted in the display device in variation 1 of the third embodiment in (b) and a sectional view of a display device in another example of variation 1 of the third embodiment, in (c)
Figure 34:
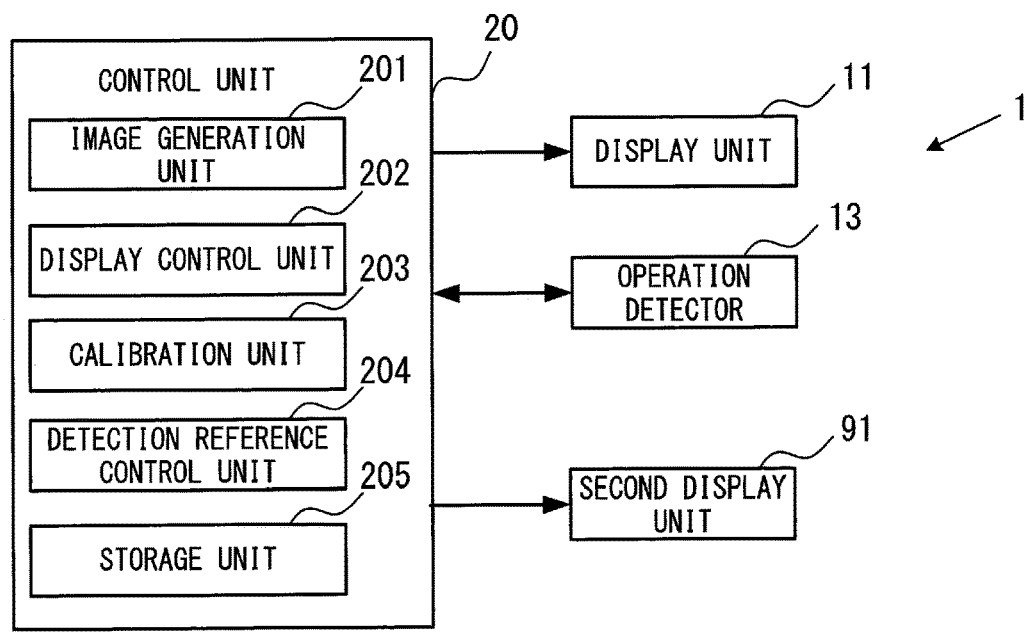
Figure 34:
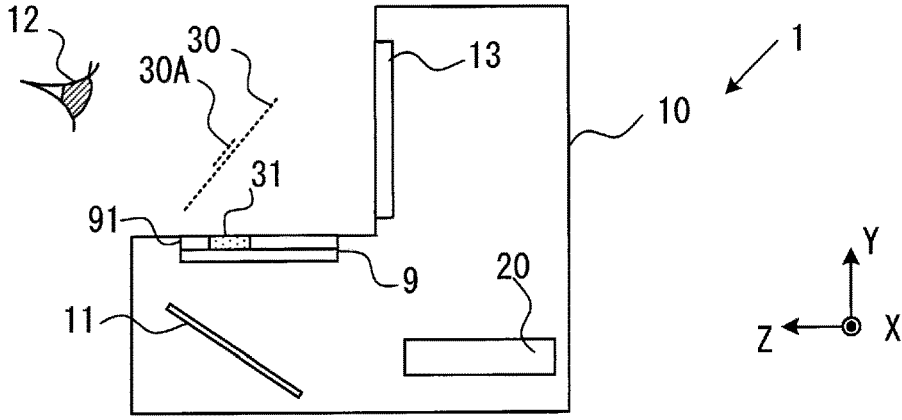

In such a case, the display device 1 will include a display unit 11 and an image-forming optical system 9 such as those in a third embodiment, the variations thereof (FIG. 33 through FIG. 35) and a fourth embodiment (see FIG. 36 and FIG. 38) which will be described later.

The detection reference control unit 204 sets the detection reference 40 so that it ranges parallel to the ZX plane within the detection range 13A of the operation detector 13 located above (toward the Y direction + side) of the stage 14. In this condition, the user 12 performs a pressing operation by moving his finger from the Y direction + side toward the Y direction − side and then moves his finger back toward the Y direction + side. Namely, the operation detector 13 detects the reach position along the optical axis of the image-forming optical system 9 with respect to the pressing operation performed by the user 12 for the midair image 30. The projector 15 projects an auxiliary image 31 in the same way as in the first embodiment onto the stage 14 disposed at a position further downward (toward the Y direction − side) relative to an icon in a midair image 30. It is to be noted that the projection direction is adjusted so as to ensure that the projection light from the projector 15 does not cast a shadow onto the stage 14 of the finger or the like of the user 12 performing the operation.

Figure 14:
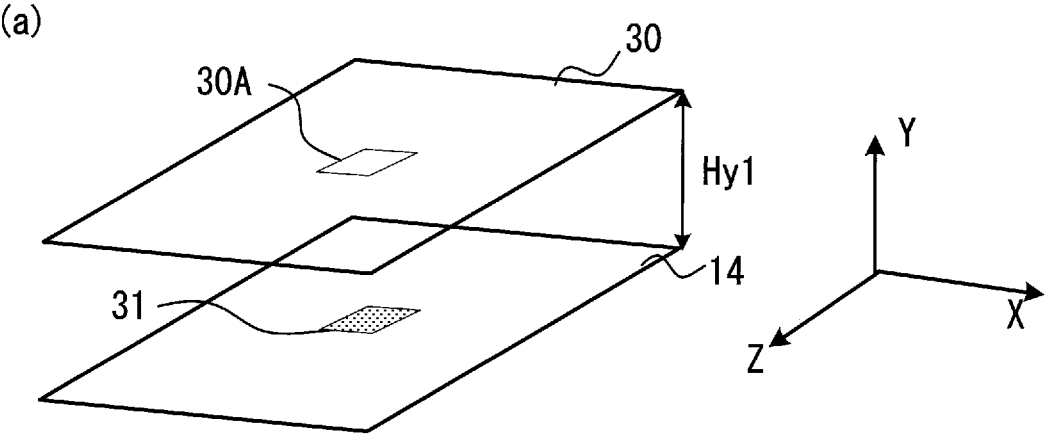
Figure 14:
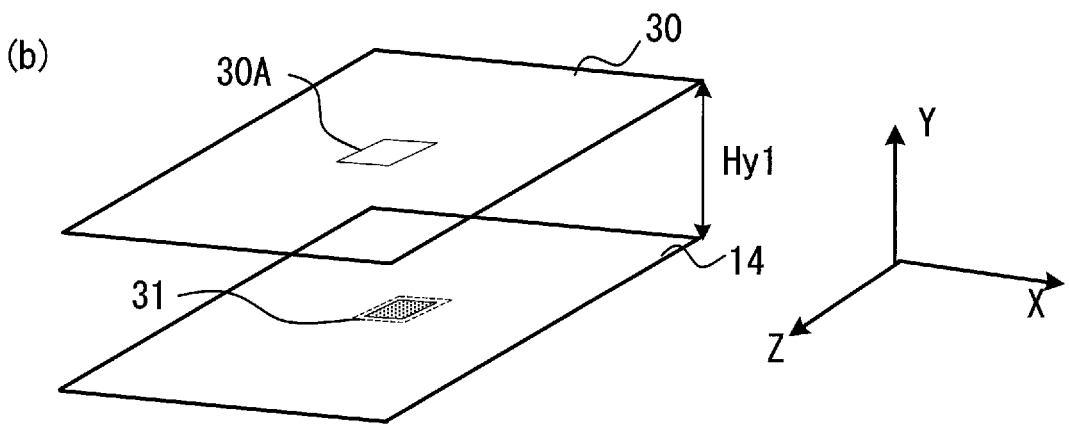
Figure 14:
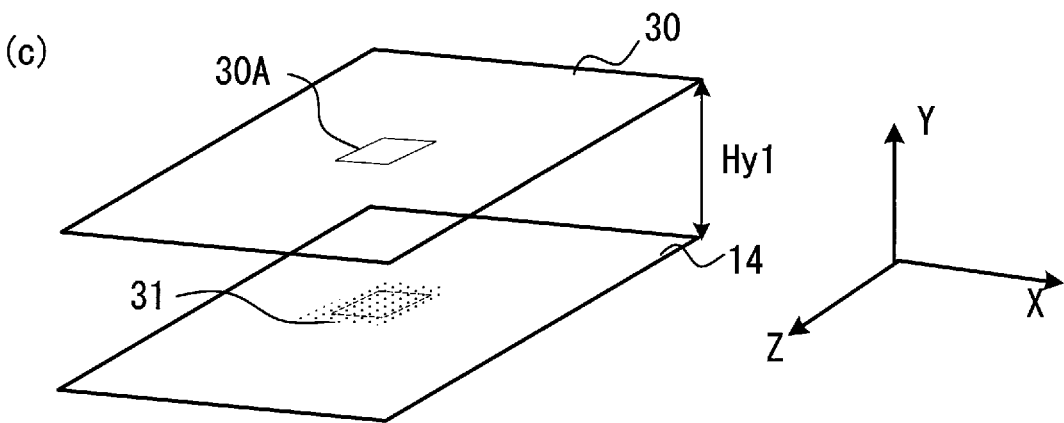

FIGS. 14(a) through 14(c) schematically illustrate a midair image 30 and an auxiliary image 31 that may be brought up on display under these circumstances. FIG. 14(a) shows the icon 30A and the auxiliary image 31 in an initial display. In this situation, the image generation unit 201 generates auxiliary image data by increasing, based upon the distance Hy1, the size of the auxiliary image 31 relative to the size of the icon 30A and by setting the extent of blurring for the auxiliary image 31 to achieve a predetermined initial state.

The processing executed to create a perception as if the icon 30A in the initial display state shown in FIG. 14(a) has moved along a direction running away from the user 12 along the optical axis of the image-forming optical system 9 will be explained. If the reach position of the pressing operation performed by the user 12 with his finger is above the detection reference 40 (further toward the Y direction + side), the image generation unit 201 adjusts the display mode for the auxiliary image 31. The image generation unit 201 generates auxiliary image data expressing an auxiliary image 31 smaller than the auxiliary image 31 in the initial display indicated by the dotted lines, so as to provide an image that is equivalent to a darker shadow, as shown in FIG. 14(b). The user 12, looking at the auxiliary image 31 in this display mode, perceives as if the icon 30A has moved toward the Y direction − side. The user 12 is thus expected to adjust the reach position or a specified position to a point further toward the Y direction − side.

The processing executed to create a perception as if the icon 30A in the initial display state shown in FIG. 14(a) has moved closer to the user 12 along the optical axis of the image-forming optical system 9 will be explained next. If the reach position of the pressing operation performed by the user 12 with his finger is below the detection reference 40 (further toward the Y direction − side), the image generation unit 201 adjusts the display mode for the auxiliary image 31. The image generation unit 201 generates auxiliary image data expressing an auxiliary image 31 larger than the auxiliary image 31 in the initial display indicated by the dotted lines, so as to provide an image that is equivalent to a lighter shadow, as shown in FIG. 14(c). The user 12, looking at the auxiliary image 31 in this display mode, perceives as if the icon 30A has moved toward the Y direction + side. The user 12 is thus expected to adjust the reach position or a specified position to a point further toward the Y direction + side.

<5. Adjustment Made in Correspondence to Movement of the Midair Image 30 Along a Pitching Direction>

An auxiliary image 31 as an image of a shadow of an icon 30A when a midair image 30 is not displayed within a plane parallel to the XY plane, i.e., when a midair image 30 is displayed with a tilt relative to the ZX plane forming a specific angle of inclination θ0 (<90°) leaning away from the vertical direction (the Y direction), will be explained next.

Figure 15:
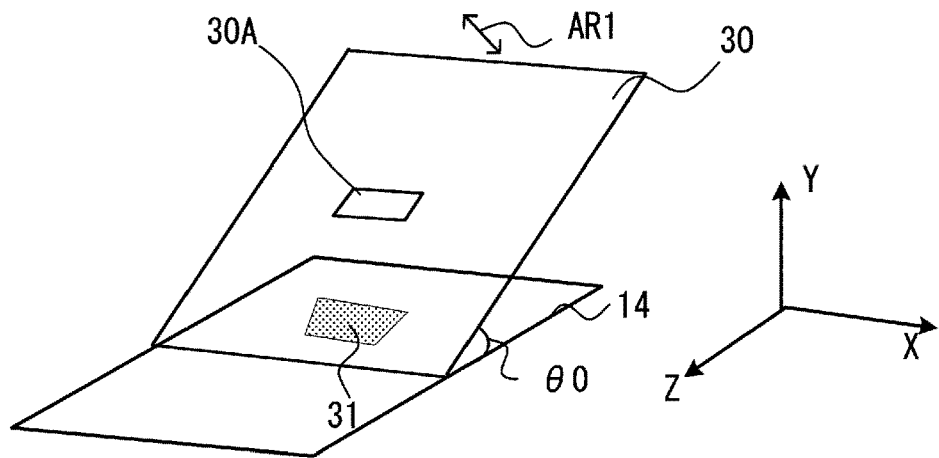
Figure 15:
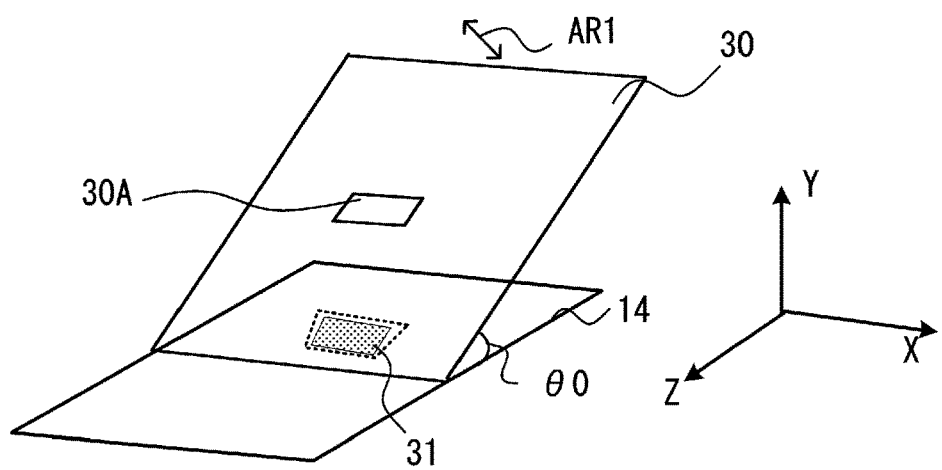
Figure 15:
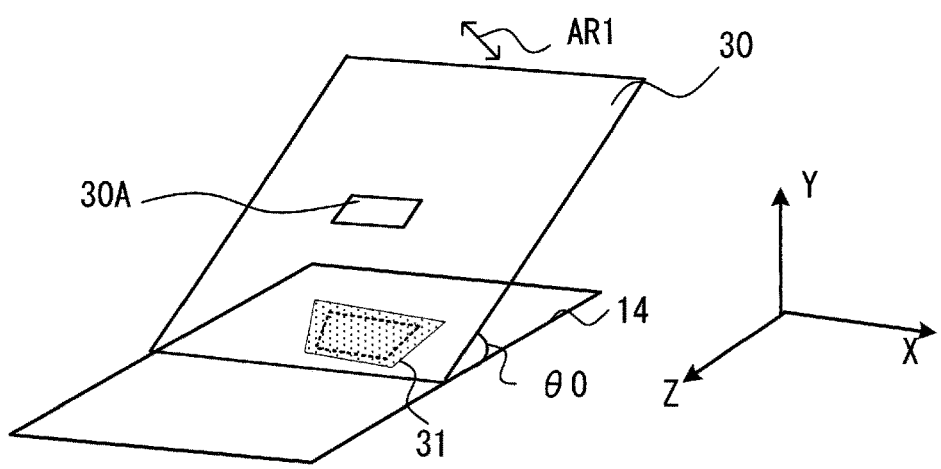

FIG. 15 schematically illustrates an icon 30A and an auxiliary image 31 that may be brought up on display in this situation. FIG. 15(a) shows them in an initial display, FIG. 15(b) shows the icon 30A displayed so as to appear to have moved along a direction running away from the user 12 and FIG. 15(c) shows the icon 30A displayed so as to appear to have moved closer to the user 12.

In conjunction with such a midair image 30, the image generation unit 201 generates auxiliary image data that creates a perception in the user 12 as if the icon 30A moves along a direction perpendicular to the plane with the specific tilt relative to the ZX plane, i.e., along the direction indicated by the arrow AR1. It is to be noted that the direction indicated by the arrow AR1 is not limited to that running perpendicular to the plane with the specific tilt relative to the ZX plane and may be any direction that intersects the plane with the specific tilt relative to the ZX plane.

As explained earlier, under normal circumstances, when the distance between a physical object and the surface on which its shadow is cast, measured along the vertical direction, is greater, the shadow will be larger with its edges blurred to a greater extent, whereas when the distance is smaller, the shadow is smaller and its edges are sharper. In addition, if the physical object moves along a direction other than the vertical direction, the shape of the shadow is distorted and as the distance measured along the vertical direction becomes greater, the extent of the distortion increases.

In the example presented in FIG. 15, the image generation unit 201 expresses the phenomenon described above through the auxiliary image 31. In the example presented in FIG. 15, the distance from the lower side of the icon 30A (the side located toward the Y direction − side) to the stage 14 is smaller than the distance from the upper side of the icon 30A (the side located toward the Y direction + side) to the stage 14. In other words, the shadow of the lower side of the icon 30A is shorter than the shadow of the upper side of the icon 30A. For this reason, the shadow that would be formed by the icon 30A on the stage 14, i.e., the shadow area generated by the image generation unit 201, takes a trapezoidal shape with its upper base having a greater length than its lower base in the example presented in FIG. 15.

The processing executed to create a perception in the user 12 as if the icon 30A in the initial display shown in FIG. 15(a) has moved away from the user 12 along the direction indicated by the arrow AR1 will be explained. In this situation, the image generation unit 201 generates auxiliary image data by reducing the size of the shadow area in comparison to that in the auxiliary image in the initial display indicated by the dotted lines and by distorting its shape relative to the trapezoidal shape assumed in the initial display, as illustrated in FIG. 15(b). The processing executed to create a user perception as if the icon 30A in the initial display state shown in FIG. 15(a) has moved closer to the user 12 will be explained next. In this case, the image generation unit 201 generates auxiliary image data by increasing the size of the shadow area in comparison to that in the auxiliary image in the initial display indicated by the dotted lines and by distorting the shape relative to the trapezoidal shape assumed in the initial display, as illustrated in FIG. 15(c).

In addition, when distorting the shape of the shadow area, the image generation unit 201 may also adjust the luminance of the shadow area, as has been explained earlier.

Furthermore, the image generation unit 201 may generate display image data by moving the auxiliary image 31 to track the midair image 30 as explained above, by adjusting the luminance of the auxiliary image 31, by adjusting the size of the auxiliary image 31 as explained earlier and by moving the display position of the auxiliary image 31 as has been explained in reference to the first embodiment in an optimal combination, in addition to distorting the shape of the shadow area.

The image generation unit 201 in variation 1 of the first embodiment controls the shape of the auxiliary image 31 when the icon 30A is displayed with a tilt relative to the vertical direction (Y direction). As a result, the relationship between an actual physical object and its shadow is simulated through the use of the auxiliary image 31, which allows the user 12 to clearly perceive the relationship between the icon 30A and the auxiliary image 31.

It is to be noted that when displaying the auxiliary image 31, the image generation unit 201 in the first embodiment may individually add one of the various types of display mode adjustments in variation 1 described above or may add a plurality of display mode adjustments in variation 1 in combination.

In addition, while the auxiliary image 31 in the first embodiment and the various examples in variation 1 having been described above is a shadow image, an image other than a shadow image may be used as the auxiliary image 31. For instance, the image generation unit 201 may generate auxiliary image data that render an auxiliary image 31, located under the icon 30A, brighter, and render the remaining area darker, as shown in FIG. 16(a).

In this situation, the image generation unit 201 may generate display image data expressing an icon 30A appearing as if it is illuminated from below. For instance, the image generation unit 201 may simulate the phenomenon whereby directional light illuminating a dark area is observed as a beam of light (shaft of light).

FIG. 16(b) schematically illustrates a midair image 30 and an auxiliary image 31 that may be displayed for such an effect. The image generation unit 201 generates display image data by superimposing white color or the like over an area R containing the icon 30A and ranging along the Y direction. The user 12, looking at the midair image 30, experiences a visual perception as if light from the stage 14, illuminating the icon 30A, is a shaft of light advancing towards Y direction + side.

Figure 16:
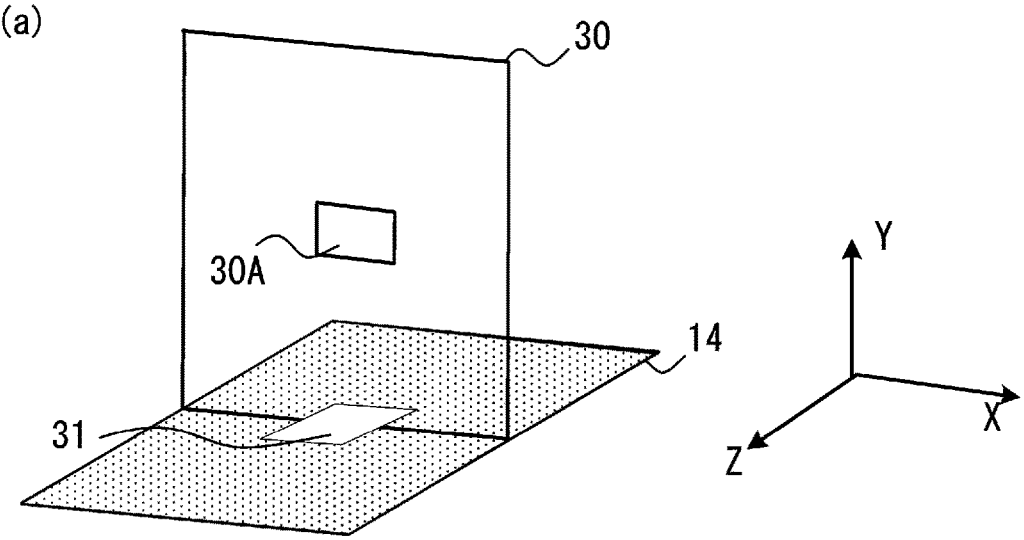
Figure 16:
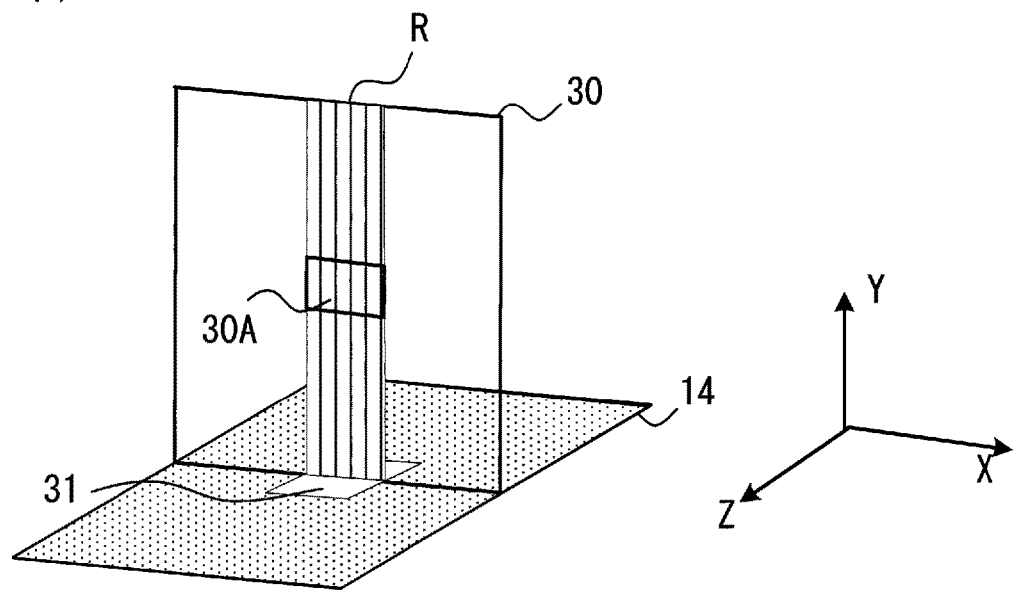

It is to be noted that in the example presented in FIG. 16, the projector 15 may be disposed further downward relative to the stage 14 (toward the Y direction − side) so as to project projection light toward the Y direction + side. In such a case, it is desirable that the stage 14 be made of a transparent material.

(Variation 2 of the First Embodiment)

Figure 17:
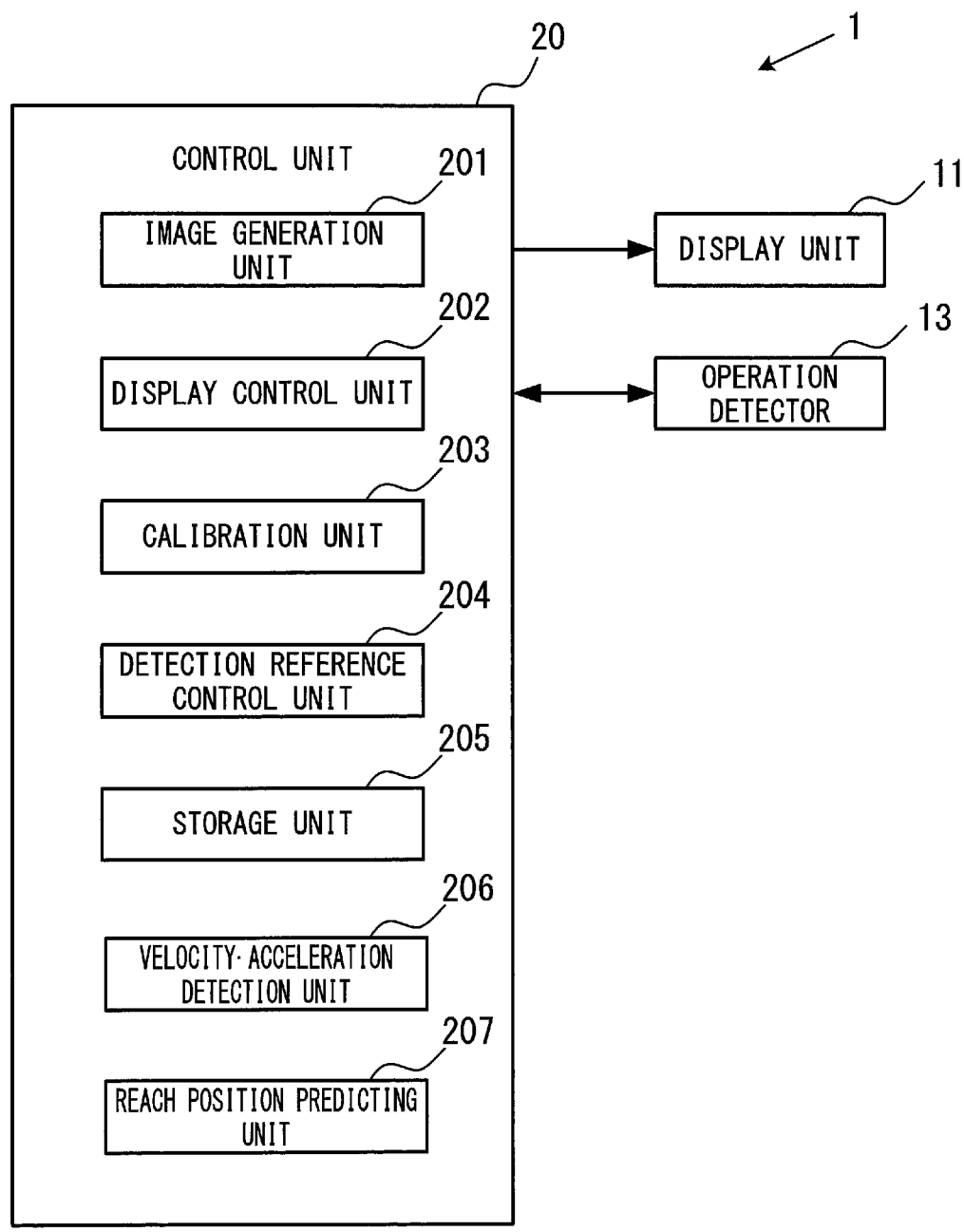

The display device 1 in the first embodiment or variation 1 thereof described above designates the furthest point to which the fingertip of the user 12 reaches as it first moves away from the user 12 (toward the Z direction − side) in order to perform an operation at an icon display position and then moves toward the user 12 (toward the + side along the Z direction) over a specific distance, as the reach position. The display device 1 then adjusts the display position of an auxiliary image based upon the distance between the reach position and the detection reference. The display device 1 may instead calculate the velocity or the acceleration of the fingertip F of the user 12 based upon the detection output provided by the operation detector 13, and predict a reach position of the fingertip F of the user 12 based upon the velocity or the acceleration having been calculated, as in variation 2. The display device 1 may then adjust the display position of the auxiliary image based upon the distance between the predicted reach position and the detection reference. FIG. 17 is a block diagram showing the control unit 20 as well as the display unit 11 and the operation detector 13 controlled by the control unit 20, among the structural components in the display device 1 in variation 3.

The display device 1 in variation 2 will be described by focusing on its structural features different from those in the display device in the first embodiment. A velocity·acceleration detection unit 206 in FIG. 17 reads out the electrostatic capacitance value detected by the operation detector 13 after predetermined time intervals, calculates the velocity of the finger movement based upon a change occurring in the electrostatic capacitance value over each predetermined time interval and also calculates the acceleration of the finger movement based upon the velocity having been calculated. A reach position predicting unit 207 predicts the reach position for the finger based upon the finger movement velocity or acceleration output by the velocity·acceleration detection unit 206. The reach position predicting unit 207 is able to estimate the reach position for the finger by, for instance, detecting that the moving finger, having been accelerating or moving at a substantially constant speed, has shifted into a decelerating state and ascertaining the rate of deceleration. The image generation unit 201 adjusts the display position of the auxiliary image 31 based upon the reach position predicted by the reach position predicting unit 207.

Figure 18:
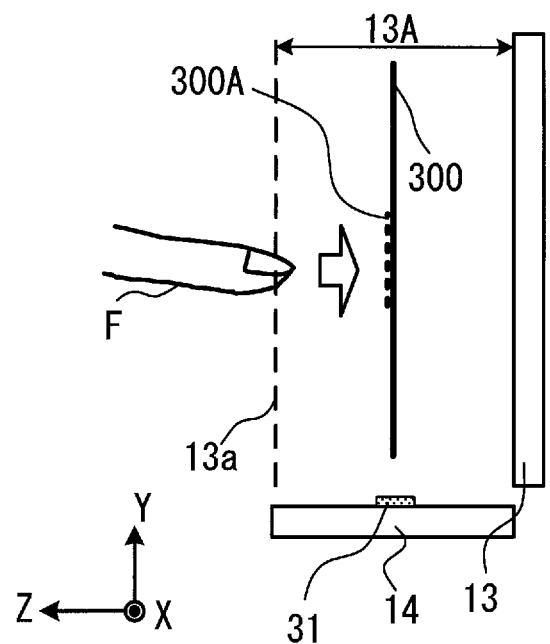
Figure 18:
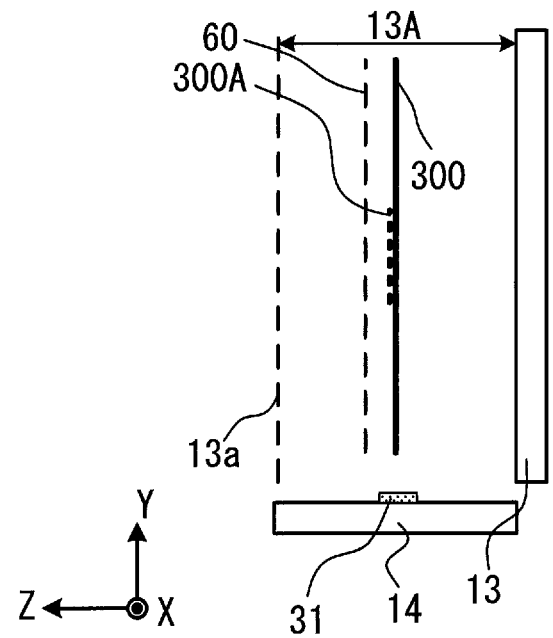
Figure 19:
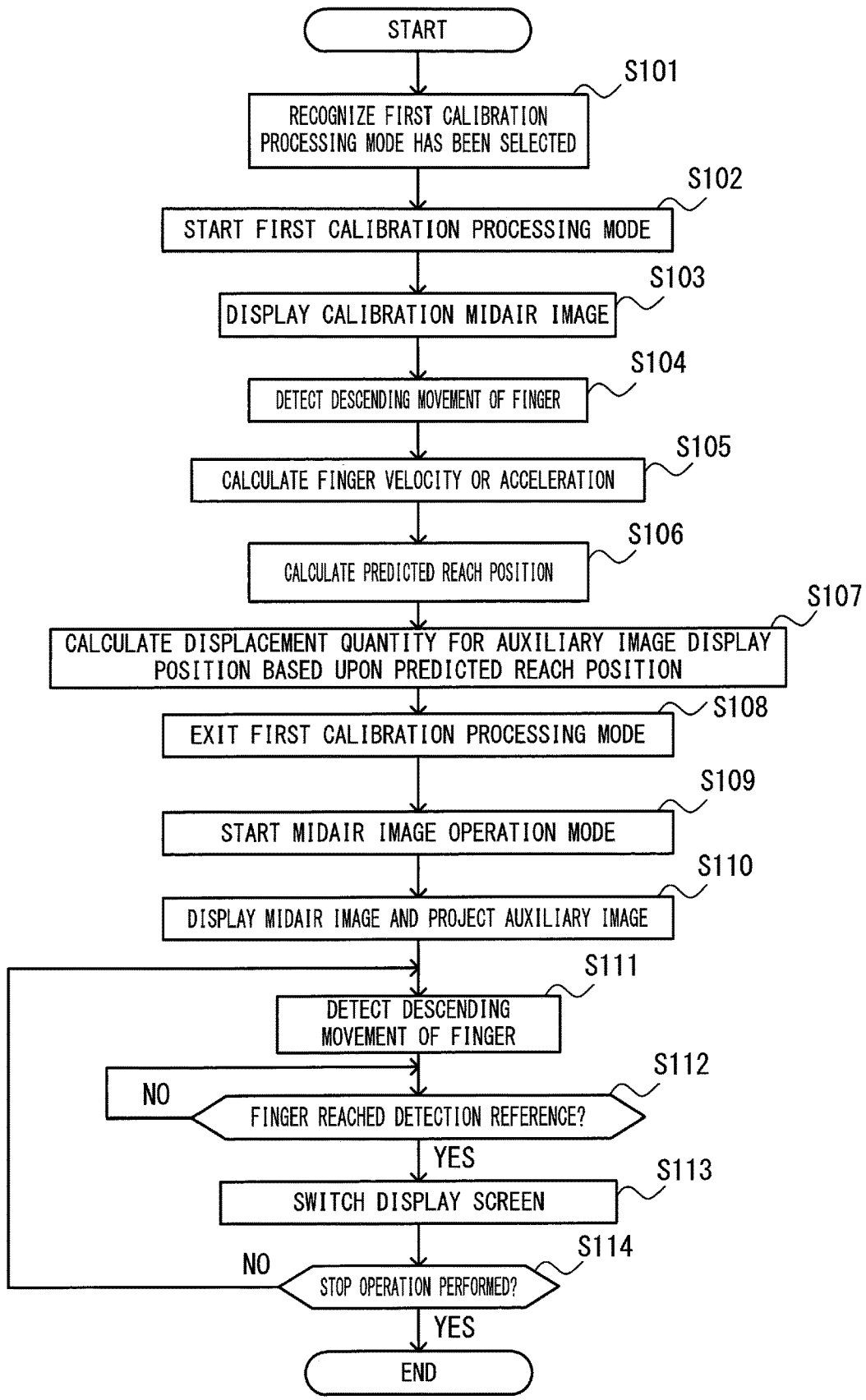
FIG. 19 A flowchart of the calibration processing executed in the first calibration processing mode in variation 2 of the first embodiment FIG. 20 A schematic illustration of a midair image brought up on display in the first calibration processing mode in variation 4 of the first embodiment FIG. 21 Illustrations of the calibration processing executed in variation 4 of the first embodiment, each indicating the relationship among the operation detector, the midair image, the detection reference and the finger position in sectional views, in (a) and (b)

Next, the processing executed in the first calibration processing mode in the display device 1 in variation 2 will be explained in reference to FIG. 18 and FIG. 19. The processing executed in steps other than step S104 through step S107 in the flowchart presented in FIG. 19 is identical to that in the flowchart presented in FIG. 7, and accordingly, a repeated explanation is not provided. As the fingertip F moves into the predetermined detection range 13A of the operation detector 13 as shown in FIG. 18(a), the operation detector 13 detects the movement of the fingertip F as a change in the electrostatic capacitance value in step S104. In step S105, the velocity·acceleration detection unit 206 calculates the velocity or the acceleration of the movement of the fingertip F based upon the detection output provided by the operation detector 13. In step S106, the reach position predicting unit 207 calculates the reach position for the fingertip F based upon the velocity or the acceleration of the movement having been calculated by the velocity·acceleration detection unit 206. The reach position for the finger calculated by the reach position predicting unit 207, i.e., predicted by the reach predicting unit 207, is indicated by a dotted line 60 in FIG. 18(b). Once the image generation unit 201 adjusts the display position of the auxiliary image 31 based upon the predicted reach position 60, as indicated in FIG. 18(b) in step S107, the image generation unit 201 stores data indicating the displacement quantity with respect to the display position of the auxiliary image 31 into the storage unit 205. In a subsequent step S110, the image generation unit 201 generates display image data with adjustment made with respect to the display position of the auxiliary image 31 based upon the data stored as described above and the projector 15 projects the image data as an auxiliary image 31 for the midair image operation mode. It is to be noted that the reach position for the finger may be predicted based upon both the velocity and the acceleration of the finger movement or based upon either one of them.

It is to be noted that the velocity·acceleration detection unit 206 reads out the electrostatic capacitance value detected by the operation detector 13 after predetermined time intervals, calculates the velocity of the finger movement based upon a change occurring in the electrostatic capacitance value over each predetermined time interval and calculates the acceleration of the finger movement based upon the velocity thus calculated in the description provided above. However, the present variation is not limited to this method and it may be adopted in conjunction with a velocity·acceleration detection unit 206 configured with an image-capturing device. In addition, while the velocity·acceleration detection unit 206 calculates the velocity or the acceleration of the movement of the finger of the user 12 in the example described above, the velocity or the acceleration of the movement of the foot or elbow of the user 12 or the movement of a stylus pen held by the user may be calculated instead.

It is to be also noted that the reach position predicting unit 207 calculates a predicted reach position 60 for the finger of the user 12 based upon the velocity or the acceleration of the movement of the finger of the user 12 having been calculated and the image generation unit 201 adjusts the display position of the auxiliary image 31 based upon the predicted reach position 60 calculated for the finger of the user 12. However, the reach position predicting unit 207 does not need to determine the predicted reach position 60 for the finger of the user 12 for each operation. If the reach position predicting unit 207 calculates a predicted reach position 60 based upon an unintended movement of the finger of the user 12 occurring prior to an operation by the user 12, the display position of the auxiliary image 31 may be adjusted too frequently and it may become difficult to guide the fingertip F of the user 12 to the optimal position. Such an undesirable result can be prevented by engaging the reach position predicting unit 207 in calculation of a predicted reach position 60 and the image generation unit 201 in adjustment of the display mode for the auxiliary image 31 based upon the predicted reach position 60 only when the velocity·acceleration detection unit 206 has detected a velocity and an acceleration of the finger of the user 12 movement each represented by a value equal to or greater than a predetermined threshold value.

In variation 3, in which the reach position 50 for the finger is predicted based upon the velocity or the acceleration of finger movement, calibration processing can be executed promptly.

While the calibration processing in this variation is adopted in the first calibration processing mode in the first embodiment in the example described above, the calibration processing may also be adopted in the second calibration processing mode. In the latter case, the processing in step S105 and step S106 in the flowchart presented in FIG. 19 will be executed after step S24 in the flowchart presented in FIG. 9 in reference to which the first embodiment has been described. Subsequently, the display position of the auxiliary image 31 will be adjusted based upon the predicted reach position 60 calculated in step S28 and step S32 without executing the processing in step S27 and step S29 in FIG. 9.

By adopting variation 3 in the second calibration processing mode, it becomes possible to estimate in advance the reach position for the fingertip F of the user 12 performing a midair image operation before the fingertip F reaches the detection reference 40 and the display mode for the midair image 30 can be adjusted based upon the predicted reach position. This means that even when the fingertip F of the user 12 does not reach the detection reference 40, the user 12 is comfortably able to perform an operation since an error such as a failure to execute icon display switchover can be prevented.

(Variation 3 of the First Embodiment)

In the first embodiment and variations 1 and 2 of the first embodiment, the display device 1 detects or predicts the reach position and the image generation unit 201 adjusts the display position of the auxiliary image 31 based upon the distance between the reach position 50 and the detection reference 40 through a single session of calibration processing. As an alternative, the image generation unit 201 adjusts the display position of an auxiliary image 31 in the midair image operation mode based upon the distances between the reach positions detected through a plurality of sessions of calibration processing and the detection reference in the display device 1 in variation 3.

In a first session of calibration processing, the detection reference control unit 204 determines the reach position 50 for the finger based upon the detection output provided from the operation detector 13. The image generation unit 201 calculates a displacement quantity with respect to the display position of the auxiliary image 31 based upon the reach position 50. The image generation unit 201 stores data indicating the calculated displacement quantity into the storage unit 205. A second session of calibration processing is executed in succession and data indicating a displacement quantity are stored into the storage unit 205 in a similar manner. A third session of calibration processing may be executed in succession following this session. Based upon the data indicating a plurality of displacement quantities stored in the storage unit 205 through the plurality of sessions of calibration processing having been executed successively as described above, the image generation unit 201 selects a single displacement quantity for the auxiliary image 31 displayed for the midair image operation mode.

The display position of a given auxiliary image 31 may be determined by using the plurality of displacement quantities through any of various procedures. For instance, the image generation unit 201 may calculate a single displacement quantity for the auxiliary image 31 as the arithmetic mean of the plurality of displacement quantities or as the geometric mean of the plurality of sets of displacement quantities. As an alternative, the image generation unit 201 may determine a new displacement quantity by applying optimal weight to each of the plurality of displacement quantities. For instance, the image generation unit 201 may calculate a displacement quantity for an auxiliary image 31 by weighting the displacement quantity $H_N$ determined through an Nth session and the displacement quantity $H_{N+1}$ determined through an N+1th session at a ratio of 3:7. In more specific terms, using $H_N$ and $H_{N+1}$, the image generation unit 201 calculates a displacement quantity for the auxiliary image 31 based upon the results of calculation executed as expressed as; $(H_N \times 3 + H_{N+1} \times 7)/10$. The weighting ratio used in this calculation is not limited to 3:7 and the number of sessions is not limited to 2, either. It will be obvious that instead of individually calculating a displacement quantity for the auxiliary image 31 based upon the reach position for the finger and storing it into the storage unit 205 in correspondence to each of the plurality of calibration processing sessions, reach positions for the finger, each detected in correspondence to a plurality of calibration processing sessions, may be stored into the storage unit 205 and a single displacement quantity for the auxiliary image 31 may be calculated based upon the plurality of reach positions thus stored.

In addition, the image generation unit 201 does not need to adjust the display position of the auxiliary image 31 in the calibration processing, if the distance between the reach position 50 and the detection reference 40 is equal to or less than a predetermined value, i.e., if the reach position 50 is close to the detection reference 40.

Furthermore, the image generation unit 201 does not need to adjust the display position of the auxiliary image 31 through each session of the calibration processing. Instead, the control unit 20 may calculate the number of times an operation at the icon display position has failed based upon the number of times that the reach position 50 has been determined and the number of times the reach position 50 has been judged to actually reach the detection reference 40 through a plurality of sessions of the calibration processing. The image generation unit 201 may adjust the display position of the auxiliary image 31 only if the number of times a failure has occurred is judged to be equal to or greater than a predetermined value.

While the calibration processing in this variation is adopted in the first calibration processing mode in the first embodiment in the example described above, the calibration processing may also be adopted in the second calibration processing mode and the variation 1 or 2.

In the calibration processing executed in variation 3 described above, the control unit 20 determines the reach position 50 by detecting a natural operating motion that the user 12 would normally make when performing an operation at the display position of an icon 30A in a midair image 30. Namely, the control unit 20 determines the reach position 50 by detecting an advancing movement of the finger intended to press on the icon, which then shifts to a retreating movement, or detecting a movement of the finger intended to come into contact with the icon, and then hold down the icon briefly. Thus, the calibration processing can be executed without the user 12 being aware of the reach position 50 being detected or determined through the calibration processing, i.e., without the user 12 being aware that calibration processing is in progress.

(Variation 4 of the First Embodiment)

In the first embodiment, the operation detector 13 determines the reach position 50 by detecting an operation the user 12 performs with his finger at the display position of the midair image 30 and the image generation unit 201 adjusts the display position of the auxiliary image 31 based upon the reach position 50. As an alternative, the user 12 may be allowed to specify the finger position at which he has experienced a perception of performing an operation at the display position of an icon in a midair image, and in such a case, the detection reference control unit 204 may recognize the specified position and the image generation unit 201 may adjust the display position of the auxiliary image 31 based upon the specified position. The following is a description of a variation in which the user 12 indicates the position at which he has had a perception of performing an operation at the display position of a midair image 30 as a specified position. It is to be noted that while an example in which variation 3 is adopted in the first calibration processing mode in the first embodiment is described below, it may also be adopted in the second calibration processing mode and in variations 1 through 4 described earlier.

Figure 20:
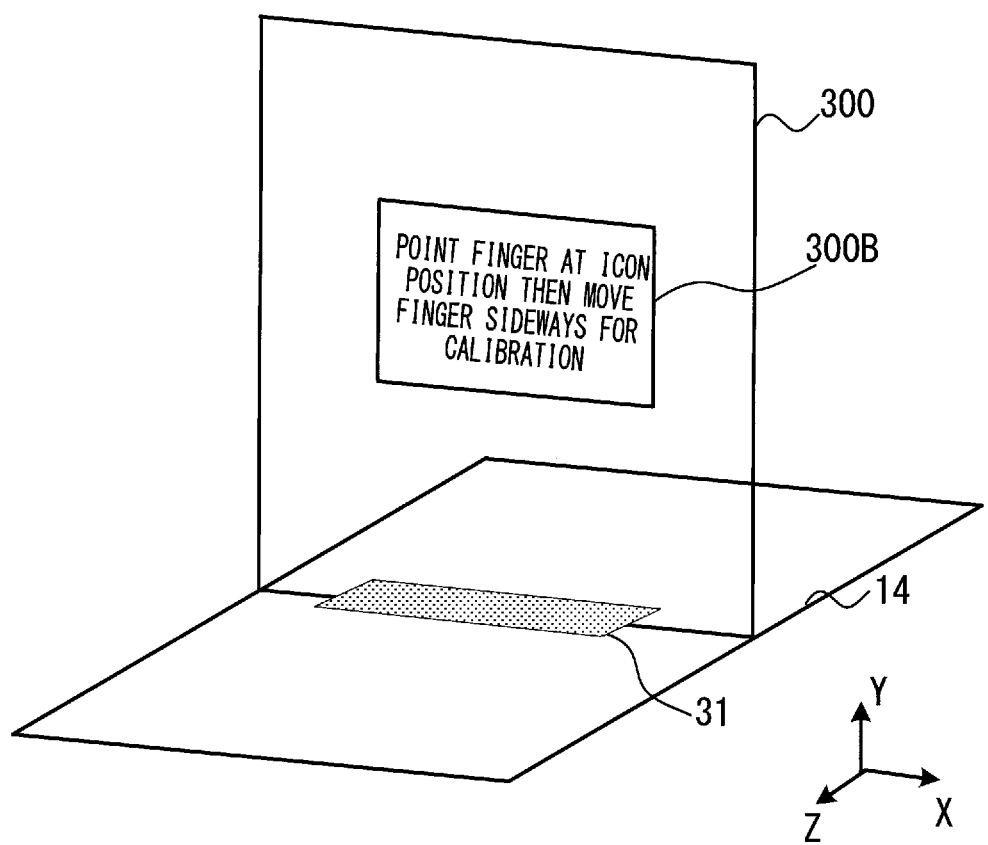

The following is a description of the display device in variation 4. As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. FIG. 20 shows the display image generated for the calibration processing brought up as a midair image 300. The midair image 300 includes an icon 300B for calibration, and a message "Point at this icon with finger and move the finger sideways for calibration" is superimposed on the calibration icon 300B. In addition, the detection reference control unit 204 sets the detection reference 40 to an initial position near the midair image 300, as indicated in FIG. 21(*a*).

Figure 21:
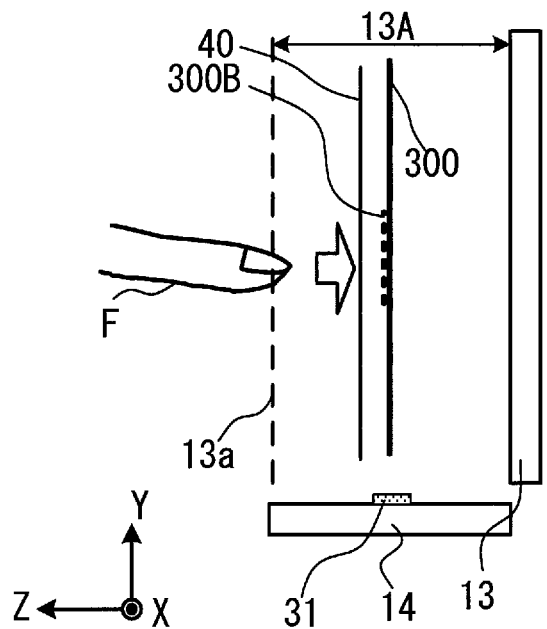
Figure 21:
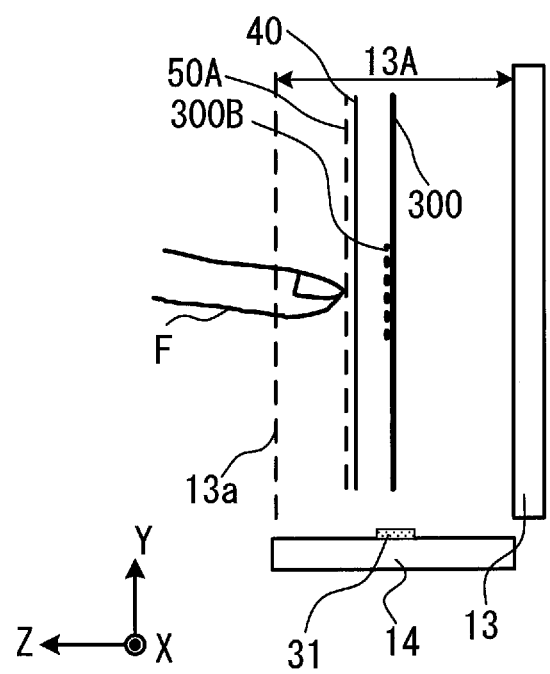

The user 12, following the instructions in the message superimposed on the icon 300B in the midair image 300, moves his fingertip F toward the icon 300B, i.e., toward the Z direction – side, as shown in FIG. 21(*a*), in order to perform an operation at the display position of the icon 300B. As the fingertip F reaches the electrostatic capacitance detection range 13A of the operation detector 13 shown in FIG. 2, the operation detector 13 detects the approaching movement of the fingertip F of the user 12 toward the icon 300B, i.e., toward the − side along the Z direction, as a change in the electrostatic capacitance.

The user 12 moves his finger F further away from himself (toward the Z direction − side) and upon feeling that the fingertip F has reached the display position of the icon 300B in the midair image 300, he moves the finger F sideways along the display plane in which the midair image 300 is displayed, i.e., over the XY plane. The operation detector 13 detects the advancing movement and the lateral movement of the finger F. The detection reference control unit 204 designates the position of the finger F along the Z direction at the time point at which it determines that the advancing movement has switched to a lateral movement as the operation detector 13, having detected an advancing movement of the finger F thus far, detects a lateral movement of the finger F, as a specified position 50A. The image generation unit 201 adjusts the display position of the auxiliary image 31, i.e., calculates a displacement quantity with respect to the display position of the auxiliary image 31, based upon the specified position 50A. Data indicating the displacement quantity for adjustment are stored into the storage unit 205. It is to be noted that while the specified position 50A is located along the Z direction relative to the midair image 300 in the example presented in FIG. 21(b), the specified position 50A, i.e., the position at which the user 12 experiences a perception that his fingertip F has reached the icon 300B in the midair image 300, may be in alignment with the midair image 300 or may be further toward the − side along the Z direction relative to the midair image 300.

It is to be noted that the detection reference control unit 204 designates the position taken by the finger along the Z direction when the movement of the finger F along the advancing direction has shifted to the lateral movement as the specified position 50A in the description provided above, the present variation is not limited to this example. The detection reference control unit 204 may instead designate the position of the finger F along the Z direction at the end of the lateral movement following the advancing movement as the specified position 50A. As a further alternative, the detection reference control unit 204 may designate the average or the median of values indicating the positions of the finger F along the Z direction during the period of time elapsing between the start of the lateral movement of the finger F and the end of the lateral finger movement as the specified position 50A. As described above, the specified position 50A, at which the operation has been detected, is detected by the detection reference control unit 204.

Figure 22:
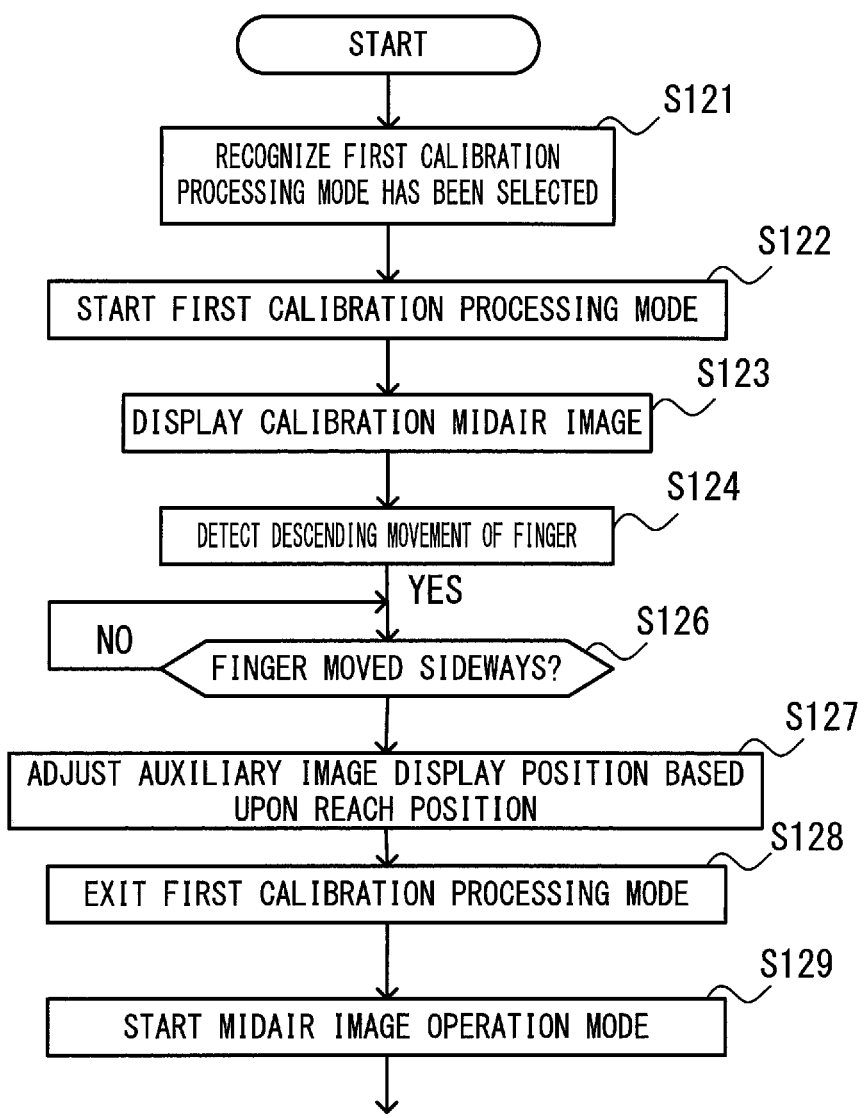
FIG. 22 A flowchart of the calibration processing executed in the first calibration processing mode in variation 4 of the first embodiment FIG. 23 A block diagram showing the essential configuration of the display device in variation 7 of the first embodiment FIG. 24 Illustrations of the display device in variation 8 of the first embodiment, in a perspective showing the external appearance of the display device in (a) and in a block diagram showing the essential configuration of the display device in (b)

In reference to the flowchart presented in FIG. 22, the calibration processing executed in variation 4 will be described. It is to be noted that the flowchart in FIG. 22 only shows the processing executed in step S121 through step S129 and does not show the processing executed in subsequent steps. The processing executed in step S129 and subsequent steps is similar to the processing executed in step S109 and subsequent steps in the flowchart presented in FIG. 19.

Figure 7:
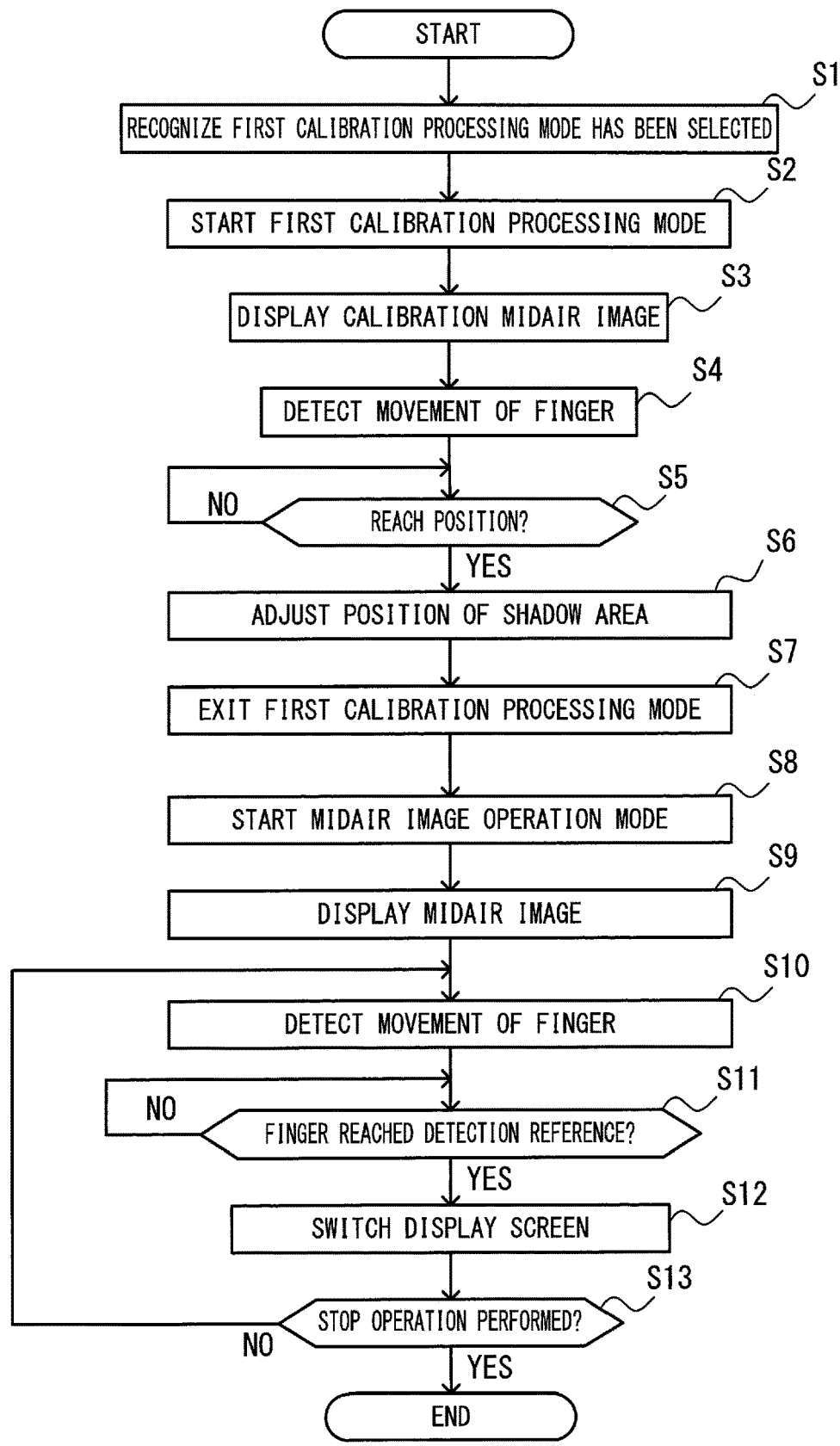

The processing executed in step S121 through step S124 is similar to that executed in step S1 through step S4 in the flowchart presented in FIG. 7. In step S126, the operation detector 13 detects the lateral movement of the finger of the user 12. In step S127, the detection reference control unit 204 decides, based upon the detection output from the operation detector 13, that a shift has occurred in the movement of the finger F from the advancing movement to the lateral movement, and designates the position taken by the finger F at the time of the shift as the specified position 50A. The image generation unit 201 adjusts the display position of the auxiliary image 31 based upon the specified position 50A and stores data indicating the displacement quantity for the display position into the storage unit 205 before the operation proceeds to step S128. In step S128, the first calibration processing mode ends and the operation proceeds to step S129. In step S129, the midair image operation mode starts. In the midair image operation mode, the image generation unit 201 adjusts the display position of the auxiliary image 31 based upon the data indicating the displacement quantity read out from the storage unit 205.

It is to be noted that while the processing executed in the first calibration processing mode is explained above, processing will be executed in the second calibration processing mode as shown in the flowchart presented in FIG. 9, in reference to which the first embodiment has been described. However, if the detection reference control unit 204 detects that the finger F, having been moving away from the user, has switched to a lateral movement through detection of an operation performed by the user 12 with respect to the icon 30A in step S24 in the flowchart presented in FIG. 9, the specified position 50A is determined instead of the reach position in step S27 and step S29. If the specified position 50A is determined in step S29, the detection reference control unit 204 makes a decision in step S29 as to whether or not the specified position 50A is in alignment with the position of the detection reference 40.

While the calibration processing in variation 4 is in progress, the user 12 specifies a position at which he experiences a perception of having performed an operation at the display position of the midair image 300 with his finger F by switching the movement of his finger F from an advancing movement to a lateral movement. In other words, the calibration processing is executed by the display device 1 by allowing the user 12 to specify an operation position perceived as the display position with respect to the icon 300B and thus, accurate calibration processing is enabled. In addition, indicating the specified position by switching the movement of the finger F from an advancing movement to a lateral movement assures good operability and the calibration processing can be executed quickly.

(Variation 5 of the First Embodiment)

The user 12 operating the display device 1 in variation 4 indicates the position at which he experiences a perception of performing an operation at the icon display position with his finger as a specified position by switching his finger movement from an advancing movement toward the Z direction − side to a lateral movement. The user 12 of the display device 1 in variation 5 indicates the position at which he experiences a perception of performing an operation at the icon display position with his finger by operating another icon. The calibration processing executed in this variation will be described next. It is to be noted that while an example in which variation 5 is adopted in the first calibration processing mode in the first embodiment is described below, it may also be adopted in the second calibration processing mode and in variations 1 through 5 described earlier.

As the display device 1 is started up and the user 12 operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. A midair image 300 brought up in this situation includes the icon 300B for calibration, shown in FIG. 20 in reference to which variation 4 of the first embodiment has been described, and another icon displayed near the icon 300B (e.g., toward the X direction – side). A message "Touch the icon on the left side with a finger of your left hand while pointing to this icon with a finger of your right hand for calibration", instead of the message shown FIG. 20, is superimposed on the calibration icon 300B.

The user 12, following the instructions in the message superimposed on the icon 300B, moves a fingertip F of his right hand toward the icon 300B in order to perform an operation at the display position of the icon 300B. As the fingertip of the user 12 reaches the electrostatic capacitance detection range 13A of the operation detector 13, the operation detector 13 detects the movement of the finger of the user 12 moving closer to the display position of the icon 300B, i.e., toward the – side along the Z direction, as a change in the electrostatic capacitance. The user 12 moves his finger further toward the – side along the Z direction and as soon as he experiences a perception of the fingertip F performing an operation at the display position of the icon 300B in the midair image 300, he moves a fingertip of his left hand toward the other icon in order to perform an operation at the display position of the other icon with the fingertip F of his left hand as directed in the message. The operation detector 13 detects the movement of the fingertip F toward the other icon. The detection reference control unit 204 designates the position taken by the fingertip F in the user's right hand at the time point at which the operation detector 13 detects that the finger of the user 12 is positioned on the other icon as a specified position 50A. The image generation unit 201 calculates, based upon the specified position 50A, a displacement quantity by which the display position of the auxiliary image 31 is to move as it does in the first embodiment. The image generation unit 201 then stores data indicating the displacement quantity for the display position of the auxiliary image 31 having been calculated into the storage unit 205.

It is to be noted that since the position taken by the right-hand finger when the user 12 experiences a perception of performing an operation at the display position of the icon 300B is designated as the specified position, the right-hand finger needs to move toward the midair image 300, i.e., toward the Z direction – side. However, the left-hand finger only needs to be positioned either toward the + side along the Z direction or the Z direction – side relative to the other icon to perform an operation at the display position of the other icon on the left hand side and thus, it is not strictly necessary for the user 12 to move the left-hand finger toward the Z direction – side. The left-hand finger may move along, for instance, a direction parallel to the plane of the midair image 300, i.e., along a lateral direction, until it reaches a point toward the + side along the Z direction or the Z direction – side relative to the other icon.

Furthermore, it is not essential that the user 12 uses a left hand finger and a right hand finger, as long as the operations described above can be detected both on the icon 300B and on the other icon in the calibration midair image 300. For instance, the user 12 may perform these operations by using two fingers of one hand on either side. In addition, instead of performing an operation at the display position of the other icon, the user may press an OK button (not shown) at the display device 1 in variation 5.

Moreover, instead of designating the position taken by the right hand fingertip when the user 12 performs an operation at the display position of the other icon or when the user 12 presses the OK button (not shown) as the specified position, the position of the right hand fingertip when the user 12 makes a predetermined gesture with his left hand may be designated as the specified position. In such a case, the display device 1 will include an image-capturing device 18 in variation 8 to be described later (see FIGS. 24 and 25) so that a gesture of the user 12 (e.g., the hand switching from the sign "stone" to the sign "paper") is detected by using images obtained via the image-capturing device 18.

In reference to the flowchart presented in FIG. 22 pertaining to variation 4 of the first embodiment, the calibration processing executed in the variation will be described. The following explanation will focus on the primary differences from the processing having been described and an explanation of steps in which similar processing is executed is not provided. In step S123 in FIG. 22, the icon 300B and the other icon are brought up on display, and in step S124, the operation detector 13 starts detection of a movement of the fingertip F in the right hand of the user 12 toward the Z direction – side. The user 12 moves his finger further toward the Z direction – side and then performs an operation at the display position of the other icon with his left-hand fingertip at the time point at which he experiences a perception of the right-hand fingertip performing an operation at the display position of the icon 300B in the midair image 300. In step S127, the position taken by the right-hand fingertip at the time point at which the user 12 has performed the operation at the display position of the other icon with his left hand is designated as the specified position 50A and the image generation unit 201 adjusts the display position of the auxiliary image 31 based upon the specified position 50A and stores data indicating the displacement quantity for the auxiliary image 31 representing the adjustment into the storage unit 205.

It is to be noted that while the processing executed in the first calibration processing mode has been explained above, processing will be executed in the second calibration processing mode as shown in the flowchart presented in FIG. 9, in reference to which the first embodiment has been described. However, while detecting an operation performed by the user 12 with his right hand for the icon 30A, the detection reference control unit 204 may detect an operation performed by the user 12 using his left hand at the display position of the other icon in step S24 in the flowchart presented in FIG. 9. In such a case, the detection reference control unit 204 will determine that the position of the fingertip of the right hand of the user 12 is the specified position 50A, instead of determining the reach position, in step S27 and step S29. In step S30, a decision is made as to whether or not the specified position 50A determined in step S29 is in alignment with the detection reference 40.

In variation 5, the user 12 indicates a specified position at which the finger operates the icon during the calibration processing by operating another icon or by operating the OK button at the display device 1. The calibration processing allowing the user 12 to specify the position at which he perceives the icon 300B can be executed with high accuracy in the display device 1. In addition, by allowing the user to indicate the specified position through an operation at another icon or at a button at the display device, the calibration processing can be executed promptly.

(Variation 6 of the First Embodiment)

The user 12 of the display device in variation 6, perceiving that he has performed an operation at the display position of an icon with his fingertip, indicates a specified position by holding the finger still for a predetermined length of time. It is to be noted that while an example in which variation 6 is adopted in the first calibration processing mode in the first embodiment is described below, it may also be adopted in the second calibration processing mode and in variations 1 through 5 described earlier.

In this variation, a message "Point at this icon and hold the finger still for a moment for calibration" is brought up in a superimposed display in an icon included in the calibration midair image. The user 12, perceiving that he has performed an operation at the icon display position, briefly holds the finger still and, in response, the operation detector 13 detects cessation of the downward movement of the finger over a predetermined length of time. The detection reference control unit 204 designates the position at which the finger is held still as the specified position based upon the detection output provided by the operation detector 13 at this time.

The specified position is determined as described below. Namely, it is decided that an operation has been performed at the display position of an icon 300A when the fingertip F, having been moving toward the − side along the Z direction, comes to a stop and is held still within a relatively small predetermined holding range taken along the Z direction over a length of time equal to or greater than a predetermined time length. It is decided that an operation has been performed at the display position of the icon 300A with the fingertip F when the fingertip F stays within the specific holding range over the predetermined time length or longer, as described above, based upon the following rationale. Namely, the operation performed by user 12 at the display position of the icon 300A in the midair image 300 is different from an operation performed at a touch panel and the fingertip F may not become completely still at the display position of the icon 300A. It is to be noted that the predetermined holding range in reference to which the specified position is determined will be set to a value sufficiently small relative to the electrostatic capacitance detection range 13A of the operation detector 13, e.g., 5 mm, and the predetermined time length will be set to, for instance, 2 sec.

In variation 6, the user 12 specifies a position at which he performs an icon operation with his finger by holding the fingertip F still during the calibration processing. Since the user 12 is able to specify the position at which he perceives the icon 300A to be located, the display device 1 is able to execute accurate calibration processing.

(Variation 7 of the First Embodiment)

The user 12 of the display device in variation 7 indicates with his voice the specified position at which he experiences a perception of performing an operation with his fingertip at an icon display position. It is to be noted that while an example in which variation 7 is adopted in the first calibration processing mode in the first embodiment is described below, it may also be adopted in the second calibration processing mode and in variations 1 through 6 described earlier.

Figure 23:
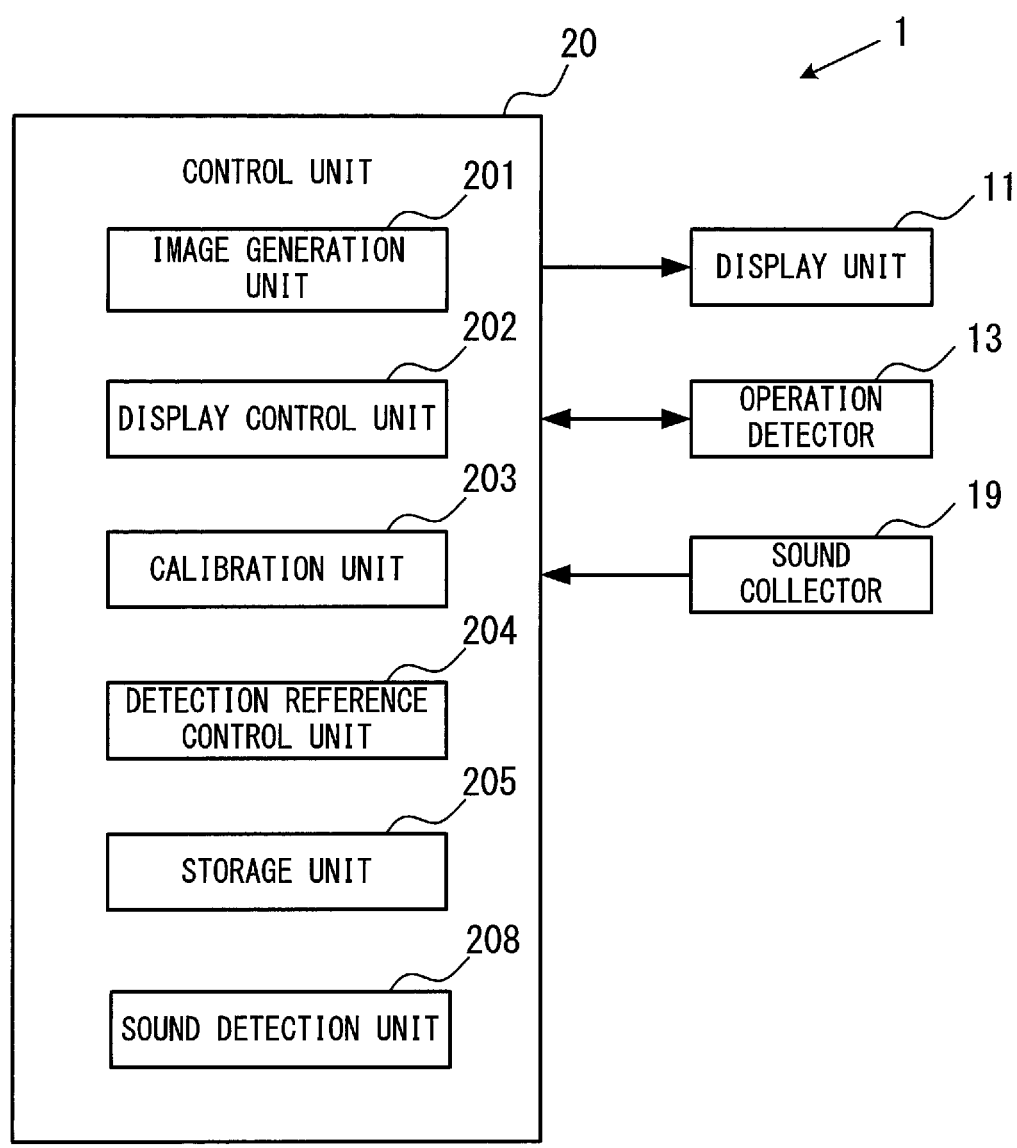

FIG. 23 is a block diagram showing the control unit 20, and the display unit 11 and an operation detector 13 controlled by the control unit 20, among the structural components in the display device 1 in this variation. The display device 1 includes a sound collector 19, with a sound detection unit 208 installed in the control unit 20. The sound collector 19 collects sound around the display device 1 and outputs the collected sound as audio data to the sound detection unit 208. The sound collector 19 may be a commonly available microphone. The sound detection unit 208 designates the audio data provided from the sound collector 19 and makes a decision as to whether or not the audio data express the word "yes".

After the calibration unit 203 in FIG. 23 starts up the first calibration processing mode, the image generation unit 201 generates display image data, and the display unit 11 brings up a display image to be used in the calibration processing based upon the display image data. A midair image 300 brought up on display in this situation includes the calibration icon 300B shown in FIG. 20 in reference to which variation 4 of the first embodiment has been described, and a message "Touch this icon and say yes for calibration", instead of the message in FIG. 20, is superimposed on the calibration icon 300B.

The user 12, following the instructions in the message brought up in the superimposed display at the icon 300B, moves his fingertip toward the icon 300B in order to perform an operation at the display position of the icon 300B. The user 12 says "yes" as directed in the message when he perceives that his fingertip has touched the icon 300B. The operation detector 13 detects the movement of the fingertip toward the − side along the Z direction. The sound collector 19 picks up the user's voice and outputs it as audio data to the sound detection unit 208. As the sound detection unit 208 decides that the audio data correspond to "yes", the detection reference control unit 204 designates the position taken by the fingertip, detected by the operation detector 13 at the exact time point, as a specified position 50A. The image generation unit 201 adjusts the display position of the auxiliary image 31 by calculating a displacement quantity by which the display position of the auxiliary image 31 is to move as it does in the first embodiment. The image generation unit 201 then stores data indicating the displacement quantity having been calculated into the storage unit 205.

The calibration processing described above will be explained in reference to the flowchart presented in FIG. 22 pertaining to variation 4 of the first embodiment. Since only the calibration processing executed in step S126 in FIG. 22 is distinguishable from that executed variation 4, the explanation will focus on step S126 in FIG. 22 and a repeated execution of the processing executed in other steps will not be provided. In step S126 in FIG. 22, the sound detection unit 208 makes a decision as to whether or not the user 12 has said "yes" based upon the output from the sound collector 19. If an affirmative decision is made in step S126, i.e., if it is decided that the user 12, perceiving that he has touched the icon 300B, has said "yes", the detection reference control unit 204 designates the position of the fingertip at the time point at which the sound detection unit 208 recognizes the word "yes" as the specified position 50A, i.e., determines or decides it to be the specified position 50A.

It is to be noted that while the processing executed in the first calibration processing mode is explained above, processing will be executed in the second calibration processing mode as shown in the flowchart presented in FIG. 9, in reference to which the first embodiment has been described. However, if an operation performed by the user 12 with respect to the icon 30A is detected in step S24 in the flowchart presented in FIG. 9 and the sound detection unit 208 recognizes the word "yes", the detection reference control unit 204 designates the specified position 50A instead of determining the reach position in step S27 and step S29. In step S30, a decision is made as to whether or not the specified position 50A designated in step S29 is in alignment with the detection reference 40.

In variation 7, the user 12 vocally indicates the specified position taken by his finger when he perceives that an operation has been performed at the display position of the icon. By allowing the user 12 to indicate the reach position with his voice, the display device 1 is able to execute the calibration processing quickly.

It is to be noted that the display device 1 does not need to include the sound collector 19 and the sound detection unit 208 and in such a configuration may execute sound detection by using audio data obtained at an external sound collecting device and input thereto from the external sound collecting device via either a wireless means or a wired means.

(Variation 8 of the First Embodiment)

Figure 24:
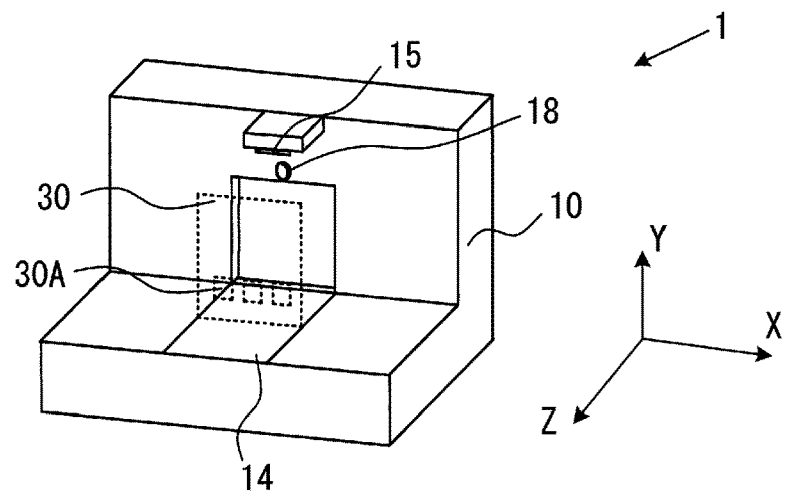
Figure 24:
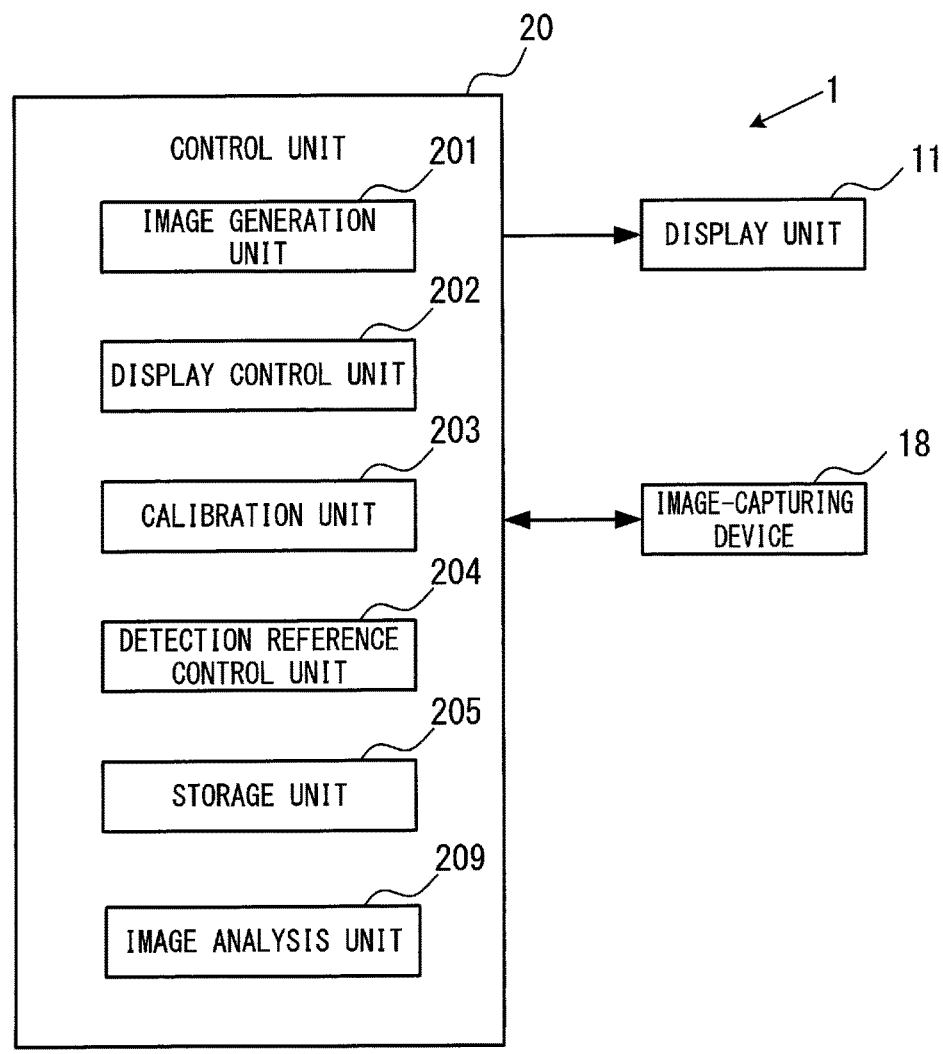

While the downward movement of the fingertip of the user 12 is detected by the operation detector 13 configured with a capacitive panel in the description provided above, the position of the fingertip of the user 12 may be detected by an image-capturing device, instead. The display device 1 in variation 8 includes an image-capturing device (e.g., a digital camera) 18 to function as an operation detector, disposed at the upper surface of the display device 1, as shown in FIG. 24(*a*). A block diagram pertaining to such a display device 1 is provided in FIG. 24(*b*).

The control unit 20 of the display device 1 in the block diagram presented in FIG. 24(*b*) includes an image analysis unit 209. The image-capturing device 18 captures an image of an object located above the display unit 11, i.e., the finger of the user 12, and the captured image is input to the image analysis unit 209. The image analysis unit 209 determines the position of the fingertip of the user 12 by analyzing the captured image input from the image-capturing device 18. Namely, the image analysis unit 209 makes a decision based upon the position of the image of the finger within the captured image, with respect to a specific icon, among the plurality of icons, being operated with the fingertip of the user 12. In addition, the image analysis unit 209 compares the size of the finger image within the captured image with a standard finger size, and more specifically, with the size of a finger at a predetermined heightwise position, an image of which has been captured in advance, so as to determine the heightwise position of the finger, i.e., the position taken by the descending finger. Through this process, the position of the fingertip of the user 12 within the three-dimensional space can be determined. The display device 1 in variation 8 structured as described above is capable of obtaining, through analysis of the captured image provided via the image-capturing device 18, information similar to the information pertaining to the fingertip position obtained via the operation detector 13 configured with a capacitive panel. Thus, the display device in variation 8 is able to execute processing similar to that executed in the embodiment and the variations thereof described earlier, by using the image-capturing device 18 instead of the capacitive panel having been described in reference to the embodiment and the variations 1 through 7 thereof.

While the image analysis unit 209 in the display device 1 in variation 8 calculates the heightwise position of the finger based upon the size of the finger in the captured image, the image-capturing device 18 may instead detect the heightwise position of the finger via a phase focus detection device and an image recognition device mounted in the digital camera. In more specific terms, the image recognition device may recognize a finger, the phase focus detection device may detect a defocus quantity with respect to the finger recognized by the image recognition device and the heightwise position of the finger may be calculated based upon the defocus quantity. Furthermore, the heightwise position of the finger may be likewise detected via a contrast focus detection device that may be mounted in the digital camera instead of the phase focus detection device.

It may be ideal to configure the image-capturing device 18 with a camera having installed therein a TOF (time of flight) device instead of a phase focus detection device or a contrast focus detection device. A TOF camera emits infrared radiation from the camera body, receives infrared light that is reflected off a target object and then enters the TOF camera, and calculates the distance from the TOF camera to the target object based upon a phase change having occurred in the received light relative to the emitted light. Accordingly, by designating the fingertip of the user 12 as the measurement target object, emitting infrared light from the TOF camera toward the fingertip of the user 12 and receiving light reflected from the fingertip, the distance from the TOF camera to the fingertip of the user 12 can be determined. It is desirable that the image-capturing device 18 include an image-capturing lens constituted with a wide-angle lens so as to cover the entire midair image 30 and such an image-capturing lens may be a fisheye lens. In addition, the display device may include a plurality of image-capturing devices (e.g., two image-capturing devices) and the position of the fingertip of the user 12 may be detected based upon captured images provided from the plurality of image-capturing devices.

Figure 25:
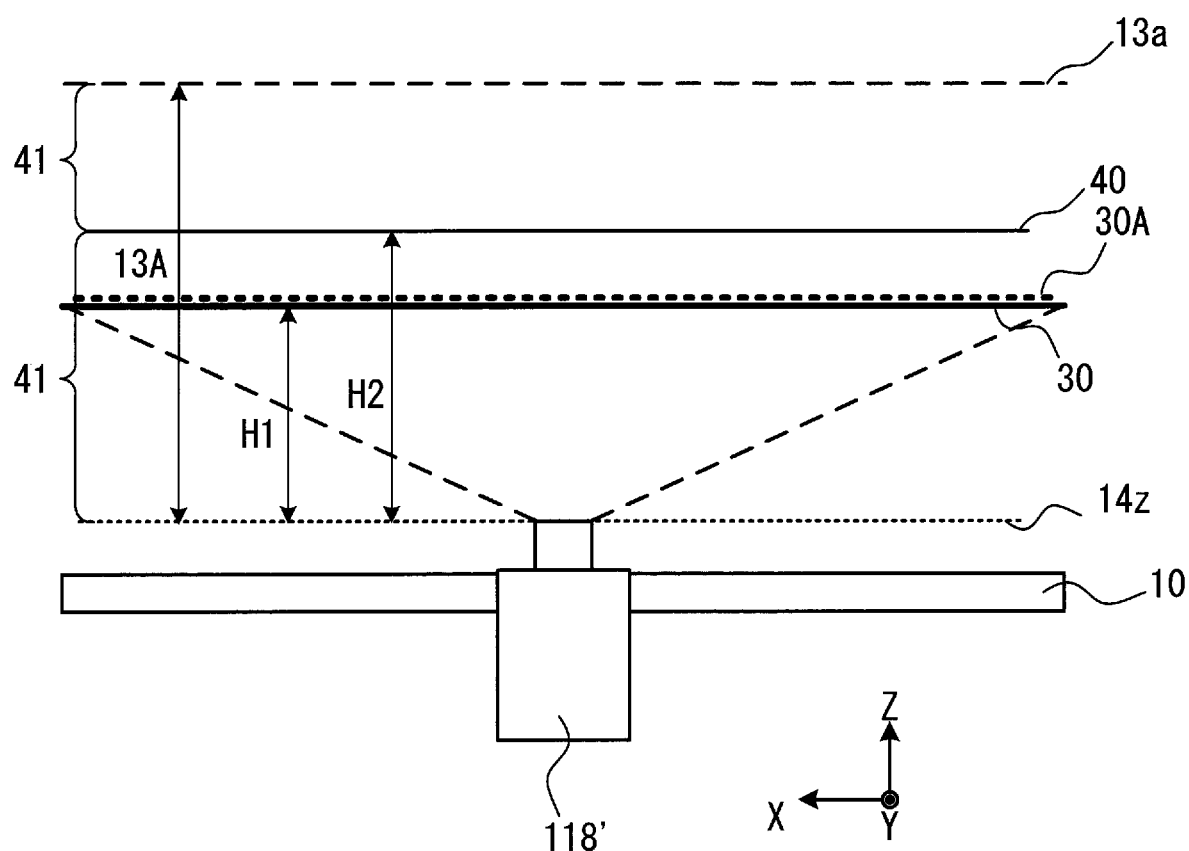
FIG. 25 A sectional view of the internal structure in the display device in variation 8 of the first embodiment FIG. 26 Illustrations of the display device in a second embodiment in a perspective in (a) and in a block diagram showing the essential configuration of the display device in (b)

FIG. 25 presents an example of a display device 1 equipped with a TOF camera. FIG. 25 simply shows the internal structure of the display device 1 and does not provide an illustration of the display device body. As FIG. 25 shows, an installation space for a TOF camera 118' is formed at the surface of the body 10 and the TOF camera 118' is disposed in this installation space. The TOF camera 118' radiates infrared light onto the fingertip of the user 12 by scanning infrared light over a predetermined range and measures the distance from the TOF camera 118' to the fingertip of the user 12 based upon a change in the phase of the reflected light. Based upon the distance and the infrared emission direction, the position of the fingertip of the user 12 in the three-dimensional space relative to the TOF camera 118' can be determined. In other words, the specific position within the midair image plane corresponding to the fingertip position and the distance that sets the fingertip position apart from the surface of the display device 1 can be determined. Information similar to detection information indicating the fingertip position obtained in conjunction with a capacitive panel can thus be obtained based upon the range-finding results provided by the TOF camera 118'. It is to be noted that while an installation space for the TOF camera 118' is formed at the surface of the display device 1 and the TOF camera 118' is disposed in this space in the description provided above, the present variation is not limited to this example and it may be adopted in a configuration that includes a TOF camera 118' installed outside the display unit 11.

At the display device 1 in variation 8, too, a midair image 30 is formed at a position set apart by a distance H1 from an end portion 14*z* of the stage 14 located toward the − side along the Z direction in the display device 1, and the detection reference 40 is set at a position set apart by a distance H2 (H1<H2) from the end portion 14*z* of the stage 14 located toward the − side along the Z direction, as illustrated in FIG. 25. The TOF camera 118' assumes a detection range 13A set further upward relative to the stage 14 (toward the Y direction + side) for detection of the position of the fingertip of the user 12 along the Z direction. In FIG. 25, the limit to the range over which images can be captured is indicated by a dotted line 13*a* toward the + side along the Z direction relative to the TOF camera 118' and the detection range 13A is defined as the space between detection limit 13*a* and the end portion 14*z* of the stage 14. In variation 8, too, the midair image 30 and the detection reference 40 are set inside the detection range 13A, as in the first embodiment and variations 1 through 8 described earlier. It is to be noted that while the detection reference 40 in FIG. 25 is set further toward the + side along the Z direction relative to the midair image 30, it may instead be set further toward the − side along the Z direction relative to the midair image 30 or in alignment with the position of the midair image 30, as long as it is set within the detection range 13A. In addition, a range other than the zone set as the detection reference 40 within the detection range 13A is referred to as a detection reference outside range 41 in the description of variation 8. It is to be noted that instead of setting the detection range 13A by defining the limit to the range over which an image can be captured with the TOF camera 118', the detection range 13A may be set as a range made up with part of the range over which an image can be captured by taking off part of the image-capturing enabled range (e.g., predetermined ranges at the left and the right ends in FIG. 25).

The display device 1 in variation 8 described above includes an image-capturing device 18 instead of a capacitive panel functioning as an operation detector 13. However, the display device 1 may include both an operation detector 13 and an image-capturing device 18. In such a case, the detection range 13A of the operation detector 13 shown in FIG. 3(*c*) may be divided into, for instance, two parts, i.e., a Z direction + side range and a Z direction − side range, so as to form a detection range on the Z direction − side (a detection range closer to the end portion 14z of the stage 14) and a detection range on the Z direction + side (a detection range further away from the end portion 14z of the stage 14). The Z direction − side detection range and the Z direction + side detection range may be respectively designated as the detection range for the capacitive panel and as the detection range for the image-capturing device 18. In this configuration, as the user 12 moves his finger from the + side along the Z direction in order to perform an operation at the display position, the image-capturing device 18 detects the first half of the movement of the finger and the capacitive panel detects the second half of the movement of the finger. Generally speaking, highly accurate detection is enabled via the capacitive panel over a range set in close proximity to the end portion 14z of the stage 14, whereas it may not always be possible to capture an image with the image-capturing device 18 over a range set in close proximity to the end portion 14z of the stage 14. For this reason, it is desirable to assign different detection ranges to the capacitive panel and the image-capturing device 18 as described above. It is to be noted that the detection range 13A does not need to be divided into two equal parts along the Z direction and instead, it may be divided into parts that are not equal. In addition, an operation detector 13 configured with another device, such as a proximity sensor, instead of the capacitive panel or the image-capturing device 18, may be used. This means that detection ranges formed by dividing the detection range 13A may be assigned to various operation detectors 13.

The velocity·acceleration detection unit 206 shown in FIG. 17 is also capable of calculating the velocity and the acceleration with which the finger moves based upon a captured image provided by the TOF camera 118' in FIG. 25. Accordingly, in correspondence to each of the upper and lower detection ranges formed by dividing the detection range 13A, the finger movement velocity or the finger movement acceleration may be calculated so as to enable the reach position predicting unit 207 to predict the reach position of the finger.

In addition, instead of the image-forming optical system 9, having been explained in reference to the first embodiment and variations 1 through 8 thereof, an image-forming optical system 9 configured with a half mirror and a retro-reflective member may be used. A retro-reflective member may be constituted with a reflecting member that includes, for instance, a plurality of three-dimensional prisms with a form of right angle triangular pyramid and reflects light having entered therein back along the same optical path. In a structure that includes such a component, light having departed the display unit 11 is reflected at the half mirror (or transmitted through the half mirror), enters the retro-reflective member and is then reflected along the same optical path. The light reflected at the retro-reflective member forms an image as it advances through the same optical path. The light having departed the retro-reflective member re-enters the half mirror, is transmitted through the half mirror (or is reflected at the half mirror) and forms a midair image by forming an image at a position conjugate with the display unit 11.

It is to be noted that while the display device 1 in the first embodiment and its variations 1 through 8 described above includes at least the control unit 20, the display unit 11 and the operation detector 13, the present embodiment and variations may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the first embodiment or any of variations 1 through 8. In addition, the control device described above may be built into any of various types of electronic devices adopting the first embodiment and the variations thereof.

Furthermore, the present embodiment and variations may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the first embodiment or variations 1 through 8, a structural element among the structural elements described earlier may be added into the detection device as deemed necessary.

Second Embodiment

In reference to drawings, a display device 1 in the second embodiment will be described. The second embodiment will be described in reference to an example in which the display device 1 in the embodiment is mounted in an operation panel. It is to be noted that the display device 1 in the embodiment does not need to be mounted in an operation panel and may be mounted in any type of electronic apparatus as has been explained in reference to the first embodiment and variations thereof.

The display device 1 described in the first embodiment and its variations displays a second image so as to lead the user 12 to perceive the position of the icon constituting a first display along the Z direction. The display device in the second embodiment uses an actual physical object so as to lead the user 12 to perceive the position of the icon along the Z direction.

Figure 26:
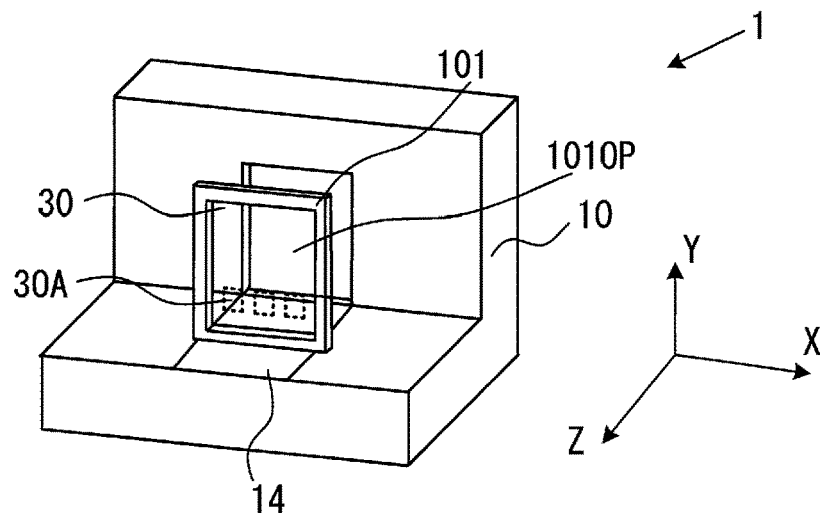
Figure 26:
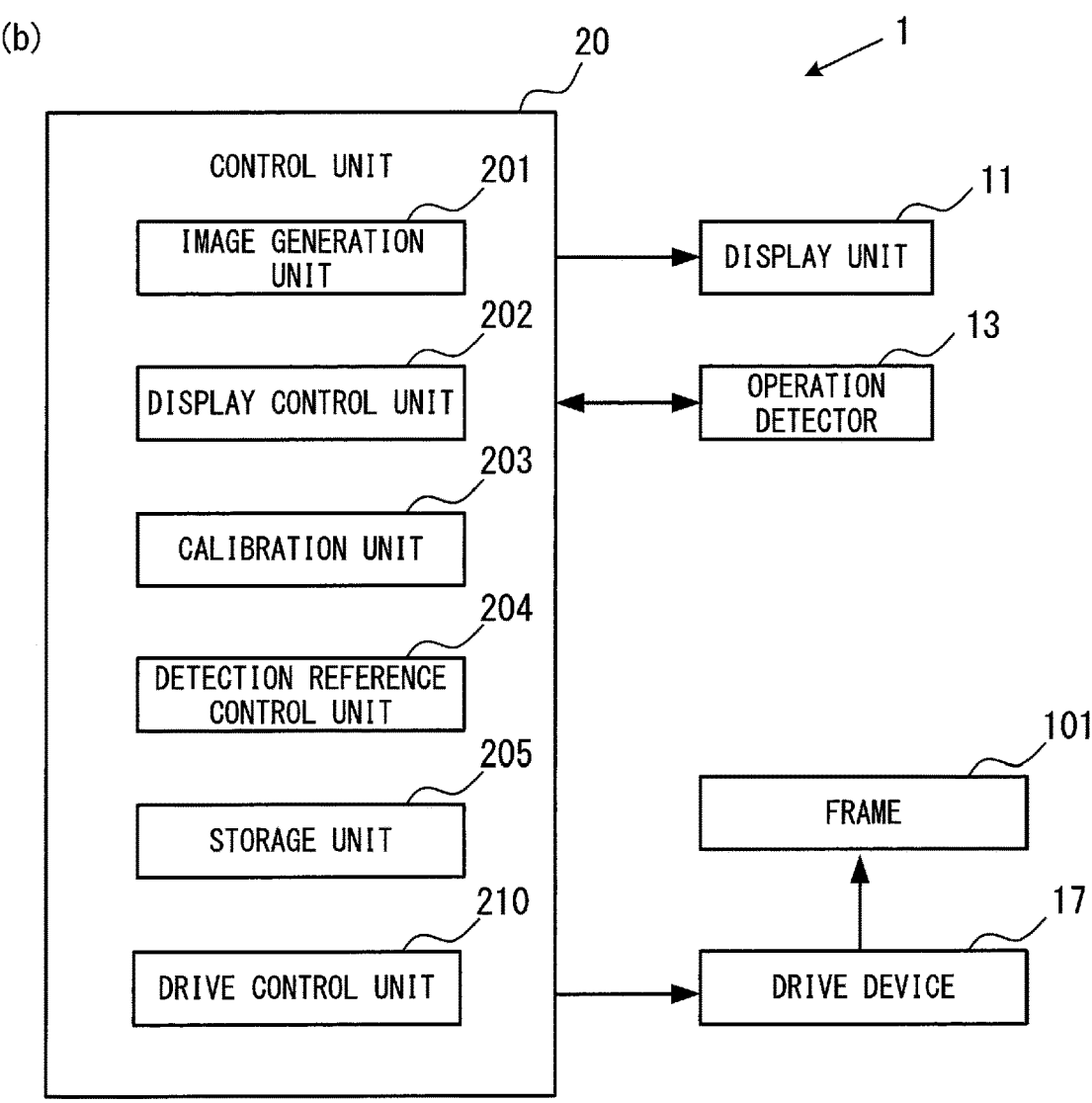

FIG. 26(a) is an external perspective of the display device 1 in the second embodiment and FIG. 26(b) is a block diagram of the essential configuration of the display device 1. In addition to the structural elements of the display device 1 in the first embodiment, the display device 1 further includes a physical frame 101 and a drive device 17 that drives the frame 101 along the Z direction. The control unit 20 includes a drive control unit 210 that controls operations of the drive device 17, in addition to the structural elements of the control unit 20 in the first embodiment shown in FIG. 2. However, the display device 1 does not need to include a projector 15 and a projector control unit 200.

It is to be noted that it may include an image-capturing device 18, as does the display device 1 in variation 8 of the first embodiment shown in FIG. 24 and FIG. 25. In addition, the display device 1 in the second embodiment may detect a reach position or a specified position by adopting any of the various methods explained in reference to the first embodiment and the variations of the first embodiment.

The frame 101, positioned on the stage 14 so as to range parallel to the XY plane, is disposed so that it is allowed to move over the stage 14 along the Z direction. The frame 101 includes an opening 101OP formed over a central area thereof, and a midair image 30 is displayed in the opening 101OP. The drive device 17 includes guide rails disposed along the Z direction, along which the frame 101 is driven and a motor, an actuator or the like that drives the frame 101 along the guide rails.

It is to be noted that while the frame 101 has a shape that would enclose the entire periphery of the midair image 30 in the example presented in FIG. 26(a), the second embodiment is not limited to this example and it may instead take a shape that would surround only part of the periphery of the midair image 30 (e.g., at least part of the sides located on the X direction + side, the X direction − side, the Y direction + side and the Y direction − side). In other words, the frame 101 that encloses the midair image 30 may take a shape that includes a gap present at part thereof.

It is to be noted that the display device 1 does not need to include a physical frame 101. The display device 1 may instead adopt a structure that allows a physical object such as a desk, a chair, a stage or the like to move along the Z direction. In conjunction with a physical object such as a desk, a chair, a stage or the like, a midair image 30 will be displayed at the upper surface of the desk, the chair, the stage or the like. It is to be noted that such a physical object is preferably related to the midair image 30 brought up on display. For instance, when the midair image 30 displayed by the display device 1 is a painting, a picture frame may be used as the physical object. In addition, when the midair image 30 displayed by the display device 1 is, for instance, a beverage bottle or the like, a desk may be used as the physical object. Furthermore, when the midair image 30 displayed by the display device 1 is a music score, a music stand may be used as the physical object, and when the midair image 30 displayed by the display device 1 is an alarm clock, a bed may be used as the physical object.

While the calibration processing is executed in the first calibration processing mode in the example explained below, it may also be executed in the second calibration processing mode. It is to be noted that while the reach position 50 having been explained in reference to the first embodiment is the position at which an operation performed by the user 12 is detected in the example explained below, the calibration processing may be executed in conjunction with any of the reach position and the specified position described in reference to the first embodiment and the variations thereof.

Figure 27:
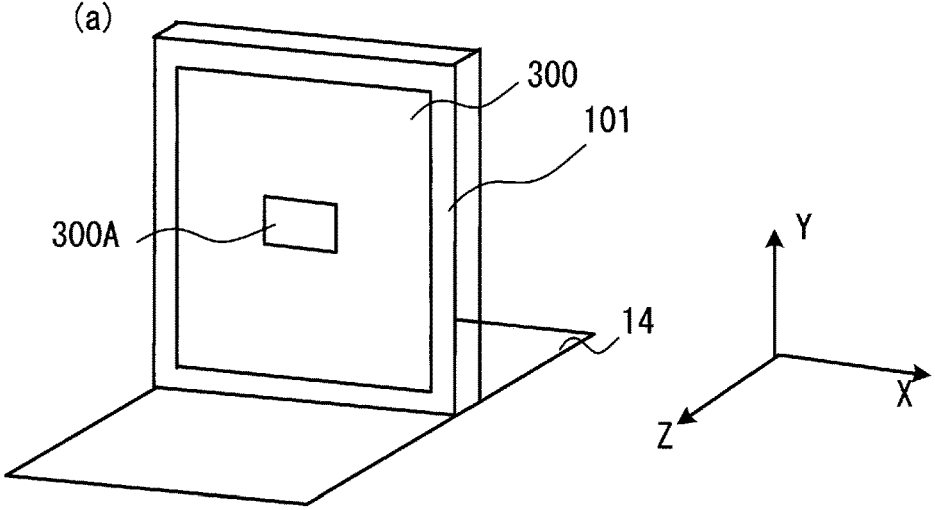
FIG. 27 Schematic illustrations each indicating the display position at which a midair image is displayed relative to a frame in the second embodiment FIG. 28 A flowchart of the calibration processing executed in the first calibration processing mode in the second embodiment FIG. 29 Schematic illustrations indicating a positional relationship between the midair image display position and the frame in variation 1 of the second embodiment FIG. 30 Illustrations of the display device in variation 3 of the second embodiment in a perspective in (a) and in a block diagram showing the essential configuration of the display device in (b)
Figure 27:
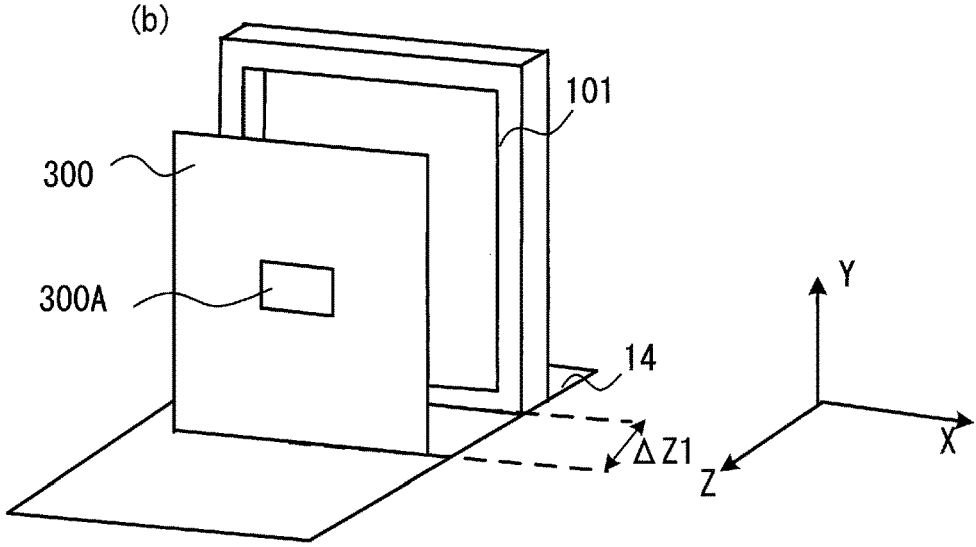
Figure 27:
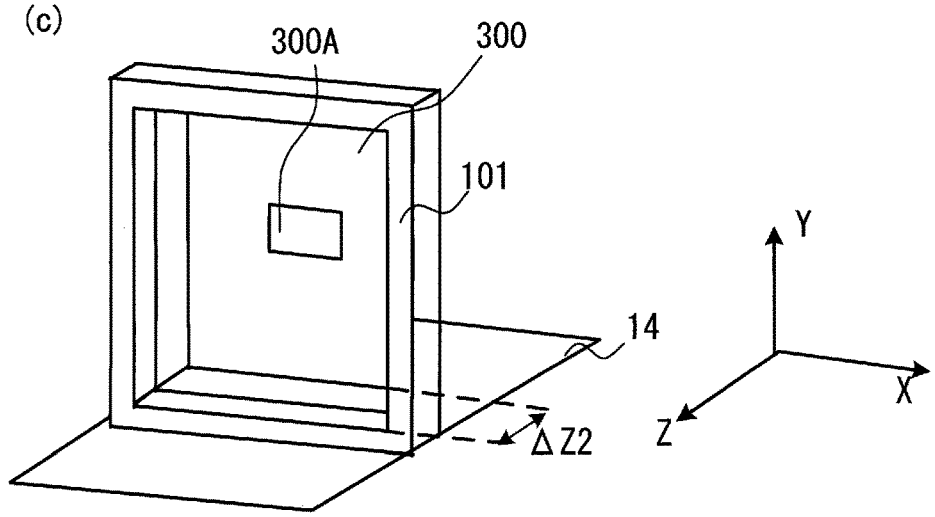

FIG. 27 schematically illustrates a midair image 300 displayed by the display device 1 in the second embodiment. The midair image 300 includes a calibration icon 300A similar to that described in reference to the first embodiment (see FIG. 4(a)). FIG. 27(a) shows the icon 300A in an initial display. The user 12 perceives the display position of the icon 300A along the Z direction based upon its positional relationship to the frame 101 along the Z direction.

When the reach position 50 determined in correspondence to an operation performed by the user 12 for the icon 300A in the initial display is located further toward the user 12 (toward the + side along the Z direction) relative to the detection reference 40 (as in the situation shown in FIG. 5(b)), the control unit 20 creates a perception in the user 12 as if the icon 300A takes a position further away from the user, i.e. further toward the − side along the Z direction, in comparison to the position taken in the initial display. In this situation, the drive control unit 210 calculates a drive quantity ΔZ1 representing the extent to which the frame 101 is to be driven toward the − side along the Z direction, based upon the distance between the reach position 50 and the detection reference 40 measured along the Z direction and outputs the calculated drive quantity as a drive signal to the drive device 17. The drive device 17 having received the drive signal input thereto drives the frame 101 toward the − side along the Z direction.

FIG. 27(b) schematically illustrates the positional relationship between the icon 300A and the frame 101 having been driven toward the − side along the Z direction as described above. With the frame 101 driven further away from the user 12, i.e., toward the − side along the Z direction, by the displacement quantity ΔZ1, the user 12, having perceived the display position of the midair image 30 along the Z direction in reference to the frame 101, experiences a perception as if the midair image 30 is displayed at a point further toward the − side along the Z direction. As a result, the user 12 is expected to perform an operation for the midair image 30 at a position further toward the − side along the Z direction.

When the reach position 50 determined in correspondence to an operation performed by the user 12 for the icon 300A in the initial display is located further away from the user 12 (toward the − side along the Z direction) relative to the detection reference 40 (as in the situation shown in FIG. 5(d)), the control unit 20 creates a perception in the user 12 as if the icon 300A takes a position closer to the user 12, i.e. further toward the + side along the Z direction, in comparison to the position taken in the initial display. In this situation, the drive control unit 210 calculates a drive quantity ΔZ2, representing the extent to which the frame 101 is to be driven toward the + side along the Z direction, based upon the distance between the reach position 50 and the detection reference 40 measured along the Z direction and outputs the calculated drive quantity as a drive signal to the drive device 17. The drive device 17 having received the drive signal input thereto drives the frame 101 toward the + side along the Z direction.

FIG. 27(c) schematically illustrates the positional relationship between the icon 300A and the frame 101 having been driven toward the + side along the Z direction as described above. With the frame 101 driven further toward the user 12, i.e., toward the + side along the Z direction, the user 12, having perceived the display position of the midair image 30 along the Z direction in reference to the frame 101, experiences a perception as if the midair image 30 is displayed at a point further toward the + side along the Z direction. As a result, the user 12 is expected to perform an operation for the midair image 30 at a position further toward the + side along the Z direction.

It is to be noted that the distance between the reach position 50 and the detection reference 40, measured along the Z direction, is correlated in advance to the drive quantity and the drive direction by which the frame 101 is to be driven along the Z direction, based upon results of testing or the like, and correlation data indicating the correlation are stored in advance in the storage unit 205. The drive control unit 210 calculates a drive quantity for the frame 101 by referencing the correlation data.

Figure 28:
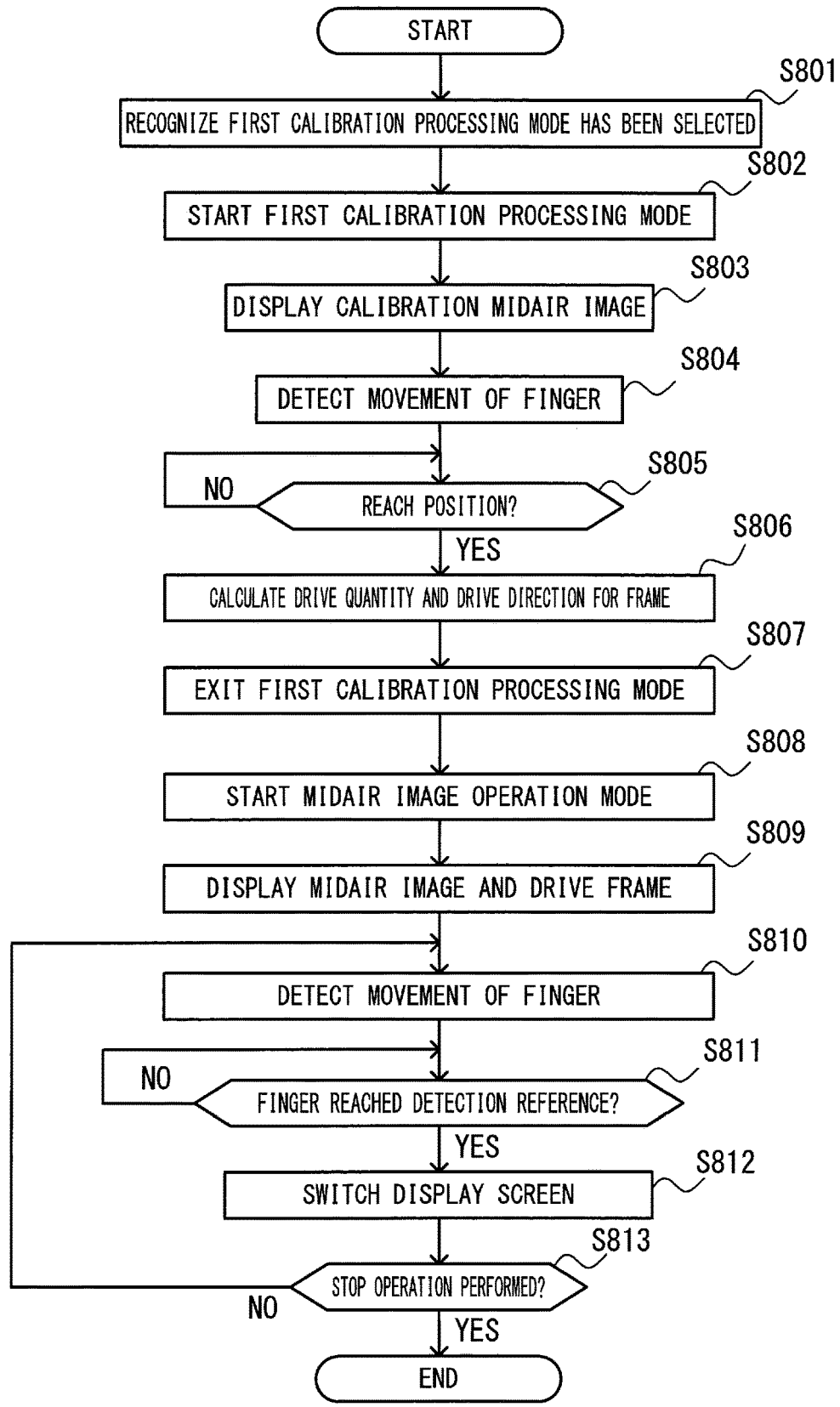

In reference to the flowchart presented in FIG. 28, the processing executed in the display device 1 in the first calibration processing mode in the second embodiment will be explained.

The processing executed in step S801 through step S805 is similar to that executed in the first embodiment in steps S1 through S6 in the flowchart presented in FIG. 7. In step S806, the drive control unit 210 calculates a drive quantity and a drive direction for the frame 101 based upon the distance between the reach position or the specified position and the detection reference 40, and then the operation proceeds to step S807. The processing executed in step S807 through step S813 is similar to that executed in the first embodiment in steps S7 through S13 in the flowchart presented in FIG. 7. However, in step S809, a midair image 30 is brought up on display and also, the drive control unit 210 drives the frame 101 based upon the drive quantity and the drive direction calculated in step S807 by controlling the drive device 17.

It is to be noted that this processing will be executed in the second calibration processing mode as shown in the flowchart presented in FIG. 9 in reference to which the first embodiment has been explained. However, instead of executing the processing in step S28 and step S32 in FIG. 9, a drive quantity and a drive device will be calculated for the frame 101, as in step S806 in FIG. 28, and the frame 101 will be driven based upon the drive quantity and the drive direction thus calculated, as in step S809 in FIG. 28.

The drive control unit 210 in the second embodiment alters the positional relationship between a midair image 300 and an actual physical object (the frame 101) taking a position different from that of the midair image 300 by controlling the physical object. As a result, a perception is created in the user 12 as if the midair image 30 is present at the position of the physical object and thus, an operation performed by the user 12 can be detected at the detection reference 40.

In addition, the drive control unit 210 in the second embodiment determines the direction along which the frame 101 is to move based upon whether or not the reach position 50 of the operation performed by the user 12 has arrived at the detection reference 40. It is thus ensured that the reach position 50 of the operation performed by the user 12 reliably arrives at the detection reference 40 through the calibration processing.

Furthermore, the drive control unit 210 in the second embodiment moves the frame 101 along a direction determined based upon the operation performed by the user 12 or along a direction opposite from the direction determined based upon the operation performed by the user 12. As a result, the user 12 is led to adjust the position at which he performs an operation along the Z direction so as to ensure that the user operation can be detected at the detection reference 40.

Moreover, if an operation performed by the user 12 does not reach the detection reference 40 (see FIG. 5(b)), the drive control unit 210 in the second embodiment moves the position of the frame 101 along a direction determined based upon the operation performed by the user 12. In other words, a perception is created in the user 12 as if the position of the icon 300A has been altered along a direction running away from the user 12. This means that the user 12 is led to perform an operation further toward the − side along the Z direction so as to ensure that the user operation reaches the detection reference 40.

In addition, if an operation performed to the user 12 reaches the detection reference (see FIG. 5(d)), the drive control unit 210 in the second embodiment moves the position of the frame 101 along a direction opposite from the direction determined based upon the operation performed by the user 12. Namely, a perception is created in the user 12 as if the position of the icon 300A has been altered along a direction running toward the user 12. Thus, the user 12 is led to perform an operation at a position closer the user 12 so as to ensure that the operation performed by the user 12 is in alignment with the detection reference 40.

The drive control unit 210 in the second embodiment adjusts the positional relationship between the detection reference 40 and a physical object, i.e., the frame 101, by controlling the position of the frame 101. The perception experienced by the user 12 as if a midair image 300 is present at the position taken by the physical object, i.e., the frame 101, which is created through these measures, will lead the user 12 to perform the operation at the detection reference 40 and the operation can, therefore, be detected at the detection reference 40.

The drive control unit 210 in the second embodiment moves the position of the frame 101 by controlling the drive device 17. Thus, a perception is created in the user 12 as if the midair image 300 also moves as the position of the frame 101 moves, which will lead the user 12 to adjust the position at which he performs an operation to the position of the detection reference 40.

(Variation 1 of the Second Embodiment)

Figure 29:
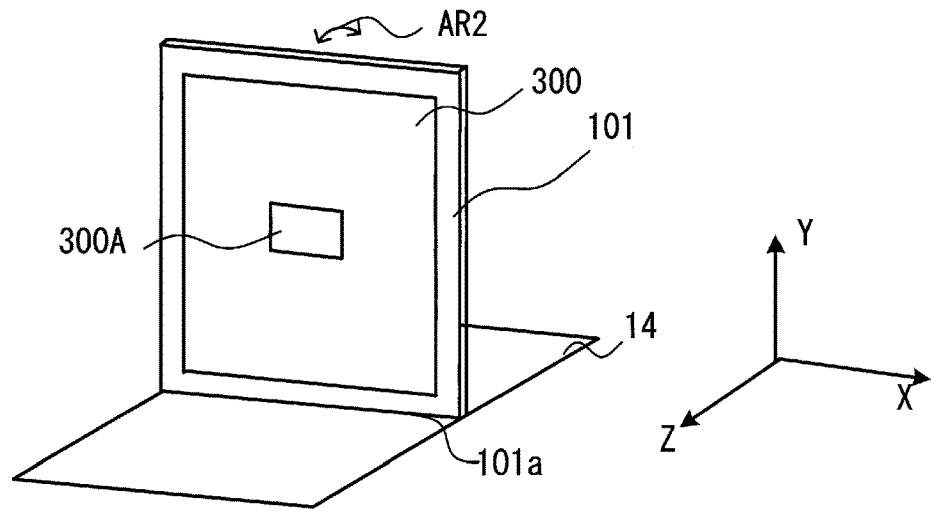
Figure 29:
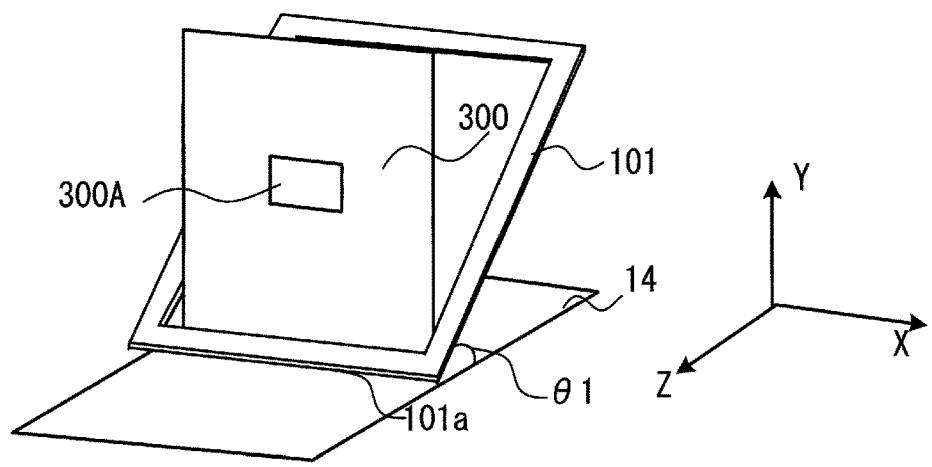
Figure 29:
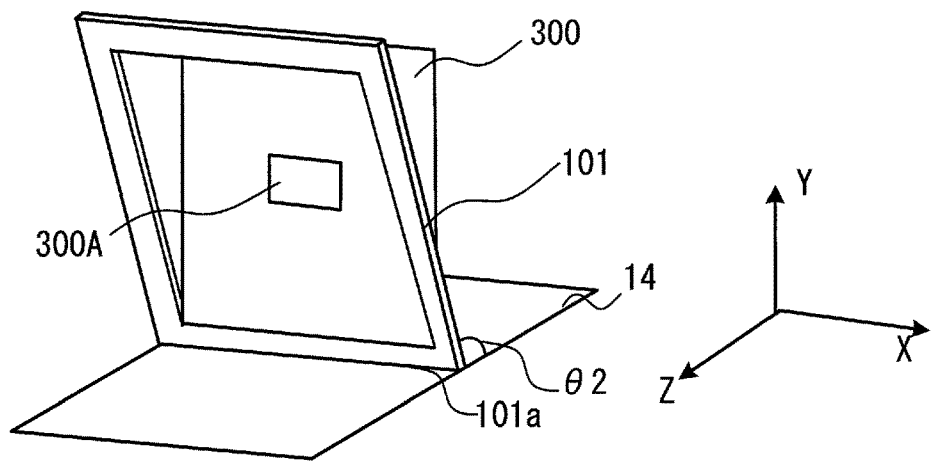

While a physical object, i.e., the frame 101, moves along the Z direction in the example explained in reference to the second embodiment, the frame 101 may move in a manner different from this. FIG. 29 schematically illustrates the positional relationship between a midair image 300 and a frame 101. The frame 101 is disposed on the stage 14 along a lower side 101a of the frame 101 and is allowed to rotate around an axis running along the lower side 101a. The drive device 17 is an actuator that causes the frame 101 to rotate around the axis running along the lower side 101a. Namely, the frame 101 rotates along a direction indicated by an arrow AR2 in FIG. 29.

FIG. 29(a) shows the midair image 300 in an initial display. In this situation, the drive device 17 drives the frame 101 to a position forming a tilt angle of 90° relative to the ZX plane. If it is determined based upon the results of the calibration processing that the reach position or the specified position is located further toward the user 12 (toward the + side along the Z direction) relative to the detection reference 40 (see FIG. 5(b)), the drive device 17 drives the frame 101 to a position at which the frame 101 forms a tilt angle θ1, smaller than 90° along the counterclockwise direction viewed from the X direction + side, relative to the ZX plane. The drive control unit 210 calculates the tilt angle θ1 based upon the distance between the reach position or the specified position related to an operation performed by the user 12 and the detection reference 40.

FIG. 29(b) schematically illustrates the positional relationship of the frame 101, with the tilt angle having been adjusted to θ1, to the midair image 300. With the tilt angle having been adjusted to θ1 (<90°), the frame 101 rotates toward the side further away from the user. Thus, the user 12, perceiving that the display position of the midair image 300 is in alignment with the position of the frame 101, experiences a perception as if the display position of the midair image 300 has also moved toward the Z direction − side as the position of the frame 101 has moved toward the Z direction − side.

If it is determined based upon the results of the calibration processing that the reach position or the specified position is located further away from the user 12 (toward the − side along the Z direction) relative to the detection reference 40 (see FIG. 5(d)), the drive device 17 drives the frame 101 to a position at which the frame 101 forms a tilt angle θ2, greater than 90°, relative to the ZX plane. The drive control unit 210 calculates the tilt angle θ2 based upon the distance between the reach position or the specified position related to an operation performed by the user 12 and the detection reference 40.

FIG. 29(c) schematically illustrates the positional relationship of the frame 101, with the tilt angle having been adjusted to θ2, to the midair image 300. With the tilt angle having been adjusted to θ2 (>90°) along the counterclockwise direction viewed from the X direction + side the frame 101 rotates toward the side closer to the user. Thus, the user 12, perceiving that the display position of the midair image 300 is in alignment with the position of the frame 101, experiences a perception as if the display position of the midair image 300 has also moved toward the + side along the Z direction as the position of the frame 101 has moved toward the + side along the Z direction.

It is to be noted that the distance between the reach position 50 and the detection reference 40, measured along the Z direction, is correlated in advance to the tilt angle formed by the frame 101 relative to the XY plane based upon results of testing or the like and correlation data indicating the correlation are stored in advance in the storage unit 205. The drive control unit 210 calculates a tilt angle for the frame 101 by referencing the correlation data.

The calibration processing executed when the display device 1 is set in the first calibration processing mode in variation 1 of the second embodiment will be explained next. In this case, the drive control unit 210 calculates a tilt angle instead of a drive quantity and a drive direction for the frame 101 during the processing executed in step S806 in the flowchart presented in FIG. 28 in reference to which the second embodiment has been described.

It is to be noted that the calibration processing will be executed in the display device 1 set in the second calibration processing mode as shown in the flowchart presented in FIG. 9, in reference to which the first embodiment has been explained. However, the drive control unit 210 will calculate a tilt angle for the frame 101 and will drive the frame 101 based upon the calculated tilt angle instead of executing the processing in step S28 and step S32 in FIG. 9.

In variation 1 of the second embodiment, the drive device 17 axially rotates the frame 101 in order to move the position of the frame 101. As a result, the user 12 is able to perceive the position of a midair image 30 in space even when the midair image 30 is displayed with a specific angle relative to the ZX plane.

In addition, the drive device 17, which simply rotates the frame 101 around an axis, can be manufactured as a device having a simple structure.

(Variation 2 of the Second Embodiment)

In the second embodiment and variation 1 thereof described above, a physical object is made to move relative to a midair image so as to create a perception in the user 12 as if the midair position of the midair image is adjusted relative to the physical object along the Z direction. In variation 2, a plurality of LEDs are disposed along the Z direction and a perception is created in the user 12 as if the midair image is located at a position along the Z direction at which an LED that is in an ON state, among the plurality of LEDs, is located. Then, by turning on an LED set at a different position along the Z direction, the position of the midair image along the Z direction, as perceived by the user 12, is altered so as to lead the user 12 to perform an operation at the optimal position. The following is a detailed explanation.

Figure 30:
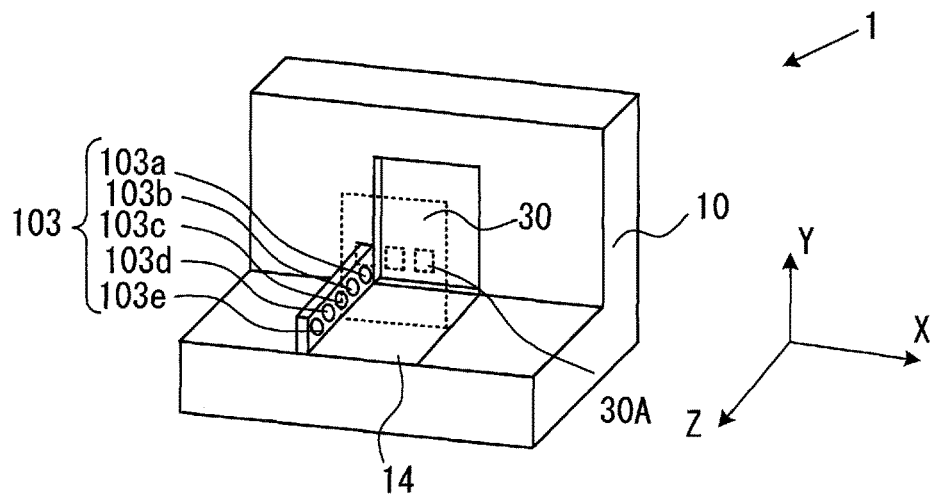
Figure 30:
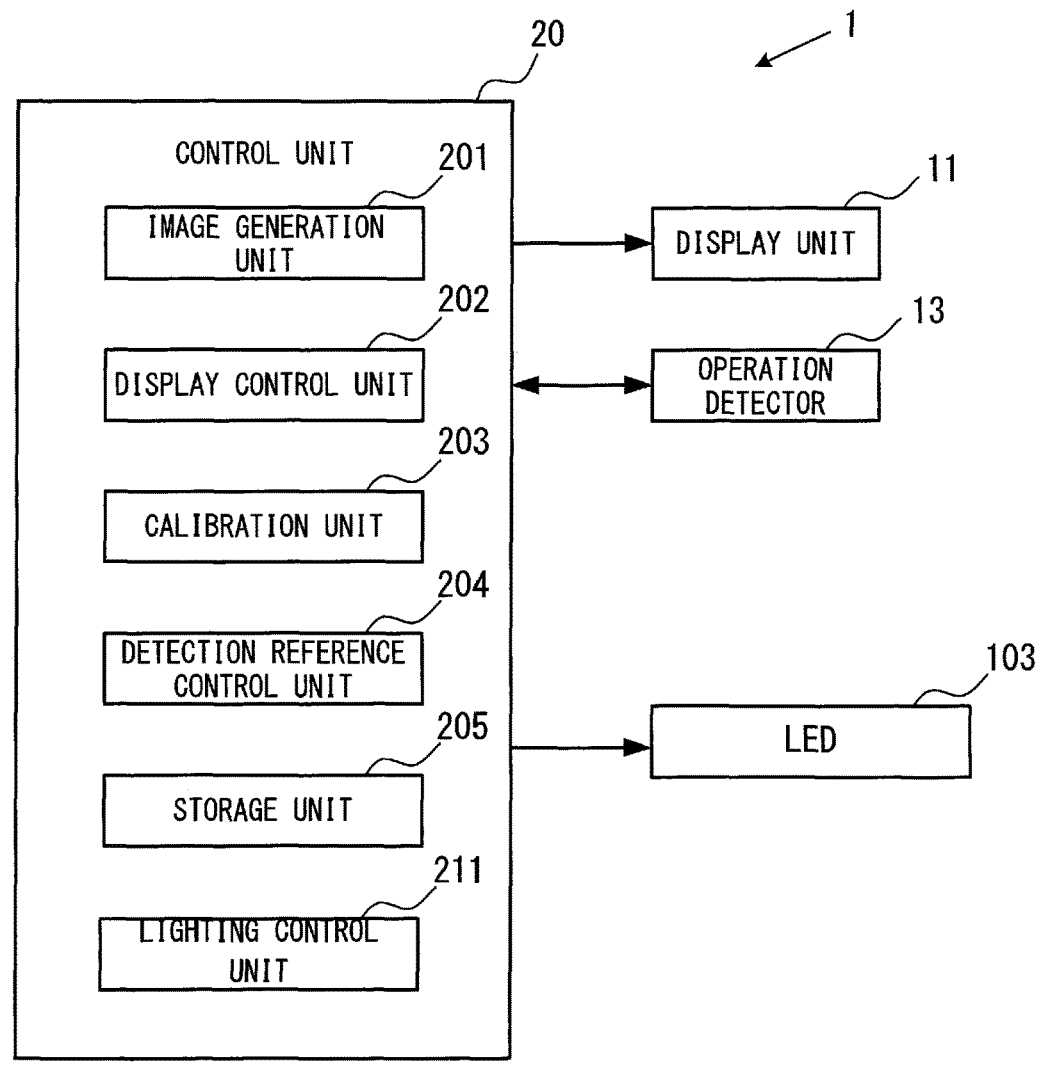

FIG. 30(a) presents an external view of the display device 1 in variation 2 in a perspective, whereas FIG. 30(b) is a block diagram of the essential configuration of the display device 1 in variation 3. As shown in FIG. 30(a), five LEDs 103a through 103e (reference number 103 will be used when referring to these LEDs generically) are disposed along the Z direction at the stage 14 at positions on the X direction − side. It is to be noted that LEDs 103 may be disposed in a quantity other than five. In addition, the LEDs 103 may be disposed at the stage 14 at positions on the X direction + side. Furthermore, LEDs 103, disposed on the stage 14 along the Z direction, may cast light from below (from the Y direction − side) toward a midair image 30.

FIG. 30(b) shows the control unit 20, and the display unit 11, the operation detector 13 and the LEDs 103, which are controlled by the control unit 20. The control unit 20 includes a lighting control unit 211 that controls ON/OFF states of the LEDs 103. The lighting control unit 211 selects a specific LED 103 among the plurality of LEDs to be turned on and turns on the selected LED 103. The other structural elements of the control unit 20 may adopt the structures of the image generation unit 201, the display control unit 202, the calibration unit 203, the detection reference control unit 204 and the storage unit 205, having been described in reference to the first embodiment, the variations thereof, the second embodiment and the variations thereof.

Figure 31:
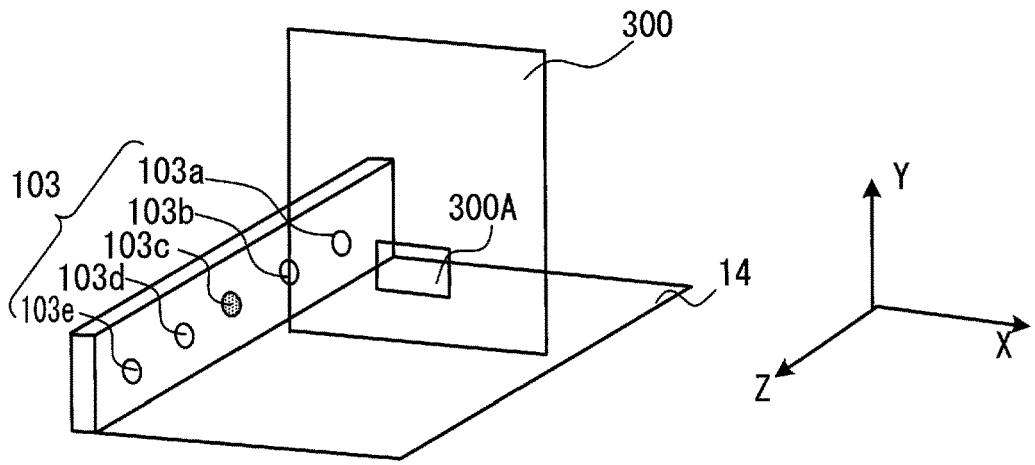
FIG. 31 Schematic illustrations indicating a positional relationship between the midair image display position and the LED in an ON state in variation 3 of the second embodiment FIG. 32 Schematic illustrations indicating a positional relationship between the midair image display position and the LED in an ON state in another example of variation 3 of the second embodiment FIG. 33 A sectional view of the display device in a third embodiment shown in (a), a sectional view of the structures adopted in the display unit and the image-forming optical system illustrated in (b) and a block diagram showing the essential configuration of the display device in the third embodiment illustrated in (c)
Figure 31:
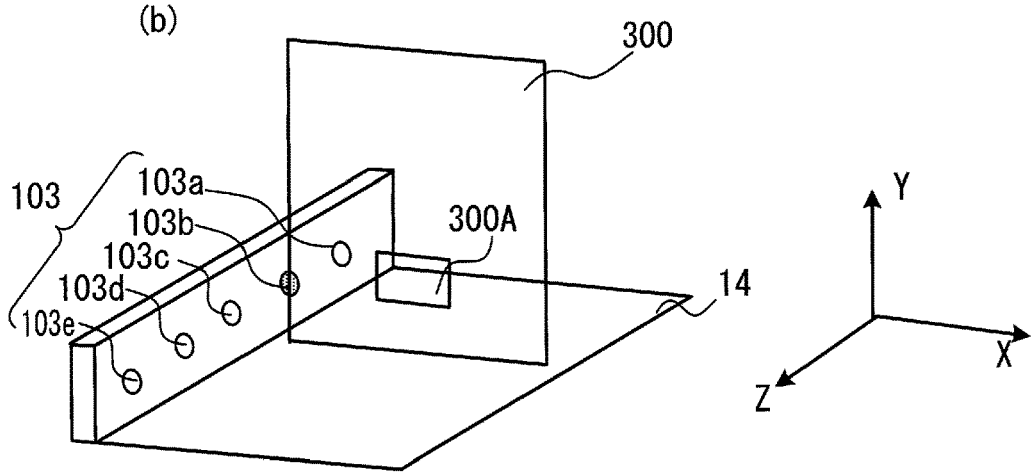
Figure 31:
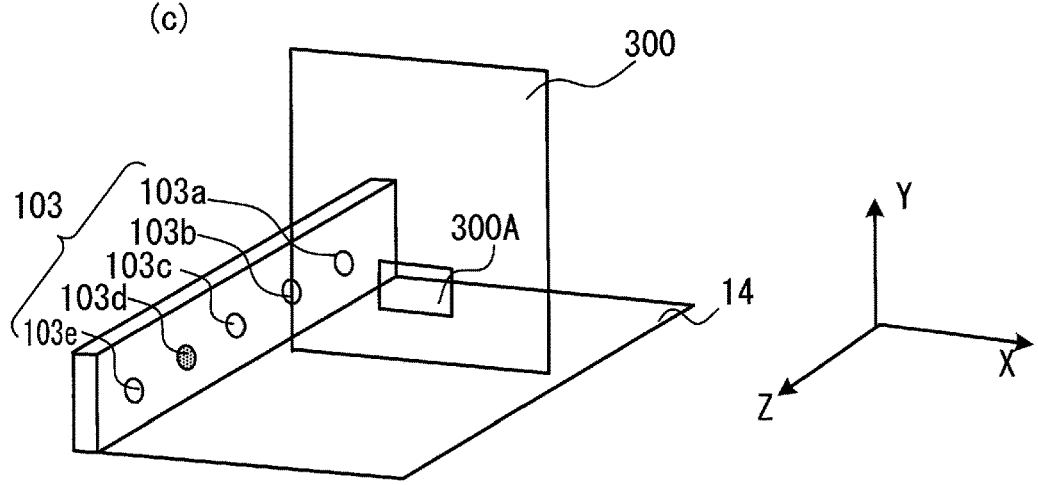

FIG. 31 schematically illustrates a midair image 300 displayed by the display device 1 in variation 2 of the second embodiment. It is to be noted that the LED 103 filled with the dots is in an ON state in FIG. 31. The midair image 300 includes a calibration icon 300A, as in the first embodiment (see FIG. 4(a)). FIG. 31(a) shows the icon 300A in an initial display. The lighting control unit 211 sets the LED 103c in an ON state. The user 12 perceives the display position of the icon 300A along the Z direction based upon its positional relationship to the LED 103c in an ON state along the Z direction.

When the reach position 50 with respect to an operation performed by the user 12 for the icon 300A in the initial display is located further toward the user 12 (toward the + side along the Z direction) relative to the detection reference 40 (as in the situation shown in FIG. 5(b)), the control unit 20 creates a perception in the user 12 as if the icon 300A takes a position further away from the user 12, i.e., further toward the − side along the Z direction, in comparison to the position taken in the initial display. In this situation, the lighting control unit 211 selects, based upon the distance between the reach position 50 and the defection reference

40, measured along the Z direction, either one of the LED 103a and the LED 103b disposed further toward the − side along the Z direction relative to the LED 103c in an ON state. Namely, when the distance between the reach position 50 and the detection reference 40 exceeds a predetermined value, the lighting control unit 211 will select the LED 103a, whereas when the distance between the reach position 50 and the detection reference 40 is equal to or less than the predetermined value, the lighting control unit 211 will select the LED 103b.

In the example presented in FIG. 31(b), the lighting control unit 211 has selected the LED 103b. As the LED 103b, instead of the LED 103c, located further toward the user 12, is turned on, the user 12, having perceived the display position of the icon 300A along the Z direction in reference to the LED 103c, having been in an ON state thus far, is made to perceive as if the icon 300A is now displayed at a position further toward the − side along the Z direction. As a result, the user 12 is expected to perform an operation for the midair image 300 at a position further toward the − side along the Z direction.

When the reach position 50 with respect to an operation performed by the user 12 for the icon 300A in the initial display is located further away from the user 12 (toward the − side along the Z direction) relative to the detection reference 40 (as in the situation shown in FIG. 5(d)), the control unit 20 creates a perception in the user 12 as if the icon 300A takes a position closer to the user 12, i.e., further toward the + side along the Z direction, in comparison to the position taken in the initial display. In this situation, the lighting control unit 211 selects, based upon the distance between the reach position 50 and the defection reference 40, measured along the Z direction, either one of the LED 103d and the LED 103e disposed further toward the + side along the Z direction relative to the LED 103c in an ON state. Namely, when the distance between the reach position 50 and the detection reference 40 exceeds a predetermined value, the lighting control unit 211 will select the LED 103e, whereas when the distance between the reach position 50 and the detection reference 40 is equal to or less than the predetermined value, the lighting control unit 211 will select the LED 103d.

In the example presented in FIG. 31(c), the lighting control unit 211 has selected the LED 103d. As the LED 103d located further toward the user 12, instead of the LED 103c, is turned on, the user 12, having perceived the display position of the icon 300A along the Z direction in reference to the LED 103c, having been in an ON state thus far, is made to perceive as if the icon 300A is now displayed at a position further toward the + side along the Z direction. As a result, the user 12 is expected to perform an operation for the midair image 300 at a position further toward the + side along the Z direction.

The calibration processing executed when the display device 1 is set in the first calibration processing mode in variation 2 of the second embodiment will be explained next. In this case, the lighting control unit 211 selects an LED to be turned on during the processing executed in step S806 in the flowchart presented in FIG. 28 in reference to which the second embodiment has been explained. The lighting control unit 211 turns on the LED 103 having been selected in step S806 during the processing executed in step S809.

It is to be noted that the calibration processing will be executed in the display device 1 set in the second calibration processing mode, as shown in the flowchart presented in FIG. 9 in reference to which the first embodiment has been explained. However, the lighting control unit 211 will select an LED 103 and turn on the selected LED 103 instead of executing the processing in step S28 and step S32 in FIG. 9.

It is to be noted that a display that will allow the user 12 to recognize with clarity that an LED 103 is in an ON state may be added to the midair image 300. For instance, the image generation unit 201 may generate display image data expressing light emitted by the LED 103 from the X direction − side, rendered as a beam of light (a shaft of light) such as that shown in FIG. 16.

Figure 32:
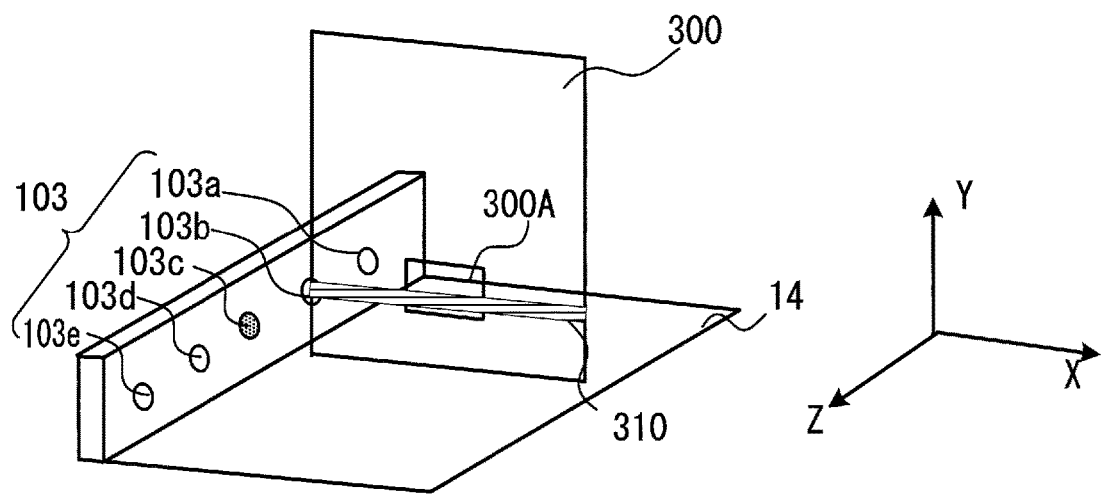
Figure 32:
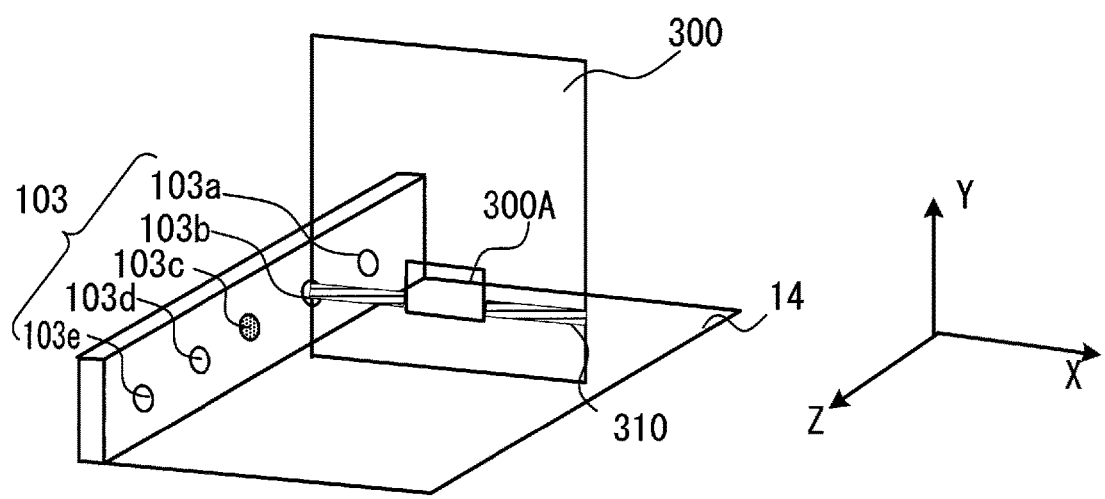

FIG. 32 schematically illustrates a midair image 300 displayed by using such display image data. FIG. 32(a) shows a midair image 300 with a shaft of light 310 advancing along the X direction in front of an icon 300A. The user 12, viewing this midair image, may perceive as if the icon 300A is located slightly more rearward (toward the − side along the Z direction) relative to the LED 103c. FIG. 32(b) shows a midair image 300 with a shaft of light 310 advancing along the X direction behind the icon 300A. The user 12, viewing this midair image, may perceive as if the icon 300A is located slightly more forward (toward the + side along the Z direction) relative to the LED 103c.

The lighting control unit 211 in variation 2 of the second embodiment executes control so as to select a specific LED 103 to be turned on among the plurality of LEDs 103 in order to control the positional relationship between the detection reference 40 and the LED 103 in an ON state. As a result, the user 12 perceives the position of the midair image 300 along the Z direction in reference to the LED 103 in an ON state and thus, an operation performed by the user 12 can be detected at the detection reference 40.

In addition, the image generation unit 201 in variation 2 of the second embodiment provides a display of a ray of light from the LED 103 in an ON state as part of the midair image 300. The user 12 is thus able to see that the LED 103 is in an ON state. These measures make it possible for the user 12 to perceive the position of the midair image 300 along the Z direction in reference to the LED 103 in an ON state and to perform an operation at the detection reference 40.

It is to be noted that while the display device 1 in the second embodiment and its variations 1 through 4 thereof described above includes at least the control unit 20, the display unit 11 and the operation detector 13, the present embodiment and variations may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the second embodiment or any of variations 1 through 4 thereof. In addition, the control device described above may be built into any of various types of electronic devices adopting the second embodiment and the variations thereof.

Furthermore, the present embodiment and variations may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the second embodiment or variations 1 through 4 thereof, a structural element among the structural elements described earlier may be added into the detection device as deemed necessary.

Third Embodiment

In reference to drawings, a display device 1 in the third embodiment will be described. The third embodiment will be described in reference to an example in which the display device 1 in the embodiment is mounted in an operation panel. It is to be noted that the display device 1 in the embodiment does not need to be mounted in an operation panel and may instead be mounted in any type of electronic apparatus as described in reference to the first embodiment, the variations thereof, the second embodiment and the variations thereof.

While the display device in the third embodiment displays a shadow image under a midair image of an icon, as does the display device 1 in the first embodiment, it adopts a configuration different from that of the display device 1 in the first embodiment. Accordingly, the first embodiment may be achieved in conjunction with the display device 1 in the third embodiment instead of the display device 1 described in reference to the first embodiment. The following is a detailed explanation.

FIG. 33(a) is a schematic sectional view, taken over the YZ plane, of the display device 1 in the third embodiment. The display device 1 includes an image-forming optical system 9, a display unit 11, an operation detector 13 and a control unit 20, disposed inside a body 10 thereof. The image-forming optical system 9 and the operation detector 13 may adopt any of the structures described in reference to the first embodiment, the variations thereof, the second embodiment and the variations thereof. It is to be noted that the display device 1 may include an image-capturing device 18, as does the display device 1 in variation 8 of the first embodiment shown in FIGS. 24 and 25.

The display unit 11 in the third embodiment may adopt the technology taught in International Publication No. 2011/158911. Namely, the display unit 11 may adopt a structure that enables light field display of a three-dimensional stereoscopic image and a midair image 30 may be formed at various positions along the optical axis by bringing up on display an image for two-dimensional display at the display unit 11.

FIG. 33(b) schematically illustrates the display unit 11 and the image-forming optical system 9 in the display device 1 in the third embodiment in a sectional view taken over the YZ plane. A microlens array 112 constituted with a plurality of microlenses 111 disposed in a two-dimensional pattern is disposed at the display surface of the display unit 11, as shown in the figure. The microlenses 111 are each disposed in correspondence to a plurality of display pixels P at the display unit 11. The display unit 11 and the microlens array 112 are disposed so as to form a predetermined tilt angle −θ relative to the ZX plane. It is to be noted that while a single microlens 111 is disposed in correspondence to 5×5 display pixels P in the example presented in FIG. 33(b) in order to simplify the illustration, each microlens 111 is actually disposed in correspondence to a greater number of display pixels P. The microlens array 112 is disposed at a position set apart from the display surface of the display unit 11 by a distance matching the focal length f of the microlenses 111 along the optical axis. Each microlens 111 projects light traveling from display pixels P onto a specific image plane based upon the image on display. It is to be noted that lenticular lenses may be used in place of the microlenses 111.

The image-forming optical system 9 is disposed above the microlens array 112, at a position set apart from the microlens array 112 over a predetermined distance so as to range parallel to the ZX plane. The image-forming optical system 9 adopts the structure illustrated in FIG. 1(c) in reference to which the first embodiment has been explained. A plurality of mirror elements 90 disposed within the image-forming optical system 9 each reflect light emitted from display pixels P and form a real image forming an angle θ relative to the ZX plane through convergence (see FIG. 33(a)). The magnification of this real image is actual size, i.e., its size matches that of the display pixels P. In other words, light emitted from the display unit 11 is reflected at the plurality of mirror elements 90 so as to form an image at a midair image forming position above the stage 14.

In order for the various light points LP that compose a midair image 30 to be formed in space, the light forming a given light point LP is emitted from some of the display pixels P, each covered by one of a plurality of different microlenses 111 at the display unit 11. It is to be noted that the light point LP, which is an image displayed in midair via the display unit 11 and the microlenses 111, is a midair image. In the example presented in FIG. 33(b), light emitted from the shaded display pixels P is projected via the corresponding microlenses 111 to form the light point LP. In this situation, the display pixels P corresponding to the plurality of different microlenses 111 are assigned in a number matching the number of display pixels P covered by a single microlens 111 (5×5 in the example presented in FIG. 33(b)). Based upon the pattern in which these display pixels P are assigned, the position of a light point LP formed in midair along the optical axes of the microlenses 111 can be adjusted. The midair image 30 is composed of an image formed via the image-forming optical system 9 along the Y direction with light points P thus formed. The position of the midair image 30 along the Y direction can be thus adjusted by altering the image displayed at the display unit 11.

FIG. 33(c) is a block diagram showing the essential configuration of the display device 1 in the third embodiment. FIG. 33(c) shows the control unit 20, and the display unit 11 and the operation detector 13 that are controlled by the control unit 20. The control unit 20 may include structural elements similar to the image generation unit 201, the display control unit 202, the calibration unit 203, the detection reference control unit 204 and the storage unit 205 in the first embodiment shown in FIG. 2. In addition, the display device 1 in the third embodiment may detect the reach position or the specified position and control the display mode for an auxiliary image 31 by adopting any of the various methods explained in reference to the first embodiment and the variations thereof.

The image generation unit 201 in the third embodiment generates auxiliary image data used to display an auxiliary image 31, which is a shadow image, and the display control unit 201 brings up on display the auxiliary image data thus generated at the display unit 11. As a result, the auxiliary image 31, which is a shadow image, i.e., a second image constituting a base for a second display, is brought up on display at the display unit 11, and the auxiliary image 31 is displayed over a region R1 shown in FIG. 33(a) by the display unit 11 as a fourth display. The fourth display provided in the region R1 is displayed via the image-forming optical system 9, in midair as the auxiliary image 31 constituting the second display. It is to be noted that the image generation unit 201 may generate auxiliary image data corresponding to any of the shadow images (see FIG.

10, FIG. 11, FIG. 13, FIG. 14 and FIG. 15) adopting the various modes listed in variation 1 of the first embodiment.

It is desirable that the auxiliary image 31, which expresses a shadow of an icon 30A constituting a first display, be brought up on display under the icon 30A (toward the Y direction − side). Accordingly, the display control unit 202 executes control to display the auxiliary image data with the display pixels P at the display unit 11 so as to form light points with the auxiliary image data in the region R1 in FIG. 33. Namely, the display control unit 202 allocates the auxiliary image data to the display pixels P so that the region R1 is formed near an area under (toward the Y direction − side) of the image-forming optical system 9. The light forming an image in the region R1 is displayed via the image-forming optical system 9, as the auxiliary image 31 at a position near an area above (toward the Y direction + side) of the image-forming optical system 9, i.e., at a position between the display unit 11 and the icon 30A.

The display control unit 202 executes control so as to bring up display image data used to display the icon 30A, i.e., a first image constituting a base for the first display, via display pixels P. It is desirable that the icon 30A be displayed further upward (toward the Y direction + side) relative to the auxiliary image 31. Accordingly, the display control unit 202 allocates the display image data to the display pixels P so that the display image data form light points in an area further downward (toward the Y direction − side) relative to the region R1, i.e., in a region R2 closer to the display unit 11.

However, if the display pixels P at which the auxiliary image data are to be displayed are the same as the display pixels P designated for display of the display image data, the auxiliary image data and the display image data cannot be displayed at the same time. Accordingly, when the icon 30A and the auxiliary image 31 are displayed via the display unit 11, the display control unit 202 switches between the display of the auxiliary image data via the display pixels P and the display of the display image data via the display pixels P on a predetermined cycle. As a result, the user 12 is able to view the icon 30A and the auxiliary image 31 located under the icon 30A as midair images.

Calibration processing will be executed as has been explained in reference to the first embodiment and the variations thereof so as to adjust the position at which the auxiliary image 31 is displayed based upon the distance between the reach position or the specified position and the detection reference 40. During this process, the image generation unit 201 generates auxiliary image data in the same way as that described in reference to the first embodiment and the variations thereof and the display control unit 202 executes control so as to display the auxiliary image data at the display pixels P. Namely, the display control unit 202 displays the auxiliary image data at the display pixels P in step S9 in the flowchart presented in FIG. 7 or step S28 and step S32 in the flowchart presented in FIG. 9.

It is to be noted that the display device 1 in the third embodiment does not need to execute calibration processing. Namely, the display device 1 in the third embodiment may be a device used simply to display a given image as a midair image 30 and an auxiliary image 31 expressing its shadow, instead of a device engaged in a specific operation in response to an operation performed by the user 12.

In addition, while a shadow image is displayed as the auxiliary image 31 in the example explained above, the auxiliary image 31 may instead be a bright image such as an image of an illuminating light source described in reference to variation 1 of the first embodiment shown in FIG. 16.

Furthermore, an image of a stage, a table, a desk or the like used to indicate the position of the midair image 30, upon which an object is placed, may be displayed as the auxiliary image 31, as has been explained in reference to the first embodiment. Moreover, a stereoscopic auxiliary image 31 may be displayed by the display device 1. Namely, an image of a stage, a table, a desk, or the like upon which an object is placed, may be displayed as a stereoscopic auxiliary image 31. In addition, an image of a rod appearing to support the midair image 30 may be displayed as a stereoscopic auxiliary image 31. In such a case, the auxiliary image 31 may be displayed so as to appear as if the midair image 30 is supported by the rod in the auxiliary image 31 by displaying it so that the front end of the rod appears to be connected to the midair image 30. It is to be noted that as has been explained in reference to the first embodiment and as will be explained in reference to a fourth embodiment, it is desirable to display an auxiliary image 31 deeply related to the midair image 30.

In addition, the display device 1 in the third embodiment does not need to include an image-forming optical system 9. In such a case, a light transmitting plate through which light can be transmitted may be disposed at the position at which the image-forming optical system 9 is disposed in the sectional view in FIG. 33(a). The display device 1 displays the auxiliary image 31 as a midair image in the vicinity of the light transmitting plate, and light used to display the icon 30A passes through the light transmitting plate and is displayed in midair above the auxiliary image 31 (toward the Y direction + side). As a result, the auxiliary image 31 is displayed near the surface of the body 10 of the display device 1, i.e., a physical object, and the user 12 is thus able to perceive the position of the midair image 30 in reference to the body 10 via the auxiliary image 31.

In the third embodiment, auxiliary image data are displayed at the display unit 11 and the image-forming optical system 9 displays the auxiliary image data as an auxiliary image 31. Thus, the user 12 is able to perceive the position of the icon 30A in relation to the auxiliary image 31 displayed as a midair image and perform an operation at the detection reference 40.

In addition, the auxiliary image 31 is displayed via the image-forming optical system 9 at a position different from that of the midair image 30. As a result, the user 12 is able to perceive the position of the icon 30A based upon its positional relationship with the auxiliary image 31.

The display unit 11 in the third embodiment alternately displays the display image data for the midair image 30 and the auxiliary image data. This means that both the midair image 30 and the auxiliary image 31 can be brought up on display by a single display unit 11.

Furthermore, the display device 1 can be provided as a compact unit.

Moreover, the image-forming optical system 9 in the third embodiment displays the midair image 30 at a position set apart from the display unit 11 by a greater distance in comparison to the auxiliary image 31. Thus, the user 12 is able to perceive the position of the icon 30A in the midair image 30 in reference to the auxiliary image 31 displayed at a position below the midair image 30.

In addition, since the midair image 30 is displayed via the image-forming optical system 9 at a position set apart from the display unit 11 by a greater distance compared to the auxiliary image 31, light, having departed the display unit 11, is not allowed to directly enter the eyes of the user 12 readily, and thus, the midair image 30 can be viewed with better ease. When the light from the display unit 11 enters the eyes of the user 12, the eyes of the user 12 will focus on the display unit 11, which may result in the midair image 30 losing the appearance of "floating". Such a problem can be resolved by adopting the structure described above.

It is to be noted that the present embodiment is not limited to the example in which the display control unit 202 switches between the display of the auxiliary image data via the display pixels P and the display of the display image data via the display pixels P on a predetermined cycle, as described above. The display control unit 202 may instead simultaneously provide a display of the auxiliary image data via display pixels P and display of the display image data via display pixels P. More specifically, the display control unit 202 may display the auxiliary image data and the display image data simultaneously, as long as the auxiliary image data and the display image data are displayed via different display pixels P.

If a display pixel P via which auxiliary image data are to be displayed and a display pixel P via which display image data are to be displayed are the same display pixel P (hereafter will be referred to as a same display pixel P), the display control unit 202 uses a given same pixel P to display either auxiliary image data or display image data. In order to support such control, the plurality of display pixels P disposed at the display unit 11 are grouped into display pixels P1 (hereafter will be referred to as first display pixels) at which priority is given to auxiliary image data display and display pixels P2 (hereafter will be referred to as second display pixels) at which priority is given to display image data display. The first display pixels P1 and the second display pixels P2 may be disposed so as to form, for instance, a staggered pattern at the surface of the display unit 11.

The display control unit 202 uses a given same display pixel P designated as a first display pixel P1 to display auxiliary image data. The display control unit 202 uses a given same display pixel P designated as a second display pixel P2 to bring up the display image data. Through these measures, it becomes possible to display both the icon 30A and the auxiliary image 31 without having to switch between the display of the auxiliary image data and the display of the display image data via the display pixels P on a predetermined cycle.

The display unit 11 displays the display image data and the auxiliary image data at the same time. This means that the control processing load for displaying the display image data and the auxiliary image data can be reduced.

While the display device 1 in the example described above displays the midair image 30 and the auxiliary image 31 via a single set of display unit 11 and image-forming optical system 9, the present embodiment is not limited to this example. For instance, the display device 1 may be configured as a display system that includes a display unit and an image-forming optical system engaged in operation for displaying the midair image 30 and a separate set including a display unit and an image-forming optical system dedicated to display of the auxiliary image 31. Namely, the display unit and the image-forming optical system via which the display image data are to be displayed may be disposed by adopting any of the structures described in reference to the first embodiment and the variations thereof.

(Variation 1 of the Third Embodiment)

The display device 1 in variation 1 of the third embodiment adopts a configuration different from that of the display device 1 in the third embodiment and displays an auxiliary image 31 through a method different from the method through which a midair image is displayed. The display device 1 in variation 1 displays an auxiliary image 31 via a liquid crystal display unit. The following is a detailed explanation.

FIG. 34(a) schematically illustrates the display device 1 in variation 1 in a sectional view taken over the YZ plane. The display device 1 includes an image-forming optical system 9, a display unit 11, an operation detector 13, a control unit 20 and a second display unit 91, disposed inside a body 10. The display unit 11, the image-forming optical system 9 and the operation detector 13 adopt structures similar to those in the first embodiment and are disposed within the body 10 in the same way as that illustrated in FIG. 33(a). The second display unit 91, which is a liquid crystal monitor, is disposed so as to range parallel to the ZX plane. In the example presented in FIG. 34(a), the second display unit 91 is disposed beside the image-forming optical system 9 at a position further toward the + side along the Z direction relative to the image-forming optical system 9. It is to be noted that the second display unit 91 may instead be disposed at a position further toward the − side along the Z direction relative to the image-forming optical system 9. In addition, the second display unit 91 does not need to be disposed beside the image-forming optical system 9. For instance, a notched area may be formed over part of the image-forming optical system 9 and the second display unit 91 may be disposed in the notched area.

Furthermore, the second display unit 91 may be an organic EL display unit instead of a liquid crystal monitor.

FIG. 34(b) is a block diagram illustrating the essential configuration of the display device 1 in variation 1. FIG. 34(b) shows the control unit 20, and the display unit 11, the operation detector 13 and the second display unit 91, which are controlled by the control unit 20. The control unit 20 includes structural elements such as an image generation unit 201, a display control unit 202, a calibration unit 203, a detection reference control unit 204 and a storage unit 205 structured as shown in FIG. 33(c). However, the display control unit 202 controls display at the second display unit 91 as well as display at the display unit 11. It is to be noted that the second display unit 91 may include a control unit and in such a case, the control unit in the second display unit 91 may control display at the second display unit 91 based upon control signals provided from the display control unit 202.

The display control unit 202 executes control so as to bring us display image data and auxiliary image data, generated by the image generation unit 201, respectively, at the display unit 11 and at the second display unit 91. Namely, the second display unit 91 is a dedicated display unit used exclusively to display a shadow image generated as an auxiliary image 31. It is to be noted that the image generation unit 201 may generate auxiliary image data corresponding to the shadow image adopting any of the various modes (see FIG. 10, FIG. 11, FIG. 13, FIG. 14 and FIG. 15) explained in reference to variation 1 of the first embodiment. The shadow image generated as the auxiliary image 31 is thus displayed via the second display unit 91 at a position further downward (toward the Y direction − side) relative to an icon 30A displayed in midair. It is to be noted that the second display unit 91 may include a generation unit capable of image generation, and in such a case, the generation unit in the second display unit 91 may generate auxiliary image data in the same way as does the image generation unit 201 explained earlier and an auxiliary image 31 may be displayed at the second display unit 91 based upon the auxiliary image data.

It is to be noted that the positional relationship between the position at which the image-forming optical system 9 is disposed and the position at which the second display unit 91 is disposed is not limited to the example presented in FIG. 34(a) and the image-forming optical system 9 and the second display unit 91 may instead be disposed so as to achieve the positional relationship described below.

FIG. 34(c) schematically illustrates a display device 1 in another example in a sectional view taken over a plane parallel to the YZ plane. The second display unit 91 is disposed above the image-forming optical system 9 (toward the Y direction + side). The second display unit 91 and the image-forming optical system 9 may be disposed so that the lower surface of the second display unit 91 and the upper surface of the image-forming optical system 9 are in contact with each other or they may be disposed with a gap separating them. The second display unit 91 is a liquid crystal monitor manufactured by using a light transmitting material through which light is transmitted.

When the shadow image generated as the auxiliary image 31 is on display at the second display unit 91 in a configuration having the image-forming optical system 9 and the second display unit 91 disposed as shown in FIG. 34(c), the region where the auxiliary image 31 is on display obstructs passage of light from the display unit 11, which is bound to result in lowered visibility of the midair image 30. In order to prevent such an undesirable condition, the display control unit 202 switches between a display (a third display) brought up to allow the light from the display unit 11 to pass through and a display of the auxiliary image 31 via the second display unit 91 on a predetermined cycle so as to bring up, via the display unit 11, a display image, i.e., the midair image 30, in space. This means that while the display image is on display at the display unit 11, the auxiliary image is not displayed at the second display unit 91 and in this state, the light, having departed the display unit 11, is allowed to pass through the second display unit 91 to form a midair image 30. In other words, while the display image is on display at the display unit 11, light from the display unit 11 passes through the second display unit 91 in a greater amount compared to the amount of light passing through the second display unit 91 when the auxiliary image is displayed thereat.

It is to be noted that the display control unit 202 may execute control other than the control under which the display at the display unit 11 and the display at the second display unit 91 are switched on the predetermined cycle. For instance, the plurality of pixels at the second display unit 91 may be grouped into pixels used to display the auxiliary image 31 (hereafter will be referred to as first pixels) and pixels (hereafter will be referred to as second pixels) through which light from the display unit 11 passes, i.e., pixels that do not display the auxiliary image 31. The first pixels and the second pixels may be disposed at the surface of the display unit 11 in, for instance, a staggered pattern. As an alternative, a pixel row in which first pixels are disposed and a pixel row in which second pixels are disposed may be set in and alternating pattern or a predetermined plurality of pixel rows in which first pixels are disposed and a predetermined plurality of pixel rows in which second pixels are disposed may be set in an interlaced pattern.

Calibration processing will be executed as has been explained in reference to the first embodiment and the variations thereof so that the position at which the auxiliary image 31 is displayed is adjusted based upon the distance between the reach position or the specified position and the detection reference 40. In this situation, the image generation unit 201 will generate display image data and auxiliary image data in the same way as any of those described in reference to the first embodiment and the variations thereof, and the display control unit 202 will engage the display unit 11 to display a display image expressed with the display image data and will engage the second display unit 91 to display an auxiliary image 31 expressed with the auxiliary image data. Namely, in step S9 in the flowchart presented in FIG. 7 and in steps S28 and S32 in the flowchart presented in FIG. 9, in reference to which the first embodiment has been described, the display control unit 202 displays the display image at the display unit 11 and displays the auxiliary image 31 at the second display unit.

In variation 1 of the third embodiment, the second display unit 91 that displays the auxiliary image 31 is disposed further downward relative to the display of the midair image 30. As a result, the auxiliary image 31 is displayed at a point further downward relative to the midair image 30, which makes it possible for the user 12 to perceive the position of the midair image 30 based upon the display of the auxiliary image 31.

In addition, the second display unit 91 in variation 1 of the third embodiment is disposed at a position different from the position taken by the image-forming optical system 9 via which the midair image 30 is displayed. Thus, the auxiliary image 31 can be displayed at an optimal position relative to the midair image 30.

The display unit 11 in variation 1 of the third embodiment alternately displays the display image data for the midair image 30 and the auxiliary image data. This means that both the midair image 30 and the auxiliary image 31 can be brought up on display by a single display unit 11.

Furthermore, the display device 1 can be provided as a compact unit.

(Variation 2 of the Third Embodiment)

The display device 1 in variation 2 of the third embodiment adopts a configuration different from that of the display device 1 in the third embodiment or variation 1 of the third embodiment and displays an auxiliary image 31 through a method different from the method through which a midair image is displayed. The display device 1 in variation 2 projects an auxiliary image 31 onto a diffuser plate or the like via a projector. The following is a detailed explanation.

FIG. 35(a) schematically illustrates the display device 1 in variation 2 in a sectional view taken over the YZ plane. The display device 1 includes an image-forming optical system 9, a display unit 11, an operation detector 13, a projector 15, a control unit 20 and a diffuser plate 92, disposed inside a body 10. The display unit 11, the image-forming optical system 9, the operation detector 13 and the projector 15 adopt structures similar to those in the first embodiment. The display unit 11, the image-forming optical system 9, and the operation detector 13 are disposed inside the body 10 in the same way as shown in FIG. 33(a). The projector 15 is disposed above the body 10, as in the first embodiment shown in FIG. 1(b), and projects projection light onto the diffuser plate 92 from a point located toward the Y direction + side. In addition, the control unit 20 in the display device 1 in variation 2 of the third embodiment may adopt a structure similar to that of the control unit in the display device 1 in the first embodiment shown in FIG. 2.

The diffuser plate 92, which may be constituted of, for instance, frosted glass, is disposed beside the image-forming optical system 9 at a position further toward the + side along the Z direction relative to the image-forming optical system 9 in the example presented in FIG. 35(a). It is to be noted that the diffuser plate 92 may instead be disposed further toward the − side along the Z direction relative to the image-forming optical system 9. The projector 15 projects an auxiliary image 31 based upon auxiliary image data generated by the image generation unit 201, as does the projector in the first embodiment. The projector 15 in variation 2 is disposed with its projection direction set so that it projects the auxiliary image 31 toward the diffuser plate 92 from a position above (from a point located on the Y direction + side). The auxiliary image 31 projected by the projector 15 is rendered visible to the user 12 as it is diffused at the diffuser plate 92. The shadow image generated as the auxiliary image 31 is thus projected at a position further downward (toward the Y direction − side) relative to the icon 30A in the midair image 30. It is to be noted that the image generation unit 201 may generate auxiliary image data corresponding to the shadow image adopting any of the various modes (see FIG. 10, FIG. 11, FIG. 13, FIG. 14 and FIG. 15) explained in reference to variation 1 of the first embodiment.

Figure 35:
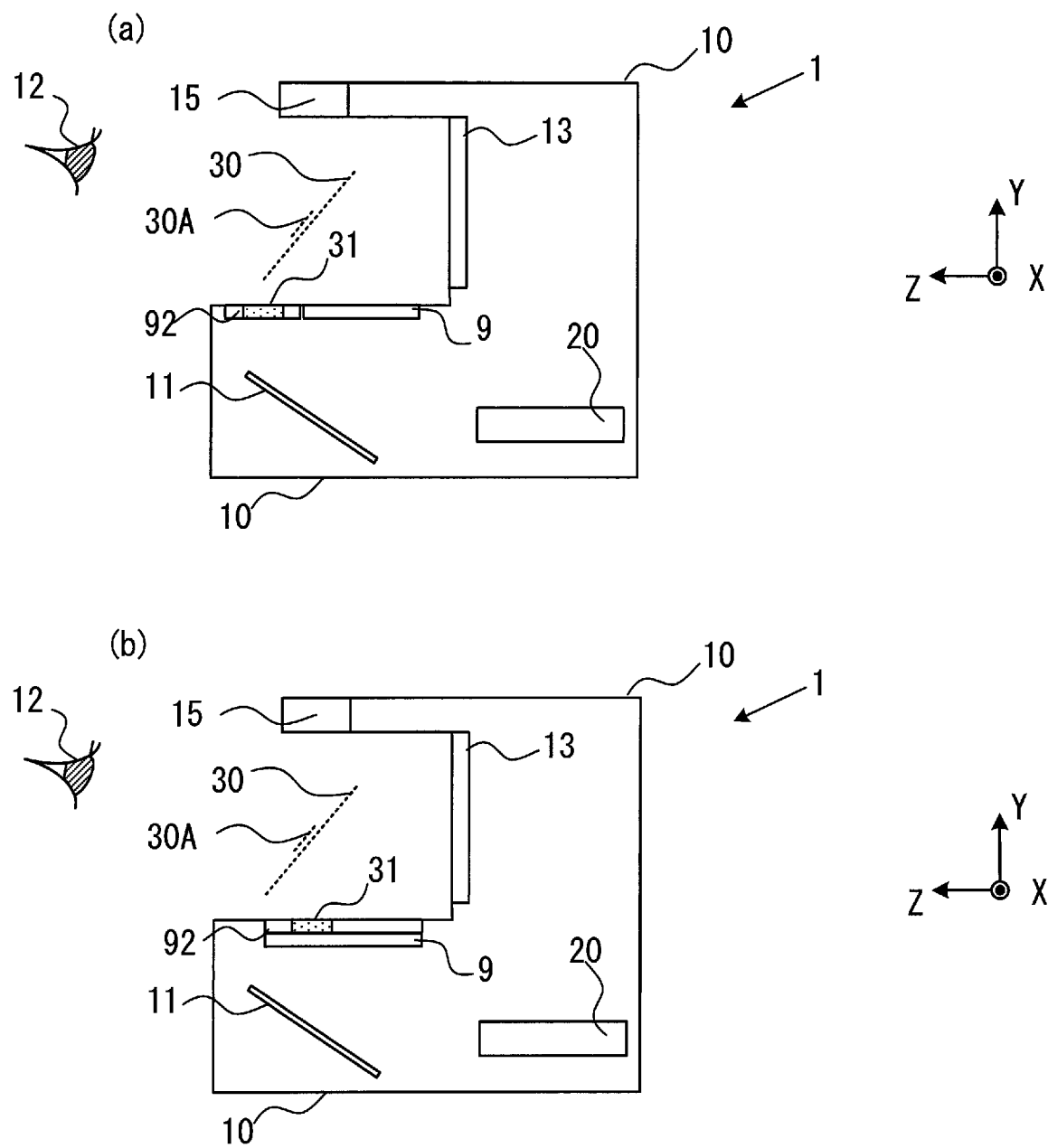
FIG. 35 Sectional views each showing a display device in variation 2 of the third embodiment FIG. 36 A schematic presentation of the structure adopted in the display device in a fourth embodiment in a perspective showing the external appearance of the display device in (a), in a sectional view showing the internal structure in (b) and in a block diagram illustrating the essential structure in (c)
Figure 36:
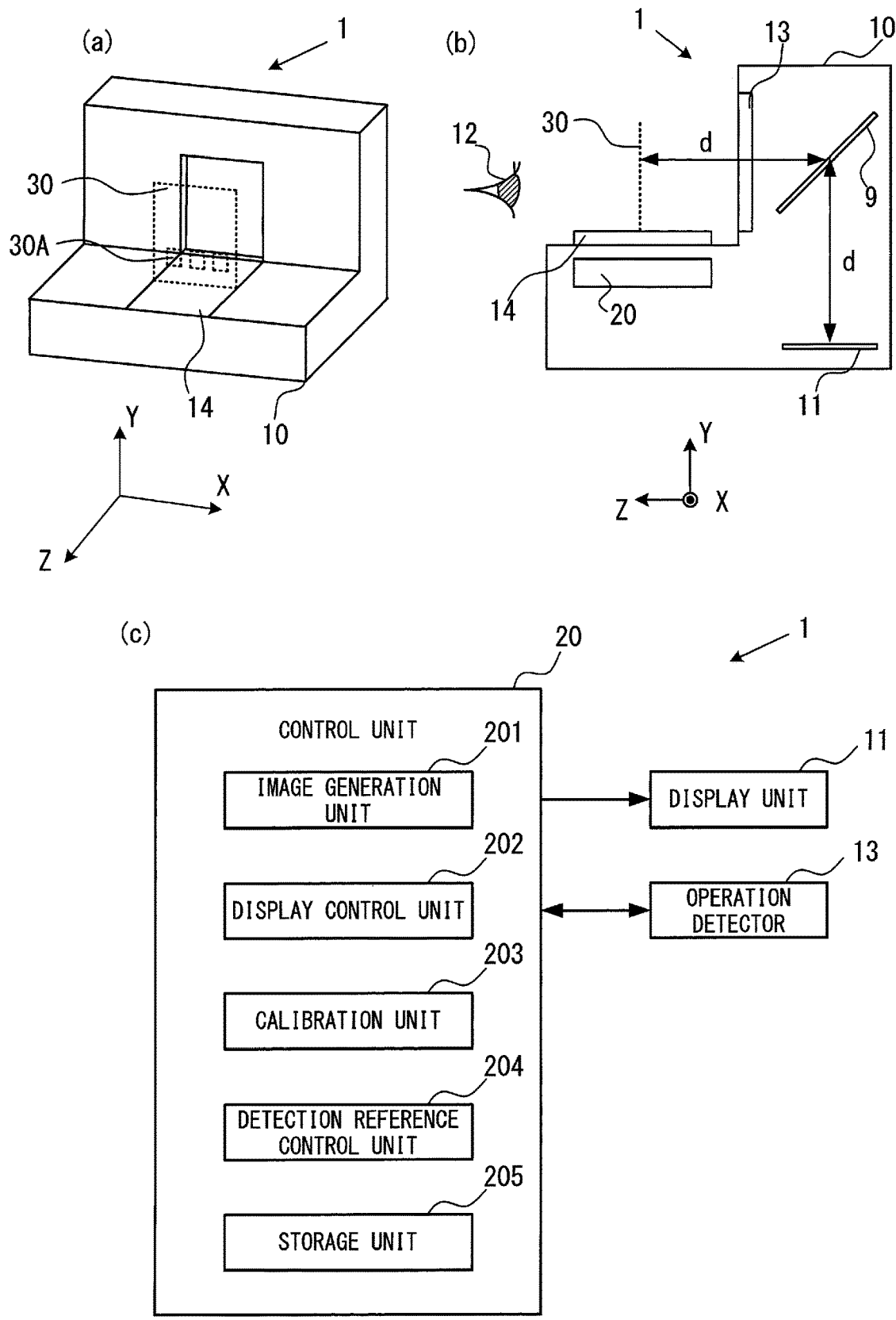

As an alternative, the diffuser plate 92 may be disposed above (toward the Y direction + side) the image-forming optical system 9, as illustrated in FIG. 35(*b*). Such a diffuser plate 92 will include first regions where projection light from the projector 15 is diffused and second regions through which light from the display unit 11 passes. These regions may be set in, for instance, a staggered pattern. The light, having departed the display unit 11, passes through the second regions and is used to display a midair image 30, whereas the projection light from the projector 15 is diffused in the first regions and is viewed by the user 12 as an auxiliary image 31. It is to be noted that the image-forming optical system 9 may be disposed above (toward the Y direction + side) the diffuser plate 92. In such a case, the projector 15 will be disposed near the display unit 11 with its projection direction set so as to project the projection light toward the diffuser plate 92 from a point further downward relative to the diffuser plate 92. Namely, the projector 15 will be installed between the diffuser plate 92 and the display unit 11 so as to project projection light toward the diffuser plate 92 located toward the Y direction + side. Such a projector 15 may be constituted with, for instance, an ultra-short focus projector that projects an image over a short range.

The structure described above makes it possible for the user 12 to see the shadow image generated as the auxiliary image 31 at a position further downward (toward the Y direction − side) relative to the icon 30A in the midair image 30.

Calibration processing will be executed as has been explained in reference to the first embodiment and the variations thereof so that the position at which the auxiliary image 31 is displayed is adjusted based upon the distance between the reach position or the specified position and the detection reference 40. The image generation unit 201 generates image data and auxiliary image data as has been explained in reference to the first embodiment and the variations thereof. The display control unit 202 displays a display image expressed with the display image data at the display unit 11, whereas the projector control unit 200 engages the projector 15 to project projection light corresponding to the auxiliary image data onto the diffuser plate 92 so as to project an auxiliary image 31. In other words, processing similar to the processing in the flowchart presented in FIG. 7 and the processing in the flowchart presented in FIG. 9, in reference to which the first embodiment has been explained, is executed.

The projector 15 in variation 2 of the third embodiment projects the auxiliary image 31. As a result, the user 12 is able to perceive the position of the midair image 30 based upon the display of the projected auxiliary image 31.

In addition, in variation 2 of the third embodiment, the light emitted from the projector 15 is diffused at the diffuser plate 92, disposed at a position different from the position taken by the image-forming optical system 9. Thus, the user 12, looking at the auxiliary image 31 displayed at a position further downward relative to the midair image 30, is able to perceive the position of the midair image 30.

It is to be noted that the display device 1 may project a hologram above the display unit 11 as an alternative to the diffuser plate 92 described above. An image of a diffuser plate 92 is stored in advance in the hologram. The projector 15 projects light, identical to the reference light used to store the image, toward the hologram. Since the image of the diffuser plate 92 is stored in the hologram, the projection light from the projector 15, diffracted via the hologram, becomes diffused in a manner similar to the way light is diffused at the diffuser plate 92. As projection light corresponding to the auxiliary image data is projected by the projector 15 onto such a hologram, the auxiliary image 31 becomes visible to the user 12.

In this configuration, frequency bands of the various color components (the R component, the G component and the B component) in the projection light from the projector 15 will be set differently from the frequency bands of the color components (an R' component, a G' component and a B' component) in the light emitted from the display unit 11. Through these measures, it is ensured that the light departing the display unit 11 is not diffracted via the hologram and is instead transmitted through the hologram to form the midair image 30. As a result, the user 12 is able to view the auxiliary image 31 at a position further downward relative to the midair image 30.

It is to be noted that the present variation is not limited to the example in which the frequency bands of the color components (the R component, the G component and the B component) in the projection light from the projector 15 are set differently from the frequency bands of the color components (the R' component, the G' component and the B' component) in the light emitted from the display unit 11. As an alternative, the projector 15 and the display unit 11 may be disposed so that the angle of incidence with which the projection light from the projector 15 enters the hologram is different from the angle of incidence with which the light from the display unit 11 enters the hologram. In this case, the display unit 11 may be disposed so that the angle of incidence with which the light from the display unit 11 enters the hologram is different from the angle of incidence of the reference light used to store the image in the hologram. Through these measures, the efficiency with which the light from the display unit 11 is diffracted via the hologram is lowered and the light from the display unit 11 instead passes through the hologram so as to form the midair image 30. In other words, the projection light from the projector 15 alone is diffracted at the hologram and the light from the display unit 11, which is not diffracted at the hologram, can be used to display the midair image 30 in an optimal manner.

It is to be noted that while the display device 1 in the third embodiment and variations 1 and 2 thereof described above includes at least the control unit 20, the display unit 11 and the operation detector 13, the present embodiment and variations may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described earlier may be added as needed in order to realize the various advantages described in reference to the third embodiment and variations 1 and 2 thereof. In addition, the control device described above may be built into any of various types of electronic devices adopting the third embodiment and variations thereof.

Furthermore, the present embodiment and variations may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the third embodiment and variations 1 and 2 thereof, a structural element among the structural elements described earlier may be added into the detection device as deemed necessary.

Fourth Embodiment

In reference to drawings, a display device 1 in the fourth embodiment will be described. The fourth embodiment will be described in reference to an example in which the display device 1 in the embodiment is mounted in an operation panel. It is to be noted that the display device 1 in the embodiment does not need to be mounted in an operation panel and may be mounted in any type of electronic apparatus as has been explained in reference to the first embodiment and the variations thereof.

The display device 1 allows the user 12 to perceive the display position of a midair image 30, provided as the first display, along the Z direction, by providing an auxiliary image 31 as a second display together with the midair image 30 in the first embodiment, the variations thereof and the third embodiment. In other words, the position of the auxiliary image 31 is used for reference indicating the display position of the midair image 30. The display device 1 in the fourth embodiment enables the user 12 to perceive the position taken along the Z direction by a first portion of a midair image 30, which is the target of an operation to be performed by the user 12, by altering the display position taken along the Z direction by a second portion of the midair image, which is not the target of the operation to be performed by the user 12, without altering the display position of the first portion of the midair image along the Z direction. The following is a detailed explanation.

FIG. 36(a) presents a schematic external view of the display device 1 in the fourth embodiment in a perspective, FIG. 36(b) is a schematic sectional view of the internal structure of the display device 1 and FIG. 36(c) is a block diagram of the essential configuration of the display device 1. The display device 1 in the fourth embodiment includes an image-forming optical system 9, an operation detector 13 and a control unit 20 identical to those in the display device 1 in the first embodiment. It also includes a display unit 11 that adopts a structure similar to that of the display unit 11 in the third embodiment shown in FIG. 33(b). Namely, the display unit 11 in the fourth embodiment is similar to that in the third embodiment in that it adopts a structure enabling a light field display for displaying a three dimensional stereoscopic image.

As shown in FIG. 36(c), the control unit 20 in the fourth embodiment adopts a structure that includes an image generation unit 201, a display control unit 202, a calibration unit 203, a detection reference control unit 204 and a storage unit 205 identical to those in the control unit 20 in the first embodiment shown in FIG. 2.

It is to be noted that the display device 1 in the fourth embodiment may further include the image-capturing device 18 (see FIGS. 24 and 25) in the variation 8 of the first embodiment.

Figure 37:
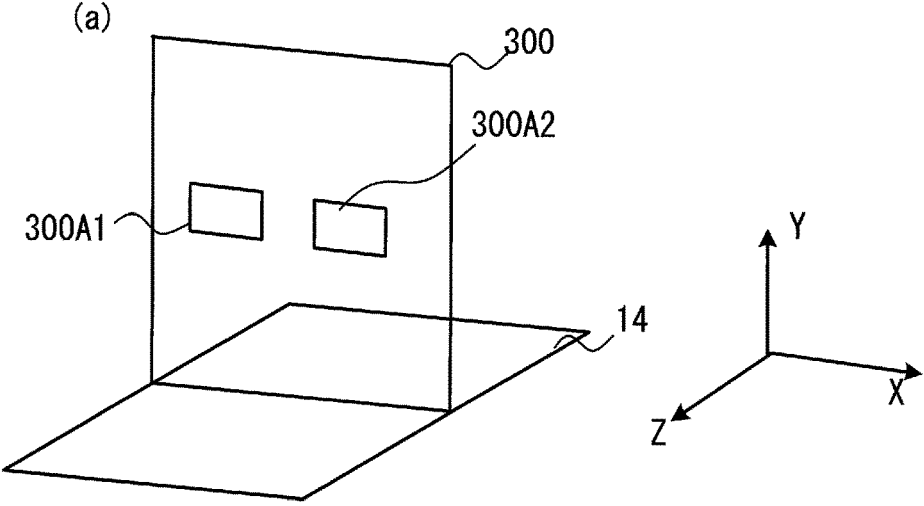
FIG. 37 Schematic illustrations showing how a midair image may be brought up on display in the fourth embodiment FIG. 38 A block diagram illustrating an essential configuration that may be adopted in a display device in another example in the fourth embodiment FIG. 39 Schematic illustrations showing how a midair image may be brought up on display in another example in the fourth embodiment FIG. 40 Schematic illustrations showing how a midair image may be brought up on display in variation 1 of the fourth embodiment
Figure 37:
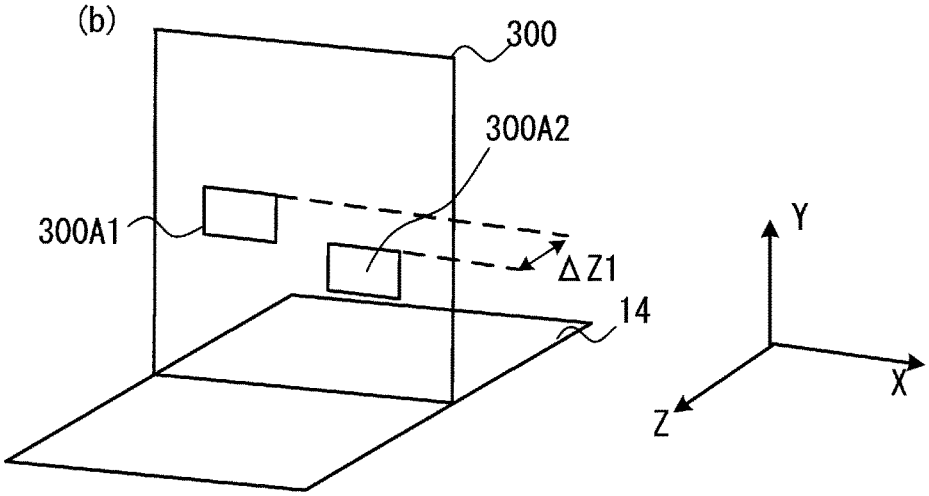
Figure 37:
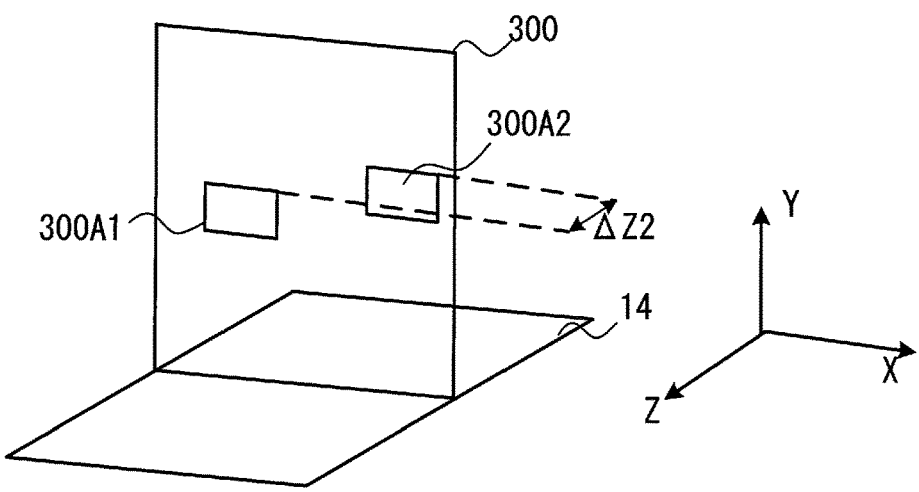

FIG. 37 schematically illustrates a midair image 300 brought up on display by the display device 1 in the fourth embodiment for calibration processing. The midair image 300 in FIG. 37 includes a first icon 300A1 provided as a first display and a second icon 300A2 provided as a second display. Namely, the first icon 300A1 constitutes a first portion of the midair image 300 and the second icon 300A2 constitutes a second portion of the midair image 300. The first icon 300A1 is an icon to be operated by the user 12 during the calibration processing. The second icon 300A2 is an image that helps the user 12 perceive the display position of the first icon 300A1 along the Z direction.

FIG. 37(a) shows how the first icon 300A1 and the second icon 300A2 may be displayed in an initial display. In the initial display, the first icon 300A1 and the second icon 300A2 are displayed at positions corresponding to a single coordinate value along the Z direction, i.e., at positions set apart from the operation detector 13 by a distance H1 toward the + side along the Z direction.

The circumstances in which the reach position 50 with respect to an operation performed by the user 12 for the midair image 300 in this initial display may not arrive at the first icon 300A1 (further on the Z direction + side), as shown in FIG. 5(b) will be explained. Under such circumstances, the display control unit 202 creates a perception in the user 12 as if the first icon 300A1 is displayed further toward the − side along the Z direction relative to the state shown in FIG. 37(a). In this embodiment, the display control unit 202 controls the display unit 11 based upon the distance between the reach position 50 and the detection reference 40 so that the second icon 30A2 is set at a position further toward the + side along the Z direction. In other words, the display control unit 202 adjusts the positional relationship between the display position of the first icon 300A1 and the display position, different from the display position of the first icon 300A1, at which the second icon 300A2 is displayed, by controlling the display position of the second icon 300A2. The display control unit 202 adjusts the display pixels P via which the display image data corresponding to the second icon 300A2 are displayed. As a result, the second icon 300A2 is displayed, based upon the distance between the reach position 50 and the detection reference 40, at a position shifted toward the + side along the Z direction by a distance ΔZ1, as shown in FIG. 37(b). Namely, the display control unit 202 controls the detection reference 40 and the position of the second icon 300A2 provided as the second display. The user 12, looking at this midair image 300, perceives as if the first icon 300A1 takes a position further toward the − side along the Z direction relative to the second icon 300A2.

The circumstances in which the reach position 50 with respect to an operation performed by the user 12 for the first icon 300A1 in the initial display shown in FIG. 37(a) may be beyond the first icon 300A1 (further on the Z direction − side), as shown in FIG. 5(d) will be described. Under such circumstances, the display control unit 202 creates a perception in the user 12 as if the first icon 300A1 is displayed further toward the + side along the Z direction relative to the state shown in FIG. 37(a). In this embodiment, the display control unit 202 controls the display unit 11 based upon the distance between the reach position 50 and the detection reference 40 so that the second icon 30A2 is set at a position further toward the − side along the Z direction. The display control unit 202 switches the display pixels P, to which the display image data corresponding to the second icon 300A2 are allocated. As a result, the second icon 300A2 is displayed based upon the distance between the reach position 50 and the detection reference 40, at a position shifted toward the − side along the Z direction by a distance ΔZ2, as shown in FIG. 37(*c*). Namely, the display control unit 202 controls the detection reference 40 and the position of the second icon 300A2 provided at the second display. The user 12, looking at this midair image 300, perceives as if the first icon 300A1 takes a position further toward the + side along the Z direction relative to the second icon 300A2.

While the calibration processing explained below is executed in the display device 1 when it is set in the first calibration processing mode in the embodiment, the calibration processing may instead be executed in the second calibration processing mode. In such a case, the display control unit 202 will switch display pixels P via which the display image data corresponding to the second icon 300A2 are displayed based upon the distance between the reach position 50 and the detection reference 40 in step S6 in the flowchart presented in FIG. 7 in reference to which the first embodiment has been described. In addition, during the calibration processing executed in the second calibration processing mode, the display control unit 202 will switch display pixels P via which the display image data corresponding to the second icon are displayed based upon the distance between the reach position 50 and the detection reference 40 in step S28 and step S32 in the flowchart presented in FIG. 9 in reference to which the first embodiment has been described.

It is to be noted that while the display device 1 in the fourth embodiment described above provides light field display, the present embodiment is not limited to this example. For instance, the display device 1 may adopt a structure that enables parallax image display and in such a case, the extent of parallactic offset may be controlled so as to move the display position of the second icon 300A2 along the Z direction relative to the first icon 300A1. In addition, the display device 1 may include a plurality of display units 11, each identical to the display unit 11 described in reference to the first embodiment, instead of the display unit 11 in FIG. 36(*b*) capable of providing light field display, and the icon display position may be shifted along the Z direction by individually driving the display units 11 along the Y direction. The display units 11 may be, for instance, nine display units 11-1 through 11-9 disposed over three rows by three columns, as illustrated in FIG. 38(*a*).

Figure 38:
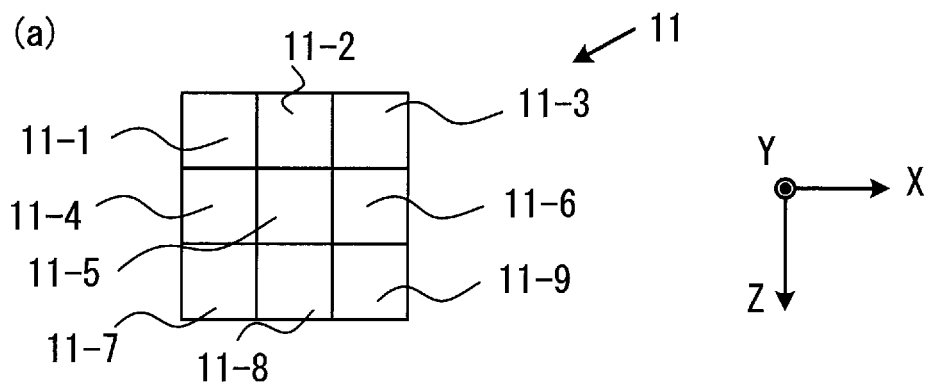
Figure 38:
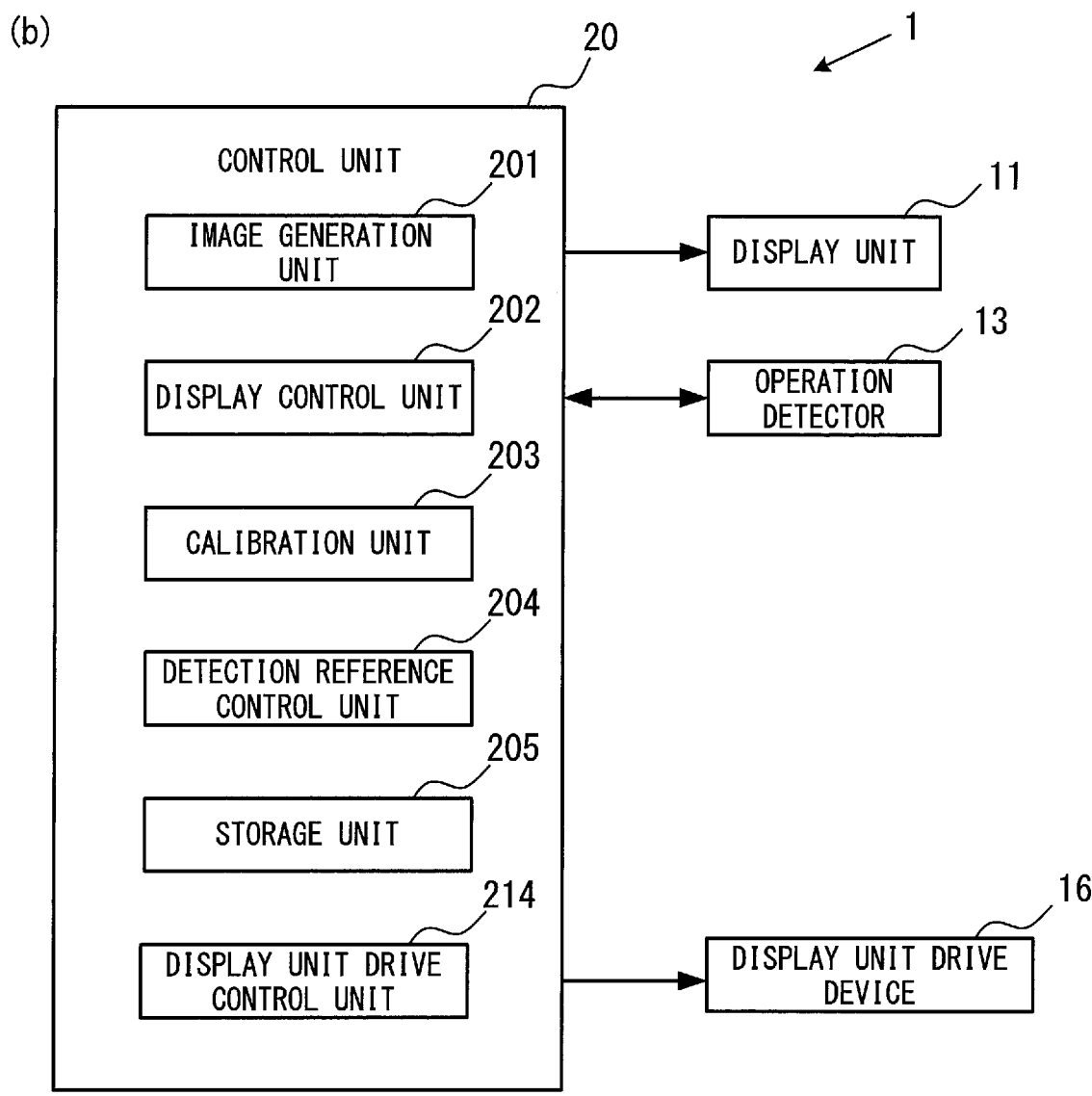

FIG. 38(*b*) is a block diagram of the essential configuration the display device 1 in variation 2. In addition to the structural elements of the display device 1 in the first embodiment, the display device 1 includes display unit drive devices 16 that drive the various display units 11-1 through 11-9 shown in FIG. 38(*a*). The control unit 20 includes a display unit drive control unit 214 that controls operations of the display unit drive devices 16. The other structural elements may be identical to those in the fourth embodiment shown in FIG. 36.

The display units 11-1 through 11-9, disposed parallel to the ZX plane, are allowed to move along the Y direction. The display unit drive devices 16 are each disposed in correspondence to one of the display units 11-1 through 11-9, and they each include guide rails disposed along the Y direction, which are used to drive the corresponding display unit among the display units 11-1 through 11-9 and a motor, an actuator or the like that drives the corresponding display unit among the display units 11-1 through 11-9 along the guide rails. The display unit drive control unit 214 determines the positions to be taken by the display units 11-1 through 11-9 along the Y direction and drives the display units 11-1 through 11-9 along the Y direction to the positions having been determined, by controlling the display unit drive devices 16. As the positions taken by the display units 11-1 through 11-9 along the Y direction are adjusted, i.e., as the distances from the display units 11-1 through 11-9 to the image-forming optical system 9 are adjusted via the display unit drive control unit 214 and the display unit drive devices 16, the position at which the midair image 30 is displayed is altered along the Z direction.

When the first icon 300A1 and the second icon 300A2 are displayed as a midair image 300, as shown in FIG. 37, the display control unit 202 may engage, for instance, the display unit 11-4 to display the display image data corresponding to the first icon 300A1 and engage the display unit 11-6 to display the display image data corresponding to the second icon 300A2.

When bringing up the initial display shown in FIG. 37(*a*), the display unit 11-4 and the display unit 11-6 are driven, via the corresponding display unit drive devices 16, to matching positions along the Y direction, i.e., to the positions that the display units need to take in order to display the first icon 300A1 and the second icon 300A2 at positions set apart from the operation detector 13 by a distance H1 toward the + side along the Z direction. The case in which the reach position 50 with respect to an operation performed by the user 12 for the first icon 300A1 in the initial display may not arrive the first icon 300A1 (may be located at a point further toward the + side along the Z direction) during the calibration processing, as illustrated in FIG. 5(*b*) will be explained. In such a case, the display unit drive control unit 214 determines a position to be taken by the display unit 11-5 along the Y direction in order to display the second icon 300A2 as shown in FIG. 37(*b*). The display unit drive control unit 214 calculates a displacement quantity, i.e., the extent to which the display unit 11-5 is to move toward the Y direction − side, based upon the distance between the reach position 50 and the detection reference 40. The display unit drive control unit 214 outputs this displacement quantity as a drive signal to the corresponding display unit drive device 16, and the display unit drive device 16 drives the display unit 11-5 toward the Y direction − side based upon the displacement quantity. In other words, the display unit drive control unit 214 controls the position of the detection reference 40 and the position of the second icon 300A2 provided as the second display. As a result, the user 12, looking at the midair image 300, perceives as if the first icon 300A1 takes a position further toward the − side along the Z direction relative to the second icon 300A2.

Figure 5:
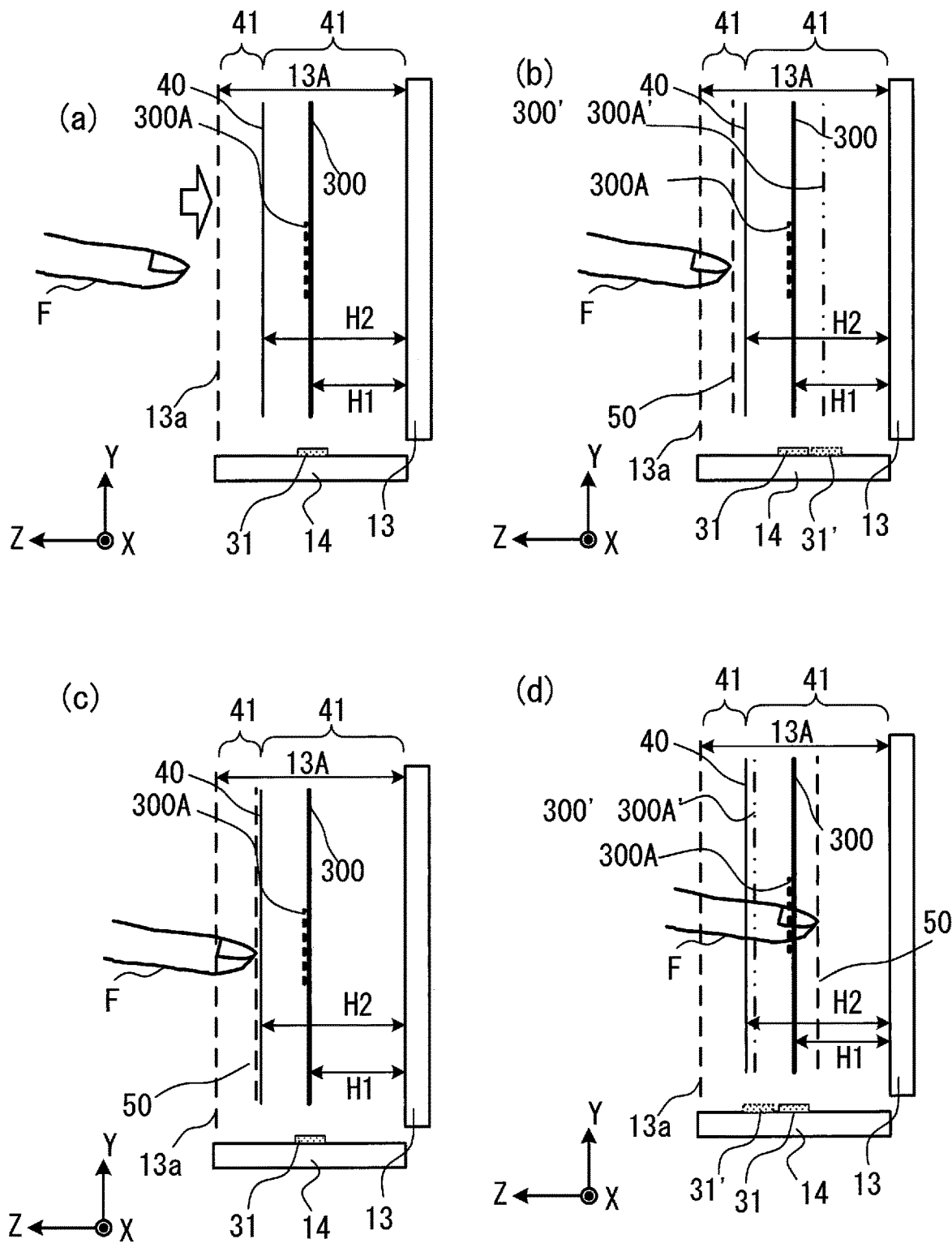

The reach position 50 with respect to an operation performed by the user 12 for the first icon 300A1 in the initial display may be located beyond the first icon 300A1 (further toward the − side along the Z direction) during the calibration processing, as illustrated in FIG. 5(*d*). In such a case, the display unit drive control unit 214 determines a position to be taken by the display unit 11-5 along the Y direction in order to display the second icon 300A2 as shown in FIG. 37(*b*). The display unit drive control unit 214 calculates a displacement quantity, i.e., the extent to which the display unit 11-5 is to move toward the Y direction + side, based upon the distance between the reach position 50 and the detection reference 40. The display unit drive control unit 214 outputs this displacement quantity as a drive signal to the corresponding display unit drive device 16, and the display unit drive device 16 drives the display unit 11-5 toward the Y direction + side based upon the displacement quantity. In other words, the display unit drive control unit 214 controls the position of detection reference 40 and the position of the second icon 300A2 provided as the second display. As a result, the user 12, looking at the midair image 300, perceives as if the first icon 300A1 takes a position further toward the Z direction − side relative to the second icon 300A2.

It is to be noted that the distance between the reach position 50 and the detection reference 40, measured along the Z direction, is correlated in advance with displacement quantities representing extents to which the display units 11-1 through 11-9 are to move along the Y direction and the direction along which they are to move, based upon the results of testing or the like, and the correlation information is stored into the storage unit 205 as a correlation data. The display unit drive control unit 214 calculates displacement quantities for the display units 11-1 through 11-9 by referencing the correlation data.

An example in which the calibration processing is executed in the display device 1 set in the first calibration processing mode in the fourth embodiment will be explained next. In this a case, the display unit drive control unit 214 will calculate a displacement quantity by which the display unit 11-5 engaged to display the second icon 300A2 is to move along the Y direction based upon the distance between the reach position 50 and the detection reference 40 in step 6 in the flowchart presented in FIG. 7 in reference to which the first embodiment has been explained.

It is to be noted that the calibration processing may also be executed in the display device 1 set in the second calibration processing mode in the fourth embodiment. In this case, the display unit drive control unit 214 will calculate a displacement quantity by which the display unit engaged to display the second icon is to move along the Y direction based upon the distance between the reach position 50 and the detection reference 40 in step S28 and step S32 in the flowchart presented in FIG. 9 in reference to which the first embodiment has been described and the display unit 11 will be moved accordingly.

In the fourth embodiment, the display control unit 202 and the display unit drive control unit 214 control the position of the detection reference 40 and the position of the second icon 300A2 provided as the second display in midair. The user 12 is thus able to perceive the position of the midair image along the Z direction based upon the position of the second display.

In addition, the display control unit 202 and the display unit drive control unit 214 in the fourth embodiment adjust the positional relationship between the detection reference 40 and the second icon 300A2, which is different from the first icon 300A1 operated by the user 12, by controlling the second icon 300 A2. Thus, the user 12, perceiving the position of the first icon 300A1 based upon the positional relationship of the first icon 300A1 to the second icon 300A2, is able to perform an operation at the detection reference 40.

Furthermore, the display control unit 202 and the display unit drive control unit 214 in the fourth embodiment adjust the positional relationship between the first icon 300A1 and the second icon 300A2 displayed at a position different from the display position of the first icon 300A1 by controlling the display position of the second icon 300A2. As a result, the user 12 is able to perceive the display position of the first icon 300A1 in reference to the second icon 300A2.

Figure 39:
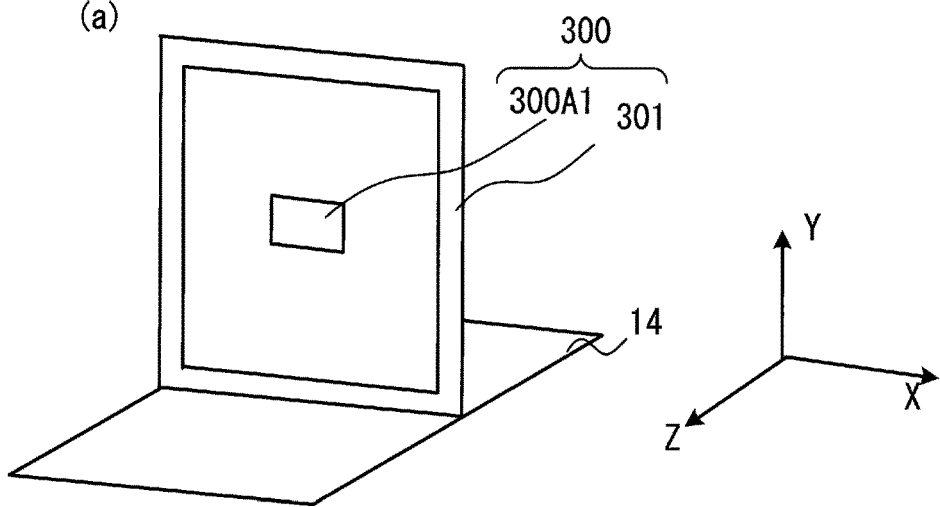
Figure 39:
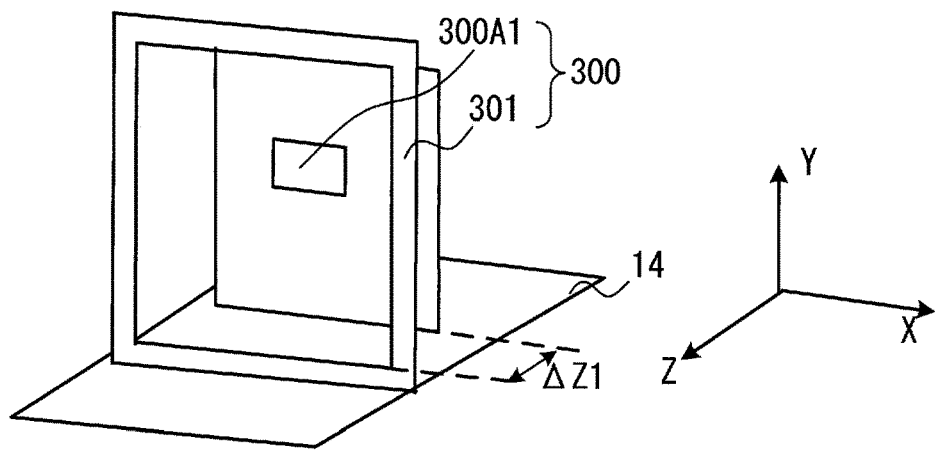
Figure 39:
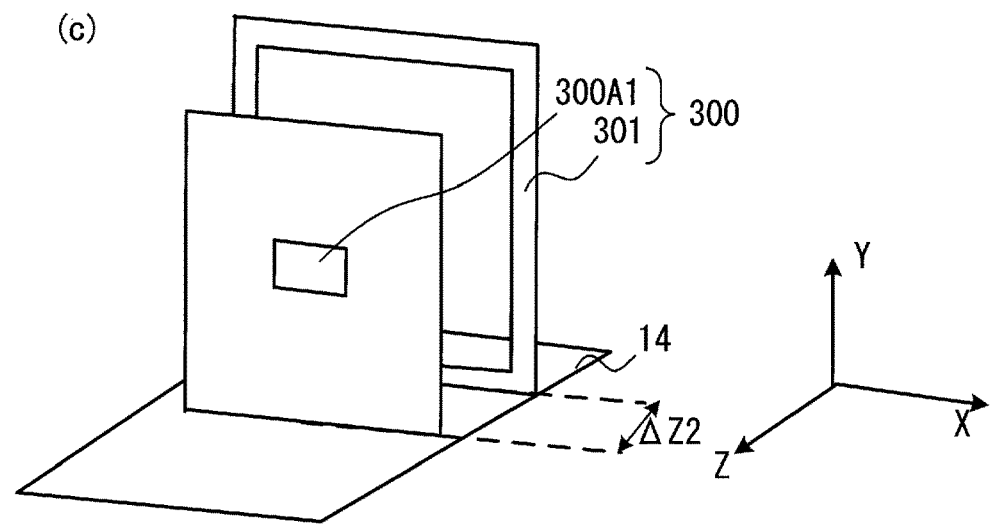

It is to be noted that while the image generation unit 201 displays the second icon 300A2 as the second display in the example described above, an image other than an icon may be provided as the second display. For instance, the image generation unit 201 may display a midair image 301 expressing a frame enclosing a midair image 300 as the second display, as illustrated in FIG. 39. FIG. 39(a) shows an initial display, FIG. 39(b) presents an example in which the midair image 301 is set at a position further toward the + side along the Z direction relative to the initial display, and FIG. 39(c), presents an example in which the midair image 301 is set at a position further toward the − side along the Z direction relative to the initial display. The user 12, looking at the midair image 300 displayed as shown in FIG. 39(b), perceives as if the first icon 300A1 is located at a position further toward the − side along the Z direction relative to the midair image 301. In addition, the user 12, looking at the midair image 300 displayed as shown in FIG. 39(c) perceives as if the first icon 300A1 is located at a position further toward the + side along the Z direction relative to the midair image 301. The display position of the midair image 301 may be adjusted through the light field method, or display image data corresponding to the midair image 301 may be displayed by a display unit 11 (see FIG. 38) among a plurality of display units 11.

It is to be noted that a perception is created in the user 12 as if the position of the first display in the midair image 300 along the Z direction has moved along a direction opposite from the direction in which the second display has moved by adjusting the display position of the second display in the midair image, which is not the target of the operation performed by the user 12, along the Z direction in the fourth embodiment described above. However, a user 12 may perceive the position of the midair image 301 displayed as the second display to be the position of the first icon 300A1 in the first display, and such a user 12 may not receive as if the position of the first display along the Z direction has moved along the direction opposite from the direction in which the second display has moved. While it depends upon the particular user 12 as to whether or not the position of the midair image 301, provided as the second display, is perceived to be located at the position of the first icon 300A1, the user 12 will more readily perceive the position of the midair image 301 to be located at the position of the first icon 300A1 when the midair image 301 in the second display and the first icon 300A1 are closely related to each other. The midair image 301 in the second display and the first icon 300A1, closely related to each other, may express objects that are located close to each other, are in contact with each other, or are configured as integrated parts in the real world.

For instance, the display device 1 may display an image of a painting, i.e., a non-icon, as the first display and an image of a picture frame, i.e., a non-icon, as the second display. Since an actual painting is normally placed in a picture frame, the position of the picture frame and the position of the painting will match each other in the real world. For this reason, even when the position of the painting in the first display and the position of the picture frame in the second display are offset from each other along the Z direction in the midair image on display, the user 12 may perceive as if the painting in the first display is located at the position taken by the picture frame in the second display in the midair image on display. Likewise, when a shadow of the first display is displayed as an auxiliary image in the second display, as has been explained in reference to the first embodiment, the third embodiment and the like, the first display and the second display are closely related to each other. However, the phenomenon with respect to the user perception described above does not readily occur if the first display and the second display are not closely related to each other. For instance, if a midair image expressing an icon of a musical note is brought up as the second display and a midair image of a PET bottle is brought up as the first display, the user 12 will not readily perceive that the first display is located at the position of the second display, since the PET bottle in the first display and the musical note icon in the second display are not closely related to each other. In other words, a musical note icon and a PET bottle are not often found near each other and a musical note icon and a PET bottle would likely never be an integrated whole in the real world.

In the example presented in FIG. 39, a midair image 301 expressing a frame is brought up as the second display. In the real world, an image such as the first icon 300A1 is often displayed at the position of a frame and for this reason, the user 12 is likely to perceive as if the first display is located at the position of the second display in the example presented in FIG. 39. In more specific terms, the user 12, looking at an image of, for instance, a painting displayed as the first icon 300A1 and an image of a frame in the second display rendered as a picture frame for the painting on display, is likely to readily perceive as if the first display is located at the position of the second display.

When the user 12 perceives as if the first display is located at the position of the second display as described above, the direction along which the first display moves in the perception of the user 12 will be different from that having been explained in reference to the fourth embodiment. More specifically, as the midair image 301 moves toward the + side along the Z direction, as shown in FIG. 39(*b*), the user 12 may perceive as if the first icon 300A1, too, has moved toward the + side along the Z direction. In addition, as the midair image 301 moves toward the − side along the Z direction, as shown in FIG. 39(*c*), the user 12 may perceive as if the first icon 300A1, too, has moved toward the − side along the Z direction. Namely, the direction along which the first display moves, as perceived by the user 12, matches the direction having been explained above in reference to the first embodiment. In other words, the direction along which the first display has moved, as perceived by the user 12, changes depending upon whether or not the user 12 perceives as if the first display is located at the position of the second display.

It is to be noted that other specific examples of the first display and the second display closely related to each other are listed below. The display device 1 may display a beverage bottle as the first display and display a desk as the second display. In addition, the display device 1 may display a music score as the first display and display a music stand as the second display. In these cases, the user 12 is more likely to perceive as if the first display is located at the position of the second display.

It is to be also noted that the user 12 perceives as if the midair image 30 is located at a position taken by a physical object in the examples described in reference to the second embodiment and the variations thereof. However, depending upon the relation between the physical object (e.g., the frame 101) and the midair image 30, a given user 12 may perceive that the midair image 30 is located at a position relative to the position taken by the frame 101, as has been explained in reference to the second embodiment. Namely, the user 12 may perceive as if the midair image has moved toward the + side along the Z direction when the frame 101 has moved toward the − side along the Z direction and that the midair image 30 has moved toward the − side along the Z direction when the frame 101 has moved toward the + side along the Z direction.

(Variation 1 of the Fourth Embodiment)

The display device 1 in the fourth embodiment causes the user 12 to perceive the position of a first portion of a midair image 30, which is the target of an operation performed by the user 12, along the Z direction by adjusting the display position of a second portion of the midair image, which is not the target of the operation performed by the user 12, along the Z direction, without altering the display position of the first portion along the Z direction.

As explained earlier, even a single user 12 may experience different perceptions with respect to the display position of a midair image due to the transmissivity of the midair image. This means that the user 12 may not be able to accurately perceive the position of the midair image and thus, the operation performed by the user 12 may not be detected at the detection reference. Namely, the user 12 may perceive that the midair image position is unstable.

In order to allow the user 12 to perceive the display position of an icon in a midair image with better accuracy in reference to an actual physical object by reducing the extent of instability with respect to the position of the midair image explained above, the image generation unit 201 in the display device 1 in variation 1 of the fourth embodiment displays a midair image in the second display, different from the icon in the first display, so that the midair image in the second display overlaps (connects with) an actual physical object. Namely, the user 12 is able to perceive the display position of the icon in reference to the physical object via the midair image in the second display. The following is a detailed explanation of this concept.

Figure 40:
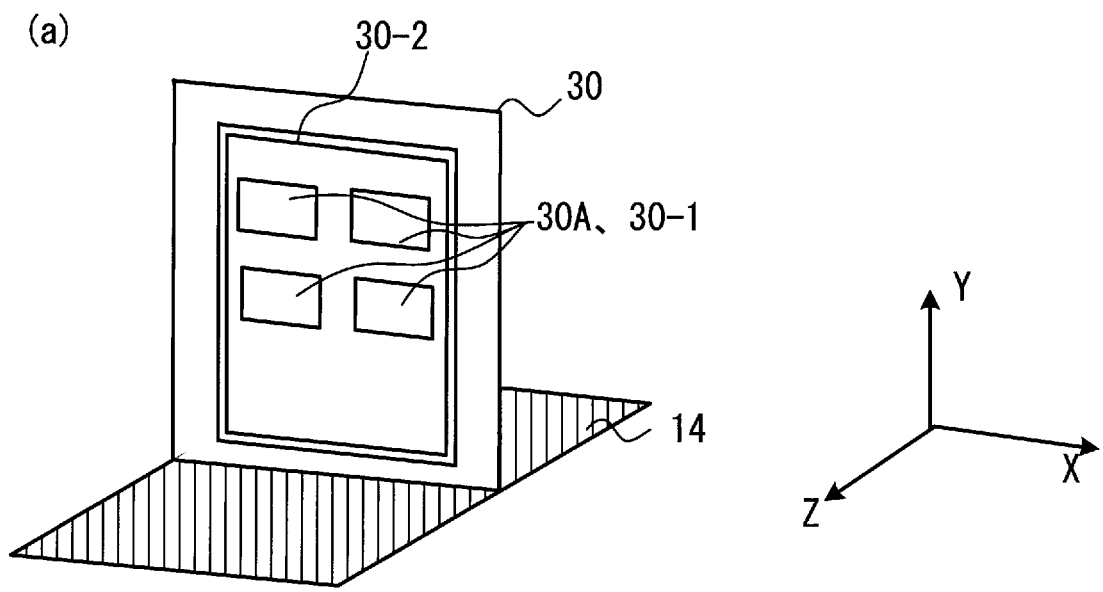
Figure 40:
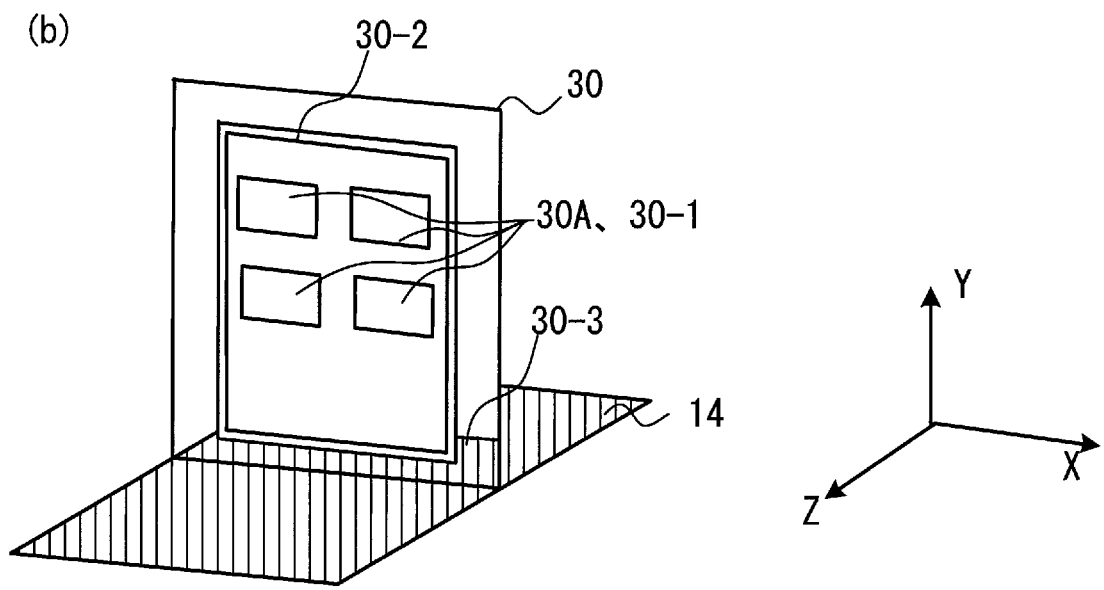

FIG. 40 schematically illustrates a midair image 30 displayed by the display device 1 in this variation and a stage 14. A striped pattern is formed at the surface of the stage 14 (the surface located on the Y direction + side). FIG. 40(*a*) shows a first midair image 30-1 constituting the first portion of the midair image 30 and a second midair image 30-2 constituting the second portion of the midair image 30. In the example presented in FIG. 40(*a*), the first midair image 30-1 constituting the first display includes four icons 30A. It is to be noted that the quantity of the icons 30A is not limited to this example and the midair image 30-1 may include icons 30A in quantities other than four. The second midair image 30-2 provided as the second display is an image resembling a panel on which the icons 30A are set. The image generation unit 201 generates display image data expressing the second midair image 30-2 placed upon the stage 14. Namely, the image generation unit 201 generates display image data expressing the second midair image 30-2 appearing to overlap the stage 14, which is an actual physical object. Since the position taken by the stage 14 on the display device 1 is stable, the user 12 is able to visually perceive the icon 30A as holding a stable position via the second midair image 30-2 displayed so as to appear to be placed upon the physical stage 14.

Even when the midair image 30 is displayed so that the second midair image 30-2 appears to be placed on the stage 14 as described above, a given user 12 may perceive that the second midair image 30-2 is set apart from the stage 14. In other words, there may be a user 12 who perceives that the second midair image 30-2 is not placed upon the stage 14. In order to prevent the occurrence of such a situation, the image generation unit 201 may generate display image data that include an additional third midair image to be displayed over the area where the second midair image 30-2 overlaps the stage 14 as shown in FIG. 40(a). FIG. 40(b) shows such a midair image 30. The first midair image 30-1 and the second midair image 30-2 are similar to those in the example presented in FIG. 40(a). A third midair image 30-3 may correspond to, for instance, an image expressing the surface of the stage 14 in the vicinity of the bottom of the second midair image 30-2. In this case, the image generation unit 201 generates display image data corresponding to the third midair image 30-3 by using image-capturing data obtained by capturing an image of, for instance, the pattern on the surface of the stage 14, via an image-capturing device or the like. Since this will create a perception in the user 12 that the second midair image 30-2 is placed on the stage 14, the user 12 will be able to perceive that the icon 30A assumes a more stable position along the Z direction in reference to the stage 14 via the second midair image 30-2 and the third midair image 30-3.

It is to be noted that the image generation unit 201 may generate display image data expressing the second midair image 30-2 and the first midair image 30-1 at least partially overlapping each other while the second midair image 30-2 appears to overlap the stage 14 via the third midair image 30-3, as explained above. In such a case, the image generation unit 201 displays the first midair image 30-1 and the second midair image 30-2 so that they appear to be in contact with each other without any gap present between them. For instance, the image generation unit 201 may generate display image data expressing a bottle or a PET bottle as the first midair image 30-1, which appears to be placed on a desk displayed as the second midair image 30-2. Since the first midair image 30-1 overlaps the second midair image 30-2 which is visually recognized as a stable image relative to the physical stage 14, the user 12 will be able to view the first midair image 30-1 as a more stable image.

The image generation unit 201 in variation 1 of the fourth embodiment displays the second midair image 30-2 between the first midair image 30-1 and the physical object (stage 14) disposed further downward (toward the Y direction − side) relative to the first midair image 30-1. As a result, the user 12 is able to easily perceive the position of the first midair image 30-1 in space in reference to the stage 14 via the second midair image 30-2.

The image generation unit 201 in variation 1 of the fourth embodiment displays the second midair image 30-2 so as to appear to partially overlap the stage 14. As a result, the user 12, looking at the icons 30A via the second midair image 30-2, displayed so as to appear to be placed on the stage 14, is able to perceive the positional relationship between the icons 30A and the stage 14 as a stable positional relationship.

In addition, the image generation unit 201 in variation 1 of the fourth embodiment displays a third midair image 30-3 corresponding to the stage 14 over the area of the second midair image 30-2 that overlaps the stage 14. The user 12, perceiving that the second midair image 30-2 is placed on the stage 14, is thus able to perceive the position of the icons 30A along the Z direction, in reference to the stage 14 via the second midair image 30-2 and the third midair image 30-3.

The image generation unit 201 in variation 1 of the fourth embodiment displays the second midair image 30-2 so that it partially overlaps the first midair image 30-1. Since this creates a perception in the user 12 that the first midair image 30-1 and the second midair image 30-2 take matching positions along the Z direction, the user 12 is able to perceive the position of an icon 30A along the Z direction in reference to the stage 14 via the second midair image 30-2 and the third midair image 30-3.

It is to be noted that while the display device 1 in the fourth embodiment described above includes at least the control unit 20, the display unit 11 and the operation detector 13, the present embodiment and variation may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the fourth embodiment and variation 1 thereof. In addition, the control device described above may be built into any of various types of electronic devices adopting the fourth embodiment and the variation thereof.

Furthermore, the present embodiment and variation may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the fourth embodiment, a structural element among the structural elements described earlier may be added into the detection device as deemed necessary.

In all the embodiments and variations described above, a midair image may be generated by condensing laser light in midair and forming plasma with air molecules so as to emit light in midair. Through this method, a three-dimensional image is generated as a real image in midair by controlling the laser light condensing position at any desired position in the three-dimensional space. In another midair image generation method, an image may be generated in midair via a display device having a function of creating fog in the air in addition to a projector function by creating a screen with the fog in the air and projecting an image onto the screen formed with the fog (fog display).

A program enabling the various types of processing to be executed at the display device 1 to move the position of a midair image 30 may be recorded into a computer-readable recording medium, and the calibration may be executed based upon the program read into a computer system. It is to be noted that the "computer system" in this context may include an OS (operating system) and hardware such as peripheral devices.

It is to be also noted that the "computer system" may include a homepage provider environment (or a display environment) in conjunction with the WWW system. In addition, the "computer-readable recording medium" may be a non-volatile writable memory such as a flexible disk, a magneto-optical disk, a ROM or a flash memory, a portable medium such as a CD-ROM, or a storage device such as a hard disk built into a computer system. Furthermore, the "computer-readable recording medium" may be a storage medium capable of holding a program over a specific length of time, such as a volatile memory (e.g., DRAM (dynamic random access memory)) in a computer system functioning as a server or a client when the program is transmitted via a communication network such as the Internet or via a communication line such as a telephone line.

The "program" stored in a storage device or the like in a computer system may be transmitted to another computer system via a transmission medium or on a transmission wave in a transmission medium. The "transmission medium" through which the program is transmitted in this context refers to a medium having a function of information transmission, examples of which include a network (communication network) such as the Internet and a communication line such as a telephone line. The program described above may enable only some of the functions described earlier. Furthermore, the program may be a differential file (differential program) that works in conjunction with a program already recorded in the computer system so as to enable the functions described earlier.

As long as the features characterizing the present invention remain intact, the present invention is in no way limited to the particulars of the embodiments described above and other modes or combinations that are conceivable within the technical teaching of the present invention are also within the scope of the invention.

The disclosure of the following priority application is herein incorporated by reference:
Japanese Patent Application No. 2016-128210 filed Jun. 28, 2016

REFERENCE SIGNS LIST

1 . . . display device, 9 . . . image-forming optical system, 11 . . . display unit, 13 . . . operation detector, 15 . . . projector, 16 . . . display unit drive device, 17 . . . drive device, 18 . . . image-capturing device, 19 . . . sound collector, 20 . . . control unit, 91 . . . second display unit, 92 . . . diffuser plate, 103 . . . LED, 200 . . . projector control unit, 201 . . . image generation unit, 202 . . . display control unit, 203 . . . calibration unit, 204 . . . detection reference control unit, 206 . . . velocity·acceleration detection unit, 207 . . . reach position predicting unit, 208 . . . sound detection unit, 209 . . . image analysis unit, 210 . . . drive control unit, 211 . . . lighting control unit, 212 . . . detection unit, 213 . . . decision-making unit, 214 . . . display unit drive control unit

The invention claimed is:

1. A display device, comprising:
a first display unit that displays a first image at a remote position;
a second display unit that displays a second image at a position different from the remote position of the first image;
a detector that detects an operation performed by a user with respect to the first image; and
a display control unit that comprises a central processing unit (CPU) and that, (i) based upon the operation detected by the detector and (ii) without adjusting a display mode of the first image, adjusts a display mode of the second image to create a user perception that the remote position of the first image displayed by the first display unit is changed in relation to the second image, wherein
the operation is a pressing operation performed by the user to press on the first image; and
the display control unit adjusts the display mode of the second image to create the user perception if that the position of the first image is changed along a direction determined based upon the pressing operation or along a direction opposite from the direction determined based upon the pressing operation.
2. The display device according to claim 1, wherein:
the detector detects, as the operation performed by the user, a position of the operation performed by the user relative to a position of reference for detecting the operation performed by the user.
3. The display device according to claim 1, wherein:
the detector detects whether or not the operation has been performed by the user within a predetermined distance from a position of reference for detecting the operation performed by the user.
4. The display device according to claim 3, wherein:
the display control unit adjusts the display mode of the second image in a case that the operation has not been performed by the user within the predetermined distance from the position of the reference for detecting the operation performed by the user.
5. The display device according to claim 1, wherein:
the display control unit adjusts the display mode of the second image by altering at least one of a position and a size of the second image relative to the first image displayed by the first display unit.
6. The display device according to claim 1, wherein:
the display control unit adjusts the display mode of the second image by altering sharpness of the second image displayed by the second display unit.
7. The display device according to claim 1, wherein:
the display control unit adjusts the display mode of the second image by adding a shade/shadow to the second image displayed by the second display unit.
8. The display device according to claim 1, wherein:
the second display unit is a projection device that projects the second image.
9. A display method through which an image is displayed by a display device, the method comprising:
displaying a first image at a remote position;
displaying a second image at a position different from the remote position of the first image;
detecting an operation performed by a user with respect to the first image on display; and
without adjusting a display mode of the first image, adjusting a display mode of the second image to create a user perception that the remote position of the first image is changed in relation to the second image, based upon the detected operation, wherein
the operation is a pressing operation performed by the user to press on the first image; and
the display mode of the second image is adjusted to create the user perception that the position of the first image is changed along a direction determined based upon the pressing operation or along a direction opposite from the direction determined based upon the pressing operation.
10. A display device, comprising:
a first display unit that displays a first display image, displayed by the display device, at a position set apart from the display device by a predetermined distance;
a second display unit that displays a second display image, displayed by a second display device, at a position different from the position of the first display image;
an operation detector that detects an operation performed by a user for the first display image; and
a control unit that comprises a central processing unit (CPU) and that, (i) without adjusting a display mode of the first display image and (ii) based upon an ascertained positional relationship between a detection reference, which is set near the first display image, and the operation performed by the user, executes display control through which a display mode of the second display image creates a user perception that the position of the first display image displayed by the first display unit is changed in relation to the second display image, wherein the operation is a pressing operation performed by the user to press on the first display image; and the control unit executes display control through which the display mode of the second display image creates the user perception that the position of the first display image is changed along a direction determined based upon the pressing operation or along a direction opposite from the direction determined based upon the pressing operation.

11. The display device according to claim 10, wherein:

the control unit executes display control through which a display position of the second display image is altered in relation to the first display image based upon the ascertained positional relationship.

12. The display device according to claim 10, wherein:

the second display unit executes display control through which a display position of the second display image is altered based upon a midair position of the first display image displayed by the first display unit.

13. The display device according to claim 10, wherein:

the second display unit executes display control through which display luminance or display density of the second display image is altered based upon a midair position of the first display image displayed by the first display unit.

14. The display device according to claim 10, wherein:

the second display image displayed by the second display device is a shadow image of the first display image.

15. The display device according to claim 10, wherein:

the second display device is disposed so as to range parallel to a display plane of the first display image.

16. The display device according to claim 10, wherein:

the second display device is disposed with a predetermined angle relative to a display plane of the first display image.

17. The display device according to claim 10, wherein:

the second display device is disposed between the display device and a display plane of the first display image.

* * * * *